(12) United States Patent
Miller

(10) Patent No.: US 10,534,189 B2
(45) Date of Patent: Jan. 14, 2020

(54) UNIVERSAL LINEAR COMPONENTS

(71) Applicant: The Board of Trustees of the Leland Stanford Junior University, Palo Alto, CA (US)

(72) Inventor: David A. B. Miller, Stanford, CA (US)

(73) Assignee: The Board of Trustees of the Leland Stanford Junior University, Stanford, CA (US)

(*) Notice: Subject to any disclaimer, the term of this patent is extended or adjusted under 35 U.S.C. 154(b) by 288 days.

(21) Appl. No.: 14/092,565

(22) Filed: Nov. 27, 2013

(65) Prior Publication Data
US 2014/0299743 A1    Oct. 9, 2014

Related U.S. Application Data

(60) Provisional application No. 61/846,043, filed on Jul. 14, 2013, provisional application No. 61/730,448, filed on Nov. 27, 2012.

(51) Int. Cl.
*G02B 27/14*      (2006.01)
*G02F 1/01*       (2006.01)
(Continued)

(52) U.S. Cl.
CPC .......... *G02B 27/145* (2013.01); *G02F 1/0136* (2013.01); *G02F 1/31* (2013.01); *G02F 2001/212* (2013.01)

(58) Field of Classification Search
CPC .................................................. G02B 27/145
See application file for complete search history.

(56) References Cited

U.S. PATENT DOCUMENTS 4,588,255 A * 5/1986 Tur ..................... G06E 3/001
                                                    385/24
4,603,398 A * 7/1986 Bocker ............... G06E 3/005
                                                    706/40
(Continued)

FOREIGN PATENT DOCUMENTS

EP       2333990              6/2011
WO    WO 2009050325 A1 *  4/2009  ............. H01Q 3/46

OTHER PUBLICATIONS

Barak et al., Quantum fast Fourier transform and quantum computation by linear optics, J. Opt. Soc. Am. B 24, 231-240 (2007).*
(Continued)

*Primary Examiner* — Peter Radkowski
(74) *Attorney, Agent, or Firm* — Lumen Patent Firm

(57) ABSTRACT

Universal linear components are provided. In general, a P input and Q output wave combiner is connected to a Q input and R output wave mode synthesizer via Q amplitude and/or phase modulators. The wave combiner and wave mode synthesizer are both linear, reciprocal and lossless. The wave combiner and wave mode synthesizer can be implemented using waveguide technology. This device can provide any desired linear transformation of spatial modes between its inputs and its outputs. This capability can be generalized to any linear transformation by using representation converters to convert other quantities to spatial mode patterns. The wave combiner and wave mode synthesizer are also useful separately, and can enable applications including self-adjusting mode coupling, optimal multi-mode communication, and add-drop capability in a multi-mode system. Control of the wave combiner and wave mode synthesizer can be implemented with single-variable optimizations.

22 Claims, 31 Drawing Sheets

(51) Int. Cl.
*G02F 1/31* (2006.01)
*G02F 1/21* (2006.01)

(56) References Cited

U.S. PATENT DOCUMENTS

| | | | | |
|---|---|---|---|---|
| 4,768,850 A * | 9/1988 | Moslehi | ............... | G02B 6/2861 359/885 |
| 4,768,880 A * | 9/1988 | Tur | ................... | G01D 5/35303 250/227.23 |
| 4,825,216 A * | 4/1989 | DuFort | .............. | H01Q 21/0031 342/372 |
| 4,984,276 A * | 1/1991 | Smith | .................... | G10H 5/007 381/63 |
| 5,128,687 A * | 7/1992 | Fay | ...................... | H01Q 25/008 342/376 |
| 5,448,010 A * | 9/1995 | Smith, III | ............ | G10H 1/0091 84/622 |
| 5,754,571 A * | 5/1998 | Endoh | .................. | G02F 1/0121 250/205 |
| 5,909,303 A * | 6/1999 | Trezza | .................... | G02F 1/218 359/245 |
| 6,081,232 A * | 6/2000 | Pittman | ............... | H01Q 1/1292 342/200 |
| 6,434,302 B1 * | 8/2002 | Fidric | .................. | G02B 6/2856 385/43 |
| 6,580,850 B1 * | 6/2003 | Kazarinov | ......... | G02B 6/12004 385/16 |
| 6,687,461 B1 * | 2/2004 | MacFarlane | ..... | H04B 10/25073 359/344 |
| 6,853,756 B2 * | 2/2005 | Gerlach | ............. | G02B 6/12007 359/578 |
| 6,859,114 B2 * | 2/2005 | Eleftheriades | ......... | B82Y 20/00 333/116 |
| 6,985,118 B2 * | 1/2006 | Zarro | ..................... | H01Q 13/02 333/137 |
| 7,076,169 B2 * | 7/2006 | Shpantzer | .......... | H04B 10/2543 398/152 |
| 7,085,438 B2 * | 8/2006 | Mizuno | .............. | G02B 6/12007 385/15 |
| 7,199,344 B2 * | 4/2007 | Blake | ...................... | A63J 21/00 250/205 |
| 7,218,800 B2 * | 5/2007 | Parker | ................. | H04B 10/2569 385/1 |
| 7,340,184 B2 * | 3/2008 | Frederiksen, Jr. | .... | G02F 1/0123 398/195 |
| 7,414,728 B2 * | 8/2008 | Caplan | ................. | G02B 6/2726 356/477 |
| 7,440,174 B2 * | 10/2008 | Rice | ........................ | H01S 3/005 356/477 |
| 7,474,456 B2 * | 1/2009 | Wang | ..................... | B82Y 20/00 359/298 |
| 7,515,832 B2 * | 4/2009 | Kikuchi | ............... | H04B 10/5051 398/102 |
| 7,522,124 B2 * | 4/2009 | Smith | .................... | H01Q 15/02 343/873 |
| 7,538,946 B2 * | 5/2009 | Smith | .................... | B82Y 20/00 359/569 |
| 7,545,242 B2 * | 6/2009 | Beausoliel | ................ | G06F 1/10 333/239 |
| 7,545,841 B2 * | 6/2009 | Wang | ..................... | H01S 5/50 343/754 |
| 7,561,320 B2 * | 7/2009 | Wang | ..................... | H01L 45/147 359/238 |
| 7,580,604 B2 * | 8/2009 | D'Aguanno | ........... | B82Y 20/00 359/321 |
| 7,593,170 B2 * | 9/2009 | Wu | ........................ | B82Y 20/00 252/570 |
| 7,629,937 B2 * | 12/2009 | Lier | ........................ | H01P 3/12 343/772 |
| 7,633,450 B2 * | 12/2009 | Brittingham | .............. | F41H 3/00 244/134 D |
| 7,817,757 B2 * | 10/2010 | Hidaka | .............. | H04L 25/03885 375/350 |
| 7,821,473 B2 * | 10/2010 | Justice | .................. | H01Q 1/3233 343/700 MS |
| 7,928,900 B2 * | 4/2011 | Fuller | ..................... | G01S 7/414 342/175 |
| 8,030,998 B2 * | 10/2011 | Corman | .................. | H01Q 3/26 330/149 |
| 8,090,271 B2 * | 1/2012 | Qian | ....................... | H04J 14/06 398/202 |
| 8,111,994 B2 * | 2/2012 | Popovic | ............... | G02B 6/12007 359/247 |
| 8,135,277 B2 * | 3/2012 | Ham | ..................... | G02F 1/3536 359/298 |
| 8,160,530 B2 * | 4/2012 | Corman | .................. | H01Q 3/26 343/756 |
| 8,228,232 B2 * | 7/2012 | Corman | .................. | H01Q 3/26 342/362 |
| 8,340,523 B2 * | 12/2012 | Shen | ....................... | G02F 1/225 398/85 |
| 8,669,833 B2 * | 3/2014 | Ueda | ....................... | G02B 1/002 333/202 |
| 8,988,173 B2 * | 3/2015 | Hitko | ........................ | H03F 1/56 330/252 |
| 9,020,069 B2 * | 4/2015 | Saunders | ............... | H04L 27/362 375/298 |
| 2003/0030895 A1 * | 2/2003 | So | ....................... | H01S 3/06758 359/349 |
| 2003/0179972 A1 * | 9/2003 | Gerlach | ............. | G02B 6/12007 385/1 |
| 2004/0022493 A1 * | 2/2004 | Takiguchi | .......... | G02B 6/12007 385/42 |
| 2004/0066251 A1 * | 4/2004 | Eleftheriades | ......... | B82Y 20/00 333/117 |
| 2004/0136647 A1 * | 7/2004 | Mizuno | .............. | G02B 6/12007 385/24 |
| 2004/0218931 A1 * | 11/2004 | Frederiksen, Jr. | .... | G02F 1/0123 398/198 |
| 2005/0002594 A1 * | 1/2005 | Parker | .................. | H04B 10/2569 385/11 |
| 2005/0200540 A1 * | 9/2005 | Isaacs | .................... | B82Y 20/00 343/754 |
| 2005/0259914 A1 * | 11/2005 | Padgett | .................. | H01Q 21/26 385/16 |
| 2005/0275921 A1 * | 12/2005 | Haus | ....................... | G02B 6/125 359/247 |
| 2006/0024064 A1 * | 2/2006 | Hecker | ................ | H04B 10/532 398/152 |
| 2006/0274320 A1 * | 12/2006 | Caplan | ................. | G02B 6/2726 356/491 |
| 2007/0025737 A1 * | 2/2007 | Kamio | ................ | H04B 10/677 398/150 |
| 2007/0034774 A1 * | 2/2007 | Blake | ........................ | A63J 21/00 250/205 |
| 2007/0086010 A1 * | 4/2007 | Rothenberg | ........ | B23K 26/0613 356/450 |
| 2007/0115163 A1 * | 5/2007 | Brittingham | ............... | F41H 3/00 342/1 |
| 2007/0267406 A1 * | 11/2007 | Thimm | ................ | H05B 6/1218 219/622 |
| 2007/0280384 A1 * | 12/2007 | Hidaka | .............. | H04L 25/03885 375/346 |
| 2008/0024792 A1 * | 1/2008 | Pendry | ....................... | F41H 3/00 356/602 |
| 2008/0031626 A1 * | 2/2008 | Welch | ................... | G02B 6/12004 398/79 |
| 2008/0044184 A1 * | 2/2008 | Popovic | ............... | G02B 6/12007 398/82 |
| 2008/0204164 A1 * | 8/2008 | Eleftheriades | ...... | H01Q 15/0086 333/134 |
| 2009/0136238 A1 * | 5/2009 | Gill | ........................ | H04B 10/85 398/141 |
| 2009/0263142 A1 * | 10/2009 | Shen | ....................... | G02F 1/225 398/158 |
| 2009/0274460 A1 * | 11/2009 | Qian | ....................... | H04J 14/06 398/65 |
| 2010/0156573 A1 * | 6/2010 | Smith | ..................... | H01P 3/081 333/239 |

(56) References Cited

U.S. PATENT DOCUMENTS

| | | | |
|---|---|---|---|
| 2010/0232792 A1* | 9/2010 | Ham | G02F 1/3536 398/45 |
| 2010/0259326 A1* | 10/2010 | Corman | H01Q 3/26 330/124 R |
| 2010/0259339 A1* | 10/2010 | Corman | H01Q 3/26 333/117 |
| 2010/0259445 A1* | 10/2010 | Corman | H01Q 3/26 342/372 |
| 2010/0259446 A1* | 10/2010 | Corman | H01Q 3/26 342/373 |
| 2010/0260076 A1* | 10/2010 | Corman | H01Q 3/26 370/277 |
| 2010/0260285 A1* | 10/2010 | Corman | H01Q 3/26 375/295 |
| 2010/0261440 A1* | 10/2010 | Corman | H01Q 3/26 455/91 |
| 2010/0277381 A1* | 11/2010 | Smolyaninov | H01Q 1/28 343/713 |
| 2012/0105970 A1* | 5/2012 | Ueda | G02B 1/002 359/642 |
| 2012/0128350 A1* | 5/2012 | Popovic | G02B 6/12007 398/25 |
| 2012/0184229 A1* | 7/2012 | Corman | H01Q 3/26 455/127.2 |
| 2012/0281947 A1* | 11/2012 | Garmire | G02B 6/14 385/28 |
| 2013/0136209 A1* | 5/2013 | Saunders | H04L 27/362 375/316 |

OTHER PUBLICATIONS

Pryde et al., Creation of maximally entangled photon-number states using optical fiber multiports, Phys. Rev. A 68, 052315—Published Nov. 21, 2003.*

Ma et al., A high-speed tunable beam splitter for feed-forward photonic quantum information processing, Optics Express, vol. 19, Issue 23, pp. 22723-22730 (2011).*

Kok et al, Linear optical quantum computing with photonic qubits, Rev. Mod. Phys. 79, 135—Published Jan. 24, 2007.*

Lemr et al., Linear-optical programmable quantum router, Opt. Comm. 300, 282-285 (2013) uploaded to arXiv:1208.3556v1 [quant-ph] Aug. 17, 2012.*

Kieling, Konrad, Linear optics quantum computing—construction of small networks and asymptotic scaling, Imperial College, 2008.*

Miller, David A. B., Curriculum Vitae.*

Miller, David A. B., Fundamental Limits for Optical Devices, 2010, available at http://www.creol.ucf.edu/Partnerships/Affiliates/AffiliatesDay2010/Presentations/DavidMiller.pdf.*

Charles et al., Techniques for Designing Physically Path-Length Matched Optical Circuitry, IQEC/CLEO Pacific Rim 2011, pp. 73-75.*

Guha et al., Minimizing temperature sensitivity of silicon Mach-Zehnder interferometers. Opt. Express 18,1879-1887 (2010).*

Miller, "On perfect cloaking", 2006, Optics Express v14n25, pp. 12457-12466.*

Binbin Guan, Nicolas K. Fontaine, Stevan S. Djordjevic, Stanley Cheung, Ryan P. Scott, David J. Geisler, and S. J. B. Yoo, "Full-field technique for measuring the spectral evolution of reconfigurable photonic filters," Opt. Lett. 37, 341-343 (2012).*

N. K. Fontaine et al., "Fully reconfigurable silicon CMOS photonic lattice filters," 36th European Conference and Exhibition on Optical Communication, Torino, 2010, pp. 1-3. doi: 10.1109/ECOC.2010.5621287256 (2011).*

Salah Ibrahim, Nicolas K. Fontaine, Stevan S. Djordjevic, Binbin Guan, Tiehui Su, Stanley Cheung, Ryan P. Scott, Andrew T. Pomerene, Liberty L. Seaford, Craig M. Hill, Steve Danziger, Zhi Ding, K. Okamoto, and S. J. B. Yoo, "Demonstration of a fast-reconfigurable silicon CMOS optical lattice filter," Opt. Express 19, 13245-13.*

Padgett et al., angular momentum of light: Optical spanners and the rotational frequency shift. Optical and Quantum Electronics. 31. 1-12. 10.1023/A:1006911428303, 1999.*

Golub et al., Mode-matched phase diffractive optical element for detecting laser modes with spiral phases, Appl. Opt. 46, 7823-7828 (2007).*

Gao et al., Sorting and detecting orbital angular momentum states by using a Dove prism embedded Mach-Zehnder interferometer and amplitude gratings, Optics Communications, vol. 284, Issue 1, p. 48-51.*

Kurz et al., "Mode multiplexing in optical frequency mixers," Opt. Lett. 29, 551-553 (2004).*

O'Sullivan et al., Near-perfect sorting of orbital angular momentum and angular position states of light, Opt. Express 20, 24444-24449 (2012).*

Schulze et al., Measurement of the orbital angular momentum density of Bessel beams by projection into a Laguerre-Gaussian basis, Appl. Opt. 53, 5924-5933 (2014).*

Piron et al., A Mach-Zehnder interferometer based on orbital angular momentum for improved vortex coronagraph efficiency, Proceedings of the SPIE, vol. 9605, id. 96051J 13 pp. (2015).*

D'Errico et al., Title:Measuring the complex orbital angular momentum spectrum and spatial mode decomposition of structured light beams, Optica, V. 4, N. 11, p. 1350, 2017.*

Lavbery et al., Measurement of the light orbital angular momentum spectrum using an optical geometric transformation, Journal of Optics, V. 13, N. 6, 2011.*

Boffi et al., Mode-division multiplexing in fibre-optic communications based on orbital angular momentum, J. Opt. 15 (2013) 075403 (5pp).*

Berkhout et al., Efficient Sorting of Orbital Angular Momentum States of Light, Phys. Rev. Lett. 105, 153601—Published Oct. 4, 2010.*

Fontaine et al., Efficient Multiplexing and Demultiplexing of Free-space Orbital Angular Momentum using Photonic Integrated Circuits, in Optical Fiber Communication Conference, OSA Technical Digest (Optical Society of America, 2012), paper OTu1I.2.*

Gao et al., Sorting and detecting orbital angular momentum states by using a Dove prism embedded Mach-Zehnder interferometer and amplitude gratings, Optics Communications, vol. 284, Issue 1, p. 48-51, 2011.*

Lavery et al., Robust interferometer for the routing of light beams carrying orbital angular momentum, New Journal of Physics, V. 13, 2011.*

Lavery et al., Measurement of the light orbital angular momentum spectrum using an optical geometric transformation, Journal of Optics, V. 13, N. 6, 2011.*

Leach et al., Measuring the Orbital Angular Momentum of a Single Photon, Phys. Rev. Lett. 88, 257901—Published Jun. 5, 2002.*

Miyamoto et al., Detection of orbital angular momentum superposition photon states using hologram and path interferometer, 2007 European Conference on Lasers and Electro-Optics and the International Quantum Electronics Conference, Munich, 2007, pp. 1-1.*

Padgett et al., Tutorial Review—The angular momentum of light: Optical spanners and the rotational frequency shift. Optical and Quantum Electronics. 31. 1-12. 10.1023/A:1006911428303, 1999.*

Reck et al., Experimental realization of any discrete unitary operator, Phys. Rev. Lett. 73, 58—Published Jul. 4, 1994. (Year: 1994).*

Lavery et al., Robust interferometer for the routing of light beams carrying orbital angular momentum, New Journal of Physics, V. 13, 2011 (Year: 2011).*

Jassemnejad et al., Mode sorter and detector based on photon orbital angular momentum, Optical Engineering 47(5), 053001, May 2008 (Year: 2008).*

Carlotto et al., "Iterative optical vector-matrix processor", 1981, pp. 111-116, SPIE v373.

Reck et al., "Experimental realization of any discrete unitary operator", 1994, pp. 58-61, Physical Review Letters v73n1.

Miller, "All linear optical devices are mode converters", 2012, Optics Express v20n21, pp. 23985-23993.

Miller, "How complicated must an optical component be?", Sep. 25, 2012, arXiv:1209.5499.

(56) References Cited

OTHER PUBLICATIONS

Miller, "Self-aligning universal beam coupler", Mar. 11, 2013, Optics Express v21n5, pp. 6360-6370.
Miller, "Time reversal of optical pulses by four-wave mixing", 1980, Optics Letters v5n7, pp. 300-302.
Miller, "Communicating with waves between volumes: evaluating orthogonal spatial channels and limits on coupling strengths", 2000, Applied Optics v39n11, pp. 1681-1699.
Miller, "Huygens's wave propagation principle corrected", 1991, Optics Letters v16n18, pp. 1370-1372.
Miller, "Self-Configuring Universal Linear Optical Component", Mar. 19, 2013, arXiv:1303.4602.
Miller, "How complicated must an optical component be?", Jan. 31, 2013, JOSA A v30n2, pp. 238-251.
Miller, "Self-configuring universal linear optical component", Jun. 11, 2013, Photonics Research v1n1, pp. 1-15.
Matthews et al., "Manipulation of multiphoton entanglement in waveguide quantum circuits", 2009, Nature Photonics v3, pp. 346-350.

\* cited by examiner

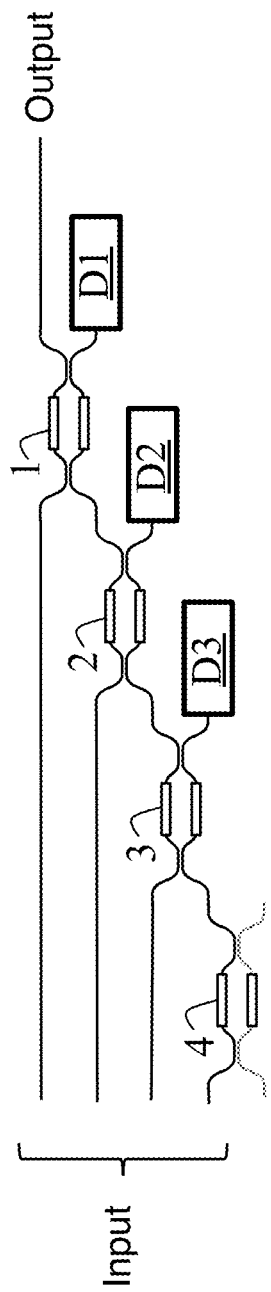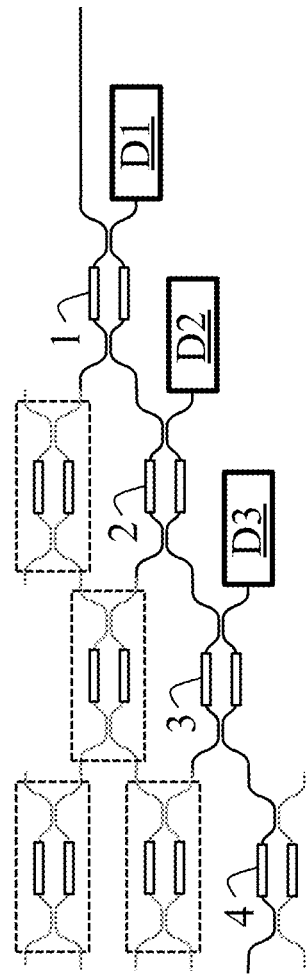
FIG. 2A
FIG. 2B

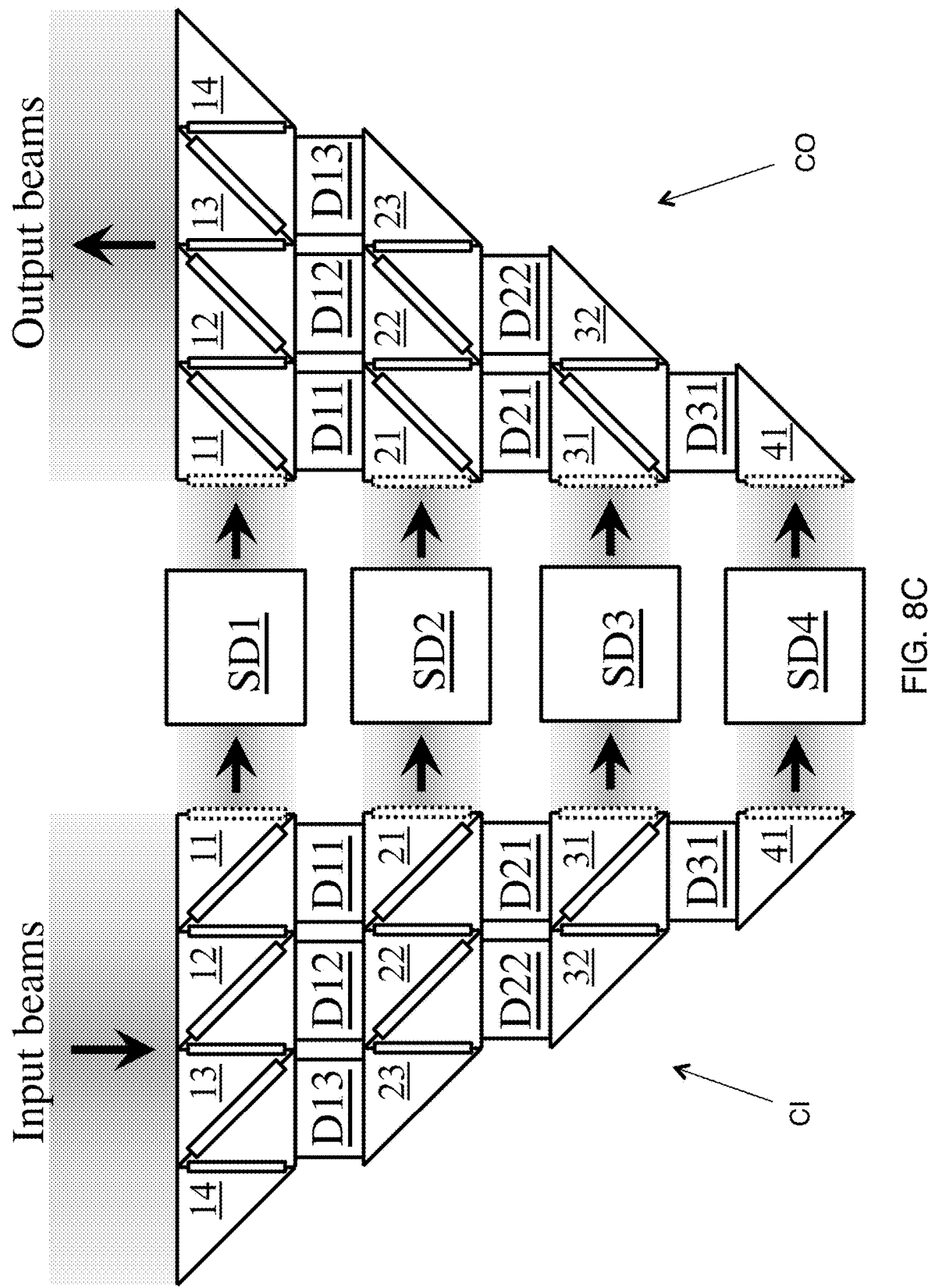

_US 10,534,189 B2_

UNIVERSAL LINEAR COMPONENTS

CROSS REFERENCE TO RELATED APPLICATIONS

This application claims the benefit of U.S. provisional patent application 61/730,448, filed on Nov. 27, 2012, and hereby incorporated by reference in its entirety. This application claims the benefit of U.S. provisional patent application 61/846,043, filed on Jul. 14, 2013, and hereby incorporated by reference in its entirety.

GOVERNMENT SPONSORSHIP

This invention was made with Government support under contracts FA9550-09-1-0704 and FA9550-10-1-0264 awarded by the Air Force Office of Scientific Research, and under contract W911NF-10-1-0395 awarded by the Department of the Army. The Government has certain rights in the invention.

FIELD OF THE INVENTION

This invention relates to mode coupling and mode transformation in wave propagation.

BACKGROUND

Optical systems can be usefully classified as being single-mode or multi-mode. In a single mode system, there is only one possible spatial pattern (i.e. the "mode") of optical amplitude and phase. In a multi-mode system, there are two or more such possible spatial patterns of optical amplitude and phase. A free space optical system can be regarded as having an infinite number of modes, although in practice there are effectively a finite number of relevant modes. For example, the number of resolvable spots in an imaging system would be on the same order as the number of relevant modes in that system.

In principle, each mode can be accessed independently of the other modes. For example, a multi-mode fiber telecommunication system using fiber that supports 100 modes would in principle have 100 independent communication channels on that single fiber (all at the same optical wavelength).

However, the difficulties in actually providing independent access to these 100 different modes are formidable, especially because small perturbations to the fiber (which can vary in time) will cause the relative phases (incurred in transmission) of the fiber's modes to change. Thus, any approach for accessing the 100 modes in the fiber of this example would have to adapt in real time to account for these changing relative phases, which can completely alter the received intensity pattern from the fiber by constructive and destructive interference.

In fact, long haul telecommunications uses single-mode fiber in nearly all cases, in large part to avoid complexities such as those described above. Accordingly, it would be an advance in the art to provide improved handling of multi-mode wave propagation.

SUMMARY

Universal linear components are provided. In general, a P input and Q output wave combiner is connected to a Q input and R output wave mode synthesizer via Q amplitude modulators. The wave combiner and wave mode synthesizer are both linear, reciprocal and lossless. For the combiner, the contribution of each of the P inputs to each of the Q outputs is adjustable in both amplitude and relative phase. For the wave mode synthesizer the contribution of each of the Q inputs to each of the R outputs is adjustable in both amplitude and relative phase. Preferably, the wave combiner and wave mode synthesizer are implemented using waveguide Mach-Zehnder modulator technology. Such a device can provide any desired linear transformation of spatial modes between its inputs and its outputs. By using representation transformers between other quantities (e.g., polarization, frequency, etc.) and spatial mode pattern, this capability can be generalized to any linear transformation at all.

The wave combiner and wave mode synthesizer are also useful separately, and can enable applications such as self-adjusting mode coupling, optimal multi-mode communication, and add-drop capability in a multi-mode system. Control of the wave combiner can be facilitated using detectors at its control ports, or detectors at its outputs. Control of the wave mode synthesizer can be facilitated using detectors at its control ports, or detectors at its inputs. Control of the wave combiner and wave mode synthesizer can be implemented with simple single-variable optimizations.

BRIEF DESCRIPTION OF THE DRAWINGS

FIGS. 2A-C show exemplary embodiments of the invention implemented with Mach-Zehnder modulators (MZMs).

FIGS. 8A-C show universal components having a wave combiner connected to a wave mode synthesizer via modulators.

DETAILED DESCRIPTION

In section A, self-configuring universal mode couplers are described. These devices can be regarded as being wave combiners (# of outputs≤# of inputs) or wave mode synthesizers (# of inputs≤# of outputs). Section B relates to universal linear components that can be constructed with the wave combiners and wave mode synthesizers. Section C describes an application of this technology to optimal multi-mode free space communication. Section D describes an application of this technology to providing add-drop capability in a multi-mode system.

a) Wave Combiner

A1) Multiple Detector Alignment

Coupling to waveguides remains challenging in optics, especially if alignment or precise focusing cannot be guaranteed, or when coupling higher-order (e.g., multimode fiber) or complicated (e.g., angular momentum) modes. Simultaneous coupling of multiple overlapping input modes without splitting loss has had few known solutions. Here we provide a device, using standard integrated optical components, detectors and simple local feedback loops, and without moving parts, that automatically optimally couples itself to arbitrary optical input beams. The approach could be applied to other waves, such as radio waves, microwaves or acoustics. It works when beams are misaligned, defocused, or even moving, and it can separate multiple arbitrary overlapping orthogonal inputs without fundamental splitting loss.

Figure 1A:
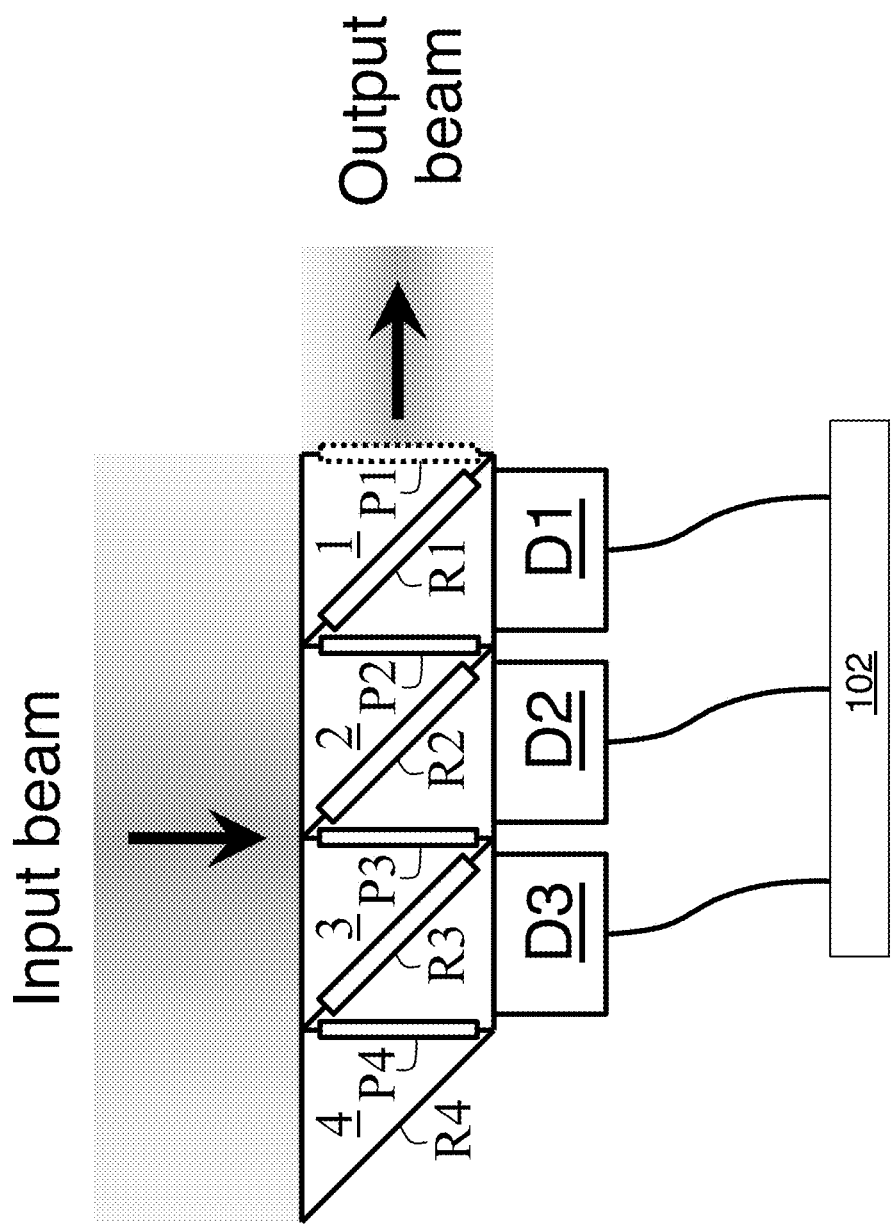
FIGS. 1A-B show exemplary embodiments of the invention (wave combiners) having detectors at the control ports.
Figure 1B:
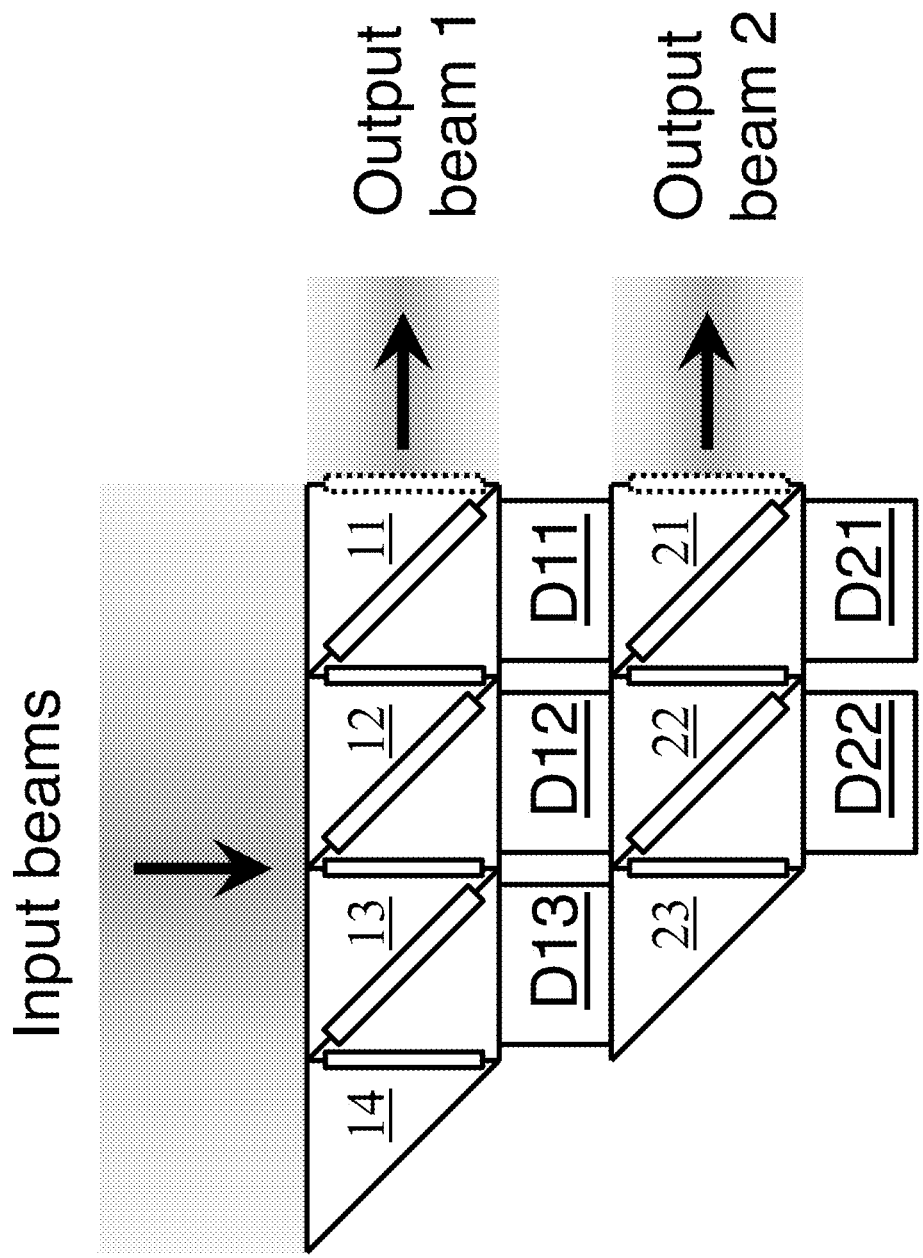

FIGS. 1A-B show a conceptual schematic of the approach. Diagonal rectangles represent controllable partial reflectors. Vertical rectangles represent controllable phase shifters. FIG. 1A shows a coupler for a single input beam with four beam splitter blocks (numbered 1-4), phase shifters P1-P4 and controllable partial reflectors R1-R3 (R4 is a normal high reflectance mirror that need not be controllable). Detectors D1-D3 provide signals that go to feedback electronics 102. FIG. 1B shows a coupler for two simultaneous orthogonal input beams (connections from detectors to feedback electronics omitted for clarity).

For illustration we divide the arbitrary input beam into 4 pieces, each incident on a different one of the 4 beam splitter blocks. Each block includes a variable reflector (except number 4, which is 100% reflecting) and a phase shifter. (The phase shifter P1 is optional, allowing the overall output phase of the beam to be controlled.) For simplicity, we consider a beam varying only in the lateral direction. We presume loss-less devices whose reflectivity and phase shift can be set independently, for example, by applied voltages for electrooptic or thermal control. For the moment, we neglect diffraction inside the optics and presume that the phase shifters, reflectors, and detectors operate equally on the whole beam going through one beamsplitter.

We shine the input beam onto the beamsplitter blocks as shown. To start, the phase shifter and reflectivity settings can be arbitrary as long as the reflectivities are non-zero so that we start with non-zero powers on the detectors. First, we adjust the phase shifter P4 to minimize the power on detector D3. Doing so ensures that the wave reflected downwards from beamsplitter 3 is in antiphase with any wave transmitted from the top through beamsplitter 3. Then we adjust the reflectivity R3 to minimize the power in detector D3 again, now completely cancelling the transmitted and reflected beams coming out of the bottom of beamsplitter 3. (If there are small phase changes associated with adjusting reflectivity, then we can iterate this process, adjusting the phase shifter again, then the reflectivity, and so on, to minimize the D3 signal.)

We then repeat this procedure for the next beamsplitter block, adjusting first phase shifter P3 to minimize the power in detector D2, and then reflectivity R2 to minimize the D2 signal again. We repeat this procedure along the line of phase shifters, beamsplitters and detectors. Finally, all the power in the incident beam emerges from the output port on the right. This approach could also be used to coherently combine multiple beams of the same frequency but of unknown relative phases, as in fiber laser systems, with each beam incident on a separate beamsplitter block.

Unlike typical adaptive optical schemes, this method is progressive rather than iterative—the process is complete once we have stepped once through setting the elements one by one—and only requires local feedback for minimization on one variable at a time—no global calculation of a merit function or simultaneous multiparameter optimization is required. Simple low-speed electronics could implement the feedback.

To optimize this beam coupling continually, we can leave this feedback system running as we use the device, stepping through the minimizations as discussed. This would allow real-time tracking and adjustments for misalignments or to retain coupling to moving sources. For static sources, we could use an alternate algorithm based only on maximizing output beam power (see section A2 below).

Figure 2C:
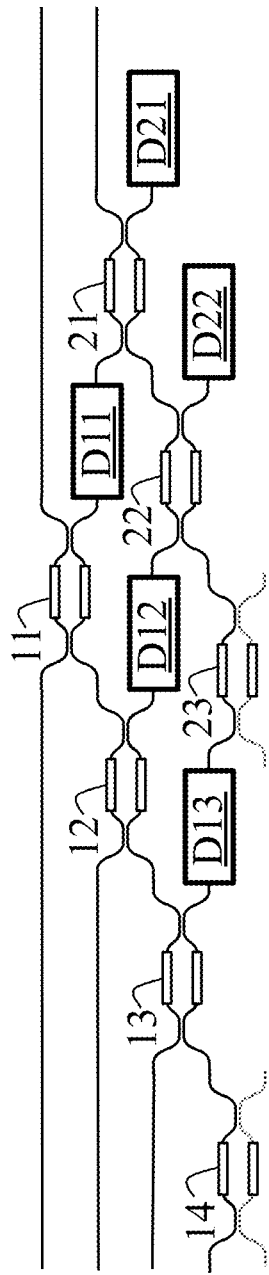

FIGS. 2A-C show waveguide versions based on Mach-Zehnder interferometers (MZIs) as the adjustable "reflectors" and phase shifters. Device numberings correspond to those of FIGS. 1A-B. FIG. 2A shows a coupler for a single input beam divided into 4 pieces. FIG. 2B shows a coupler as in FIG. 2A with dummy devices (in dashed line boxes) added to ensure equal path lengths and background losses. FIG. 2C shows a coupler for two simultaneous modes. The lower portions in the bottom row of Mach-Zehnder devices are optional arms for symmetry only; simple controllable phase shifters could be substituted for these Mach-Zehnder devices.

A MZI gives variable overall phase shift of both outputs based on the common mode drive of the controllable phase elements in each arm and variable "reflectivity" (i.e., splitting between the output ports) based on the differential arm drive. Such a waveguide approach avoids diffractions inside the apparatus and allows equal path lengths for all the beam segments. Equal path lengths are important for operation over a broad wavelength range or bandwidth; otherwise the relative propagation phase changes with wavelength in the different waveguide paths.

For further equality of beam paths and losses, we could add dummy MZIs in paths 1, 2, and 3, respectively, as shown in FIG. 2B, to give the same number of MZIs in every beam path through the device; the dummy devices would be set so as not to couple between the adjacent waveguides (i.e., the "bar" rather than the "cross" state), and to give a standard phase shift. Note that as long as no power is lost from the system out of the "open" arms—here, the top right ports of the top two dummy devices in FIG. 2B—the settings of these dummy devices are not critical; the subsequent setting of MZIs 1-4 can compensate for any such loss-less modification of the input waves. We could add further detectors at those top right ports, adjusting the dummy MZI reflectivities to minimize the signals in such detectors, ensuring loss-less operation. We note that systems with large numbers (e.g., 2048) of MZIs have been demonstrated experimentally, with low overall loss.

An alternative scheme to that of FIGS. 2A-B using a binary tree of devices for coupling to a single input beam is presented in section A3.

To use the waveguide scheme with a spatially continuous input beam, we need to put the different portions of the beam into the different waveguides. We could use one grating coupler per waveguide as explored for angular momentum beams or phased-array antennas. For full 2D arrays, we need space to pass the waveguides between the grating couplers.

Figure 3:
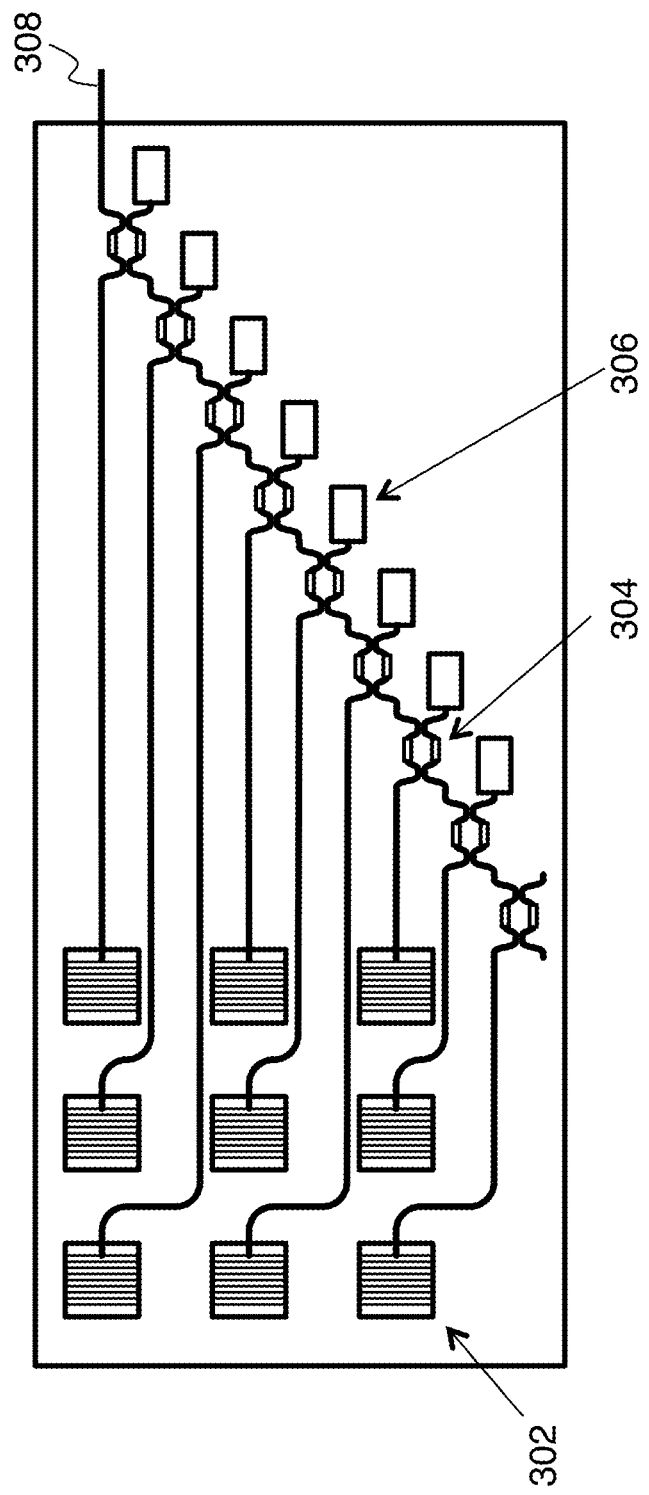
FIG. 3 shows use of grating couplers to sample an incident optical beam into several waveguides.

FIG. 3 shows a top-view schematic of an array of grating couplers 302 with a set of Mach-Zehnder devices 304 and detectors 306 to produce one beam at the output waveguide 308, analogous to FIG. 2A. For graphic simplicity, we omit here any additional lengths of waveguide and possible dummy Mach-Zehnder devices to equalize path lengths and losses. A lenslet array can be added to this example to improve the fill factor. The input beam is shone onto the grating coupler surface or onto the lenslet array.

We could either allow an imperfect fill factor, shining the whole beam onto the top of the grating coupler array, or we could use an array of lenslets focusing the beam portions onto the grating couplers to improve the fraction of the beam that lands on the grating couplers. Grating coupler approaches are also known that can separate polarizations to two separate channels, allowing the input mode of interest to have arbitrary polarization content at the necessary expense of twice as many channels in the device overall.

We can extend this concept to detecting multiple orthogonal modes simultaneously. In this case, we would use detectors that were mostly transparent, such as silicon defect-enhanced photodetectors in telecommunications wavelength ranges, sampling only a small amount of the power and transmitting the rest. In this case, (FIGS. 1B and 2C), we first set the "top" row of phase shifts and reflections (devices 11-14) as before while shining the first beam on the device, which gives output beam 1. Then, if we shine a second, orthogonal beam on the device, it will transmit completely through the "top" row of beamsplitters and photodetectors, becoming an input beam for the second row. We then use the same alignment process as before, now with the second row of phase shifters and reflectors (devices 21-23), and the detectors D21-D22, leading to output beam 2. We can repeat this process for further orthogonal beams using further rows, up to the point where the number of rows of beamsplitters (and the number of output beams) equals the number of beamsplitter blocks in the first row. (Generally, we can leave all the preceding beams on, if we wish, as we adjust for successive added orthogonal beams.) We could analogously apply the same approach to the structure of FIG. 3, adding further "rows" as in FIG. 2C to allow simultaneous detection of multiple orthogonal 2D beams shone on the grating couplers or lenslets.

We could also add some identifying coding to each orthogonal input beam, such as a small amplitude modulation at a different frequency for each beam; then, we can have all beams on at once, with each detector row set to look only for the specific frequency of one beam. Such an approach, combined with continuous cycling through the different rows as above, allows continuous tracking and alignment adjustment of all the beams.

The number of portions or subdivisions we need to use for a given beam depends on how complex a mode we want to select or how complicated a correction we want to apply. If we want to be able to select one specific input mode form out of $M_I$ orthogonal possibilities, we need at least $M_I$ beamsplitter blocks in the (first) row. Subsequent rows to select other specific modes from this set need, progressively, one fewer beamsplitter block.

At radio or microwave frequencies, we could use antennas instead of grating couplers. Various microwave splitters and phase shifters are routinely possible. Use of nanometallic or plasmonic antennas, waveguides, modulators and detectors is also conceivable for subwavelength circuitry in optics, allowing possibly very small and highly functional mode separation and detection schemes.

In conclusion, we have shown a general method for coupling an arbitrary input beam to one specific output beam, such as a waveguide mode, with an automatic method for setting the necessary coefficients in the array of adjustable reflectors and phase shifters based on signals from photodetectors, and with extensions to allow multiple orthogonal input beams to be separated without fundamental splitting loss. This should open a broad range of flexible and adaptable optical functions and components, with analogous possibilities for other forms of waves such as microwaves and acoustics.

A2) Single Detector Alignment

Figure 4A:
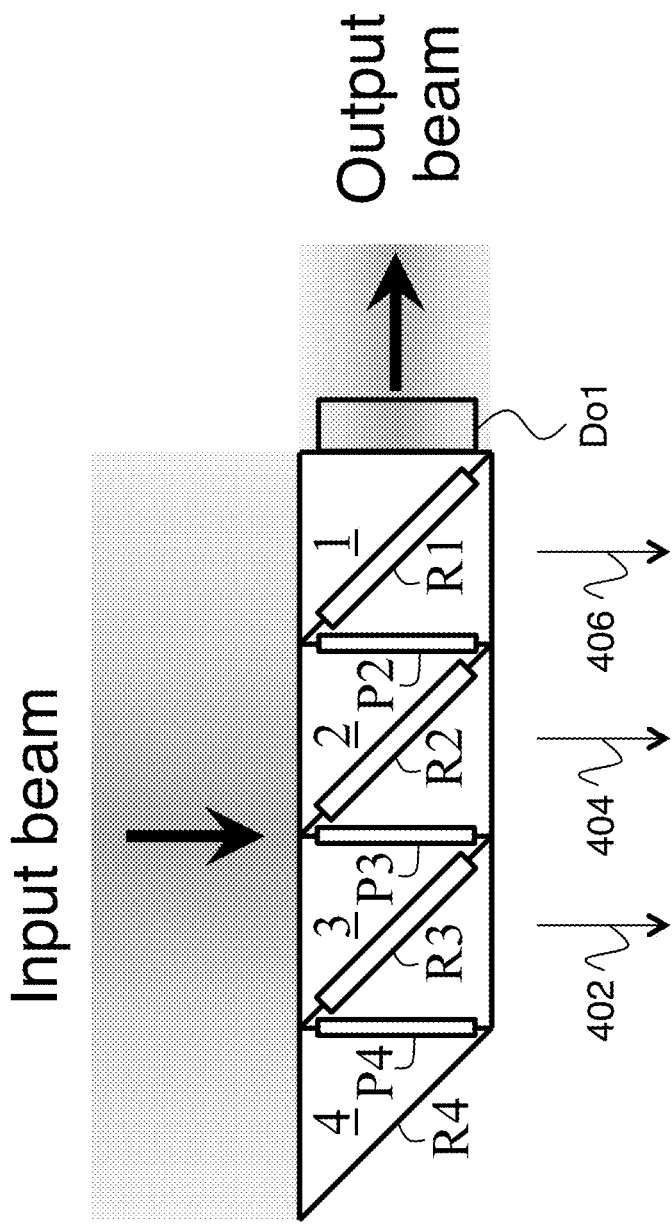
FIGS. 4A-B show exemplary embodiments of the invention (wave combiners) having detectors at the outputs.
Figure 4B:
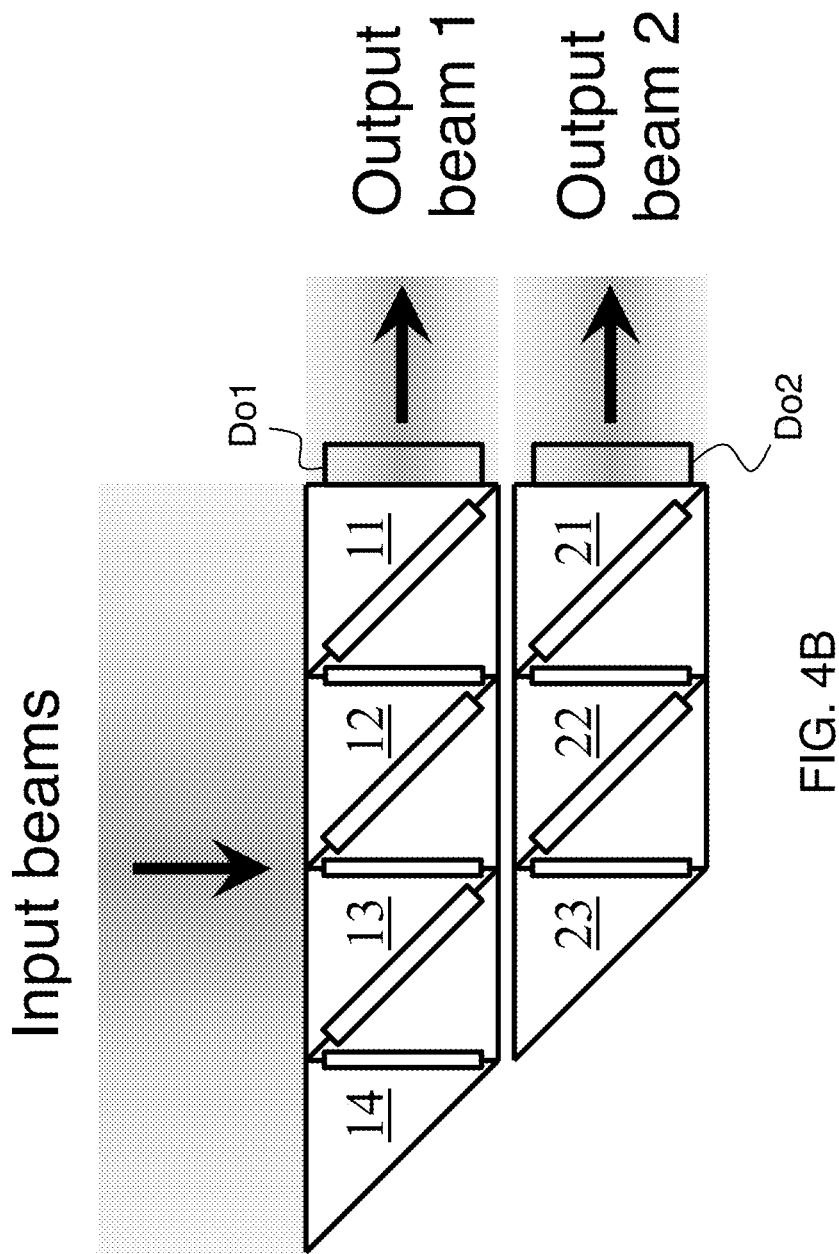

As an alternative to the use of multiple detectors when aligning a single beam with the device, we could use only a detector in the output beam, with a different algorithm. FIGS. 4A-B show single output and multiple output versions of this, respectively. Detectors Do1 and Do2 are placed in the path of the output beams. Preferably these detectors are nearly transparent as indicated above. We first set all the reflectors in the beam splitter blocks in FIG. 4A to be 100% transmitting, except the last one—beamsplitter block 4, which is set permanently to 100% reflection—and the second last one (block 3), which we set to some intermediate value of reflectivity. Then, monitoring detector Do1 in the output beam, we adjust the phase shifter P4 on the right of beamsplitter block 4 to maximize the output power. We then adjust the reflectivity R3 in beamsplitter block 3 to maximize the output power again (these two steps in sequence arrange that there is no power emerging from the bottom of block 3). We then proceed along the beamsplitter blocks in a similar fashion, setting the next beamsplitter reflectivity to some initial intermediate value, adjusting the phase shifter just to its left to maximize the output, then adjusting the reflectivity in this block to maximize output again, and so on along the beamsplitter blocks. (In this case, we would not be able to do continuous feedback on the settings while the system was running because we need to set some of the reflectors temporarily to 100% transmission during the optimization steps.)

A3) Alternative Configuration

Figure 5:
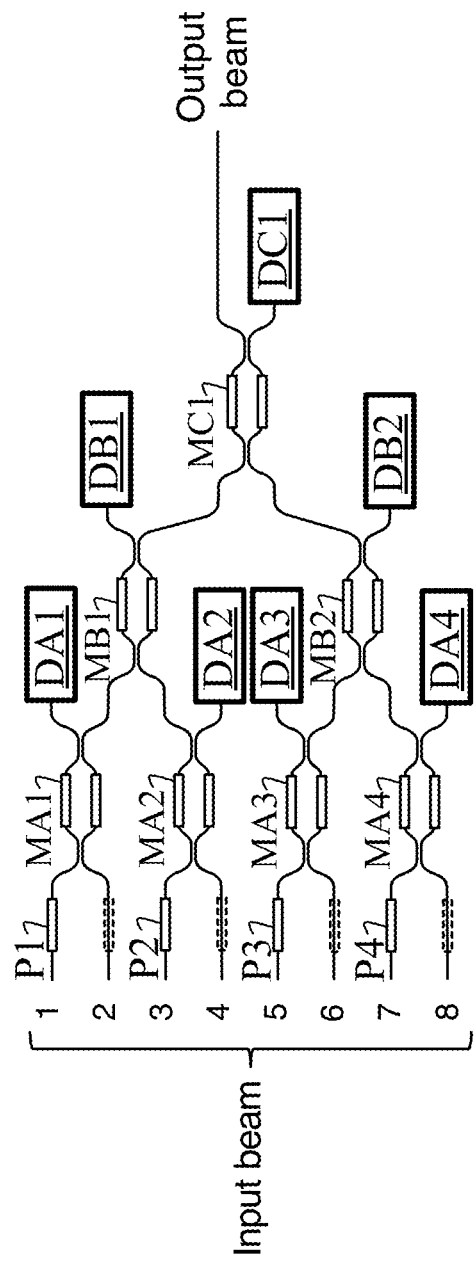
FIG. 5 shows a binary tree arrangement of Mach-Zehnder modulators.

For coupling a single beam, an alternate configuration of phase shifters, MZ interferometers and detectors is shown in FIG. 5. In this approach, phase shifter P1 is adjusted to minimize the signal in detector DA1, and then the split ratio ("reflectivity") of MZI MA1 is adjusted through differential drive of the arms to minimize the DA1 signal again. Similar processes can be used simultaneously with P2, DA2 and MA2, with P3, DA3 and MA3, and with P4, DA4 and MA4. Next, the overall phase is adjusted in MA1 to minimize signal in DB1, and then the split ratio ("reflectivity") of MB1 is adjusted to minimize DB1 signal again. A similar process can be run simultaneously with MA3, DB2 and MB2. Finally, in this example, the phase in MB1 is adjusted to minimize DC1 signal, and then the split ratio ("reflectivity") of MC1 is adjusted to minimize DC1 signal again. Dummy phase shifters (dashed lines) can be incorporated in the input paths for beams 2, 4, 6, and 8, as shown to help ensure equality of path lengths in the system overall.

This approach has the advantages of requiring no dummy interferometers and allowing simultaneous feedback loop adjustments, first in the DA column of detectors, then in the DB column, and finally in the DC column. In contrast to the approach of FIG. 2A, the MZI devices are arranged in a binary tree rather than a linear sequence, and so the device is shorter and a given beam travels through fewer MZI devices, possibly reducing loss. It would be possible to extend this approach also for coupling multiple orthogonal beams (e.g., by using beams transmitted through mostly transparent versions of the detectors and into analogous trees of devices); but, in contrast to the approach of FIG. 2C, we would require crossing waveguides and/or multiple stacked planar circuits if we used a planar optical approach.

A4) N to 1 and 1 to N Operation

The device of FIG. 1A can be regarded as an example of a coherent N to one wave combiner having N≥2 inputs and a single output. The combiner includes a coherent wave superposition network that is substantially linear, reciprocal and lossless, and which includes one or more series-connected 2×2 wave splitters configured such that the contribution of each of the N inputs to the output is adjustable in both amplitude and relative phase. The coherent wave superposition network provides N−1 control ports at which waves not coupled to the output are emitted. N−1 detectors are disposed at the control ports. Amplitude splits and phase shifts of the coherent wave superposition network are determined in operation by adjusting them in sequence (e.g., P4, then R3, then P3, then R2 etc.) to sequentially null signals (e.g., from D3, then from D2, then from D1) from the N−1 detectors. The 2×2 wave splitters can be implemented as waveguide Mach-Zehnder interferometers, e.g., as on FIGS. 2A-B.

The extension to the multiple output case can be regarded as providing one N to 1 wave combiner as described above for each output. More specifically, a coherent P input to Q output wave combiner having P≥2 and Q≤P would include Q single output combiners as described above. These combiners can indexed by an integer i (1≤i≤Q), where combiner i for 1≤i≤min(Q, P−1) is a P+1−i to one combiner as above. Inputs of combiner i for i≥2 are provided by the control ports of combiner i−1. The detectors of combiner i for i<Q are tap detectors that absorb less than 50% (preferably 10% absorption or less) of the incident light and transmit the remainder. FIGS. 1B and 2C show examples of the P=4, Q=2 case.

Similarly, the device of FIG. 4A can also be regarded as an example of a coherent N to one wave combiner having N≥2 inputs and a single output. The combiner includes a coherent wave superposition network that is substantially linear, reciprocal and lossless, and which includes one or more series-connected 2×2 wave splitters configured such that the contribution of each of the N inputs to the output is adjustable in both amplitude and relative phase. The coherent wave superposition network provides N−1 control ports (e.g., 402, 404, and 406 on FIG. 4A) at which waves not coupled to the output are emitted. An output detector is disposed at the output. Amplitude splits and phase shifts of the coherent wave superposition network are determined in operation by adjusting them in sequence (e.g., P4, then R3, then P3, then R2 etc.) to maximize the signal from the output detector. The 2×2 wave splitters can be implemented as waveguide Mach-Zehnder interferometers. The output detector is preferably a tap detector that absorbs less than 50% (more preferably 10% absorption or less) of the incident light and transmits the remainder.

FIG. 4B shows a multi-output example of the approach of FIG. 4A. More specifically, a coherent P input to Q output wave combiner having P≥2 and Q≤P would include Q single output combiners as described above in connection with FIG. 4A. These combiners can indexed by an integer i (1≤i≤Q), where combiner i for 1≤i≤min(Q, P−1) is a P+1−i to one combiner as above. Inputs of combiner i for i≥2 are provided by the control ports of combiner i−1.

The preceding examples all relate to wave combiners having a number of outputs that is less than or equal to the number of inputs. It is also possible to implement structures having a number of outputs that is greater than or equal to the number of inputs. It is convenient to refer to such structures as wave mode synthesizers. The reason for these names can be most clearly seen in the N to 1 and 1 to N cases. An N to 1 device is clearly a combiner, while a 1 to N device synthesizes a mode pattern of its N outputs based on its input.

Figure 6A:
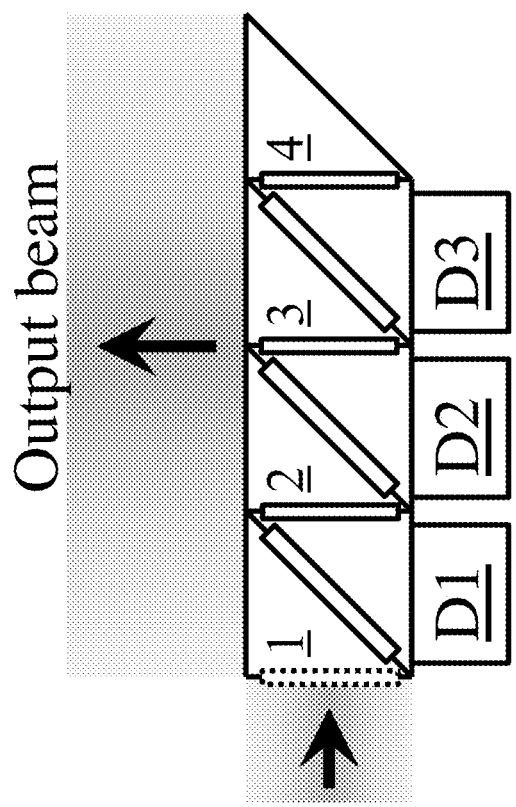
FIGS. 6A-B show exemplary embodiments of the invention (wave mode synthesizers) having detectors at the control ports.
Figure 6B:
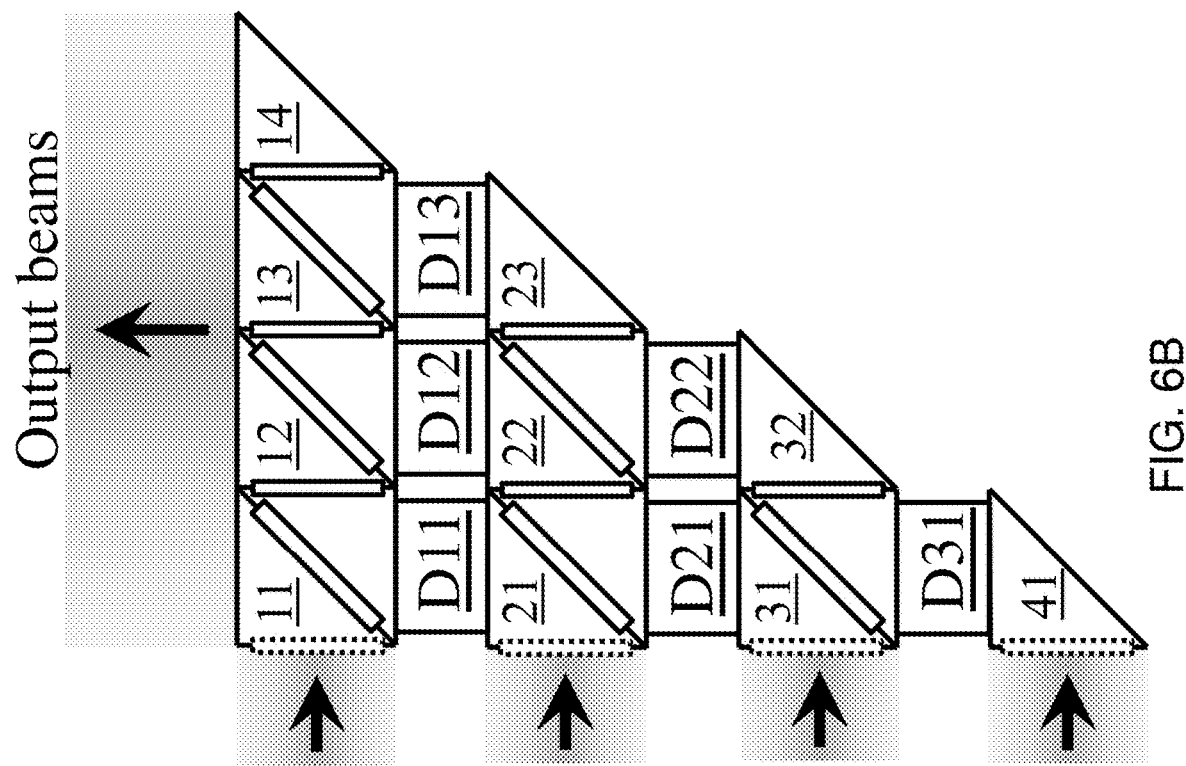
Figure 6C:
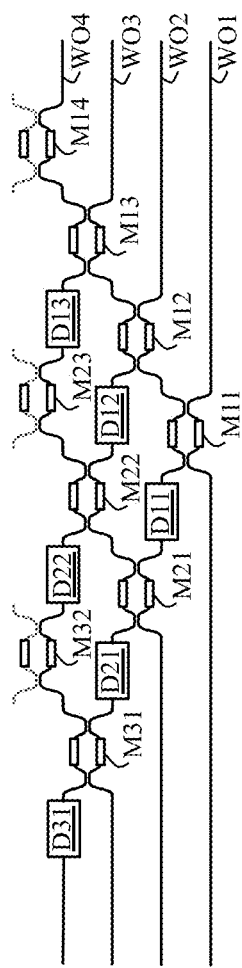
FIG. 6C shows an MZM implementation of the example of FIG. 6B.

Operation of wave mode synthesizers will be described in detail below, so here it will be convenient to illustrate some of the possible configurations for wave mode synthesizers. FIG. 6A shows a wave mode synthesizer having 1 input and 4 outputs. It is analogous to the wave combiner of FIG. 1A. FIG. 6B shows a 4×4 wave mode synthesizer. FIG. 6C shows an MZM implementation of the example of FIG. 6B.

The device of FIG. 6A can be regarded as an example of a coherent one to N wave mode synthesizer having one input and N≥2 outputs. The wave mode synthesizer includes a coherent wave superposition network that is substantially linear, reciprocal and lossless, and which includes one or more series-connected 2×2 wave splitters configured such that the contribution of the inputs to each of the N outputs is adjustable in both amplitude and relative phase. The coherent wave superposition network provides N−1 control ports at which waves incident on the outputs can be emitted. N−1 detectors are disposed at the control ports.

Amplitude splits and phase shifts of the coherent wave superposition network are determined in operation by adjusting them in sequence (e.g., P4, then R3, then P3, then R2 etc.) to sequentially null signals (e.g., from D3, then from D2, then from D1) from the N−1 detectors when the N outputs are illuminated with a phase-conjugated version of a desired output mode, as described in greater detail below. The 2×2 wave splitters can be implemented as waveguide Mach-Zehnder interferometers.

The extension to the multiple input case can be regarded as providing one 1 to N wave mode synthesizer as described above for each input. More specifically, a coherent Q input to R output wave mode synthesizer having Q≥2 and Q≤R would include Q wave mode synthesizers. These mode synthesizers can be indexed by an integer i ($1 \le i \le Q$), where each mode synthesizer i for $1 \le i \le \min(Q, R-1)$ is a one to $R+1-i$ mode synthesizer as above. Outputs of mode synthesizer i for $i \ge 2$ are provided to the control ports of mode synthesizer $i-1$ as inputs. The detectors of mode synthesizer i for $i < R$ are tap detectors that absorb less than 50% (preferably absorption is 10% or less) of the incident light and transmit the remainder. FIG. 6B shows the Q=R=4 case, and from here it is apparent why the Q=R=4 case only has three mode synthesizers as in FIG. 6A—the last row on FIG. 6B (i.e., block 41) is trivial, having no adjustable reflector. More generally, the last row of any Q=R wave mode synthesizer, or of any P=Q wave combiner is similarly trivial.

Figure 7A:
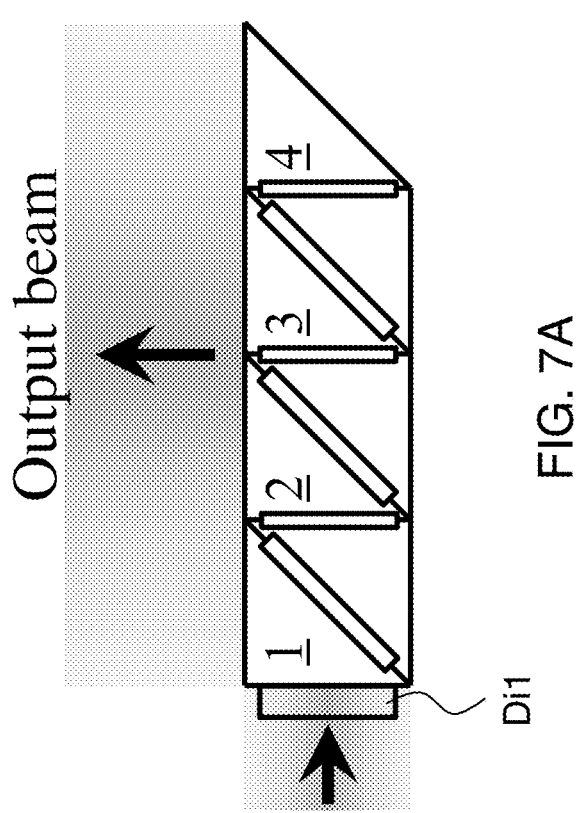
FIGS. 7A-B show exemplary embodiments of the invention (wave mode synthesizers) having detectors at the inputs.
Figure 7B:
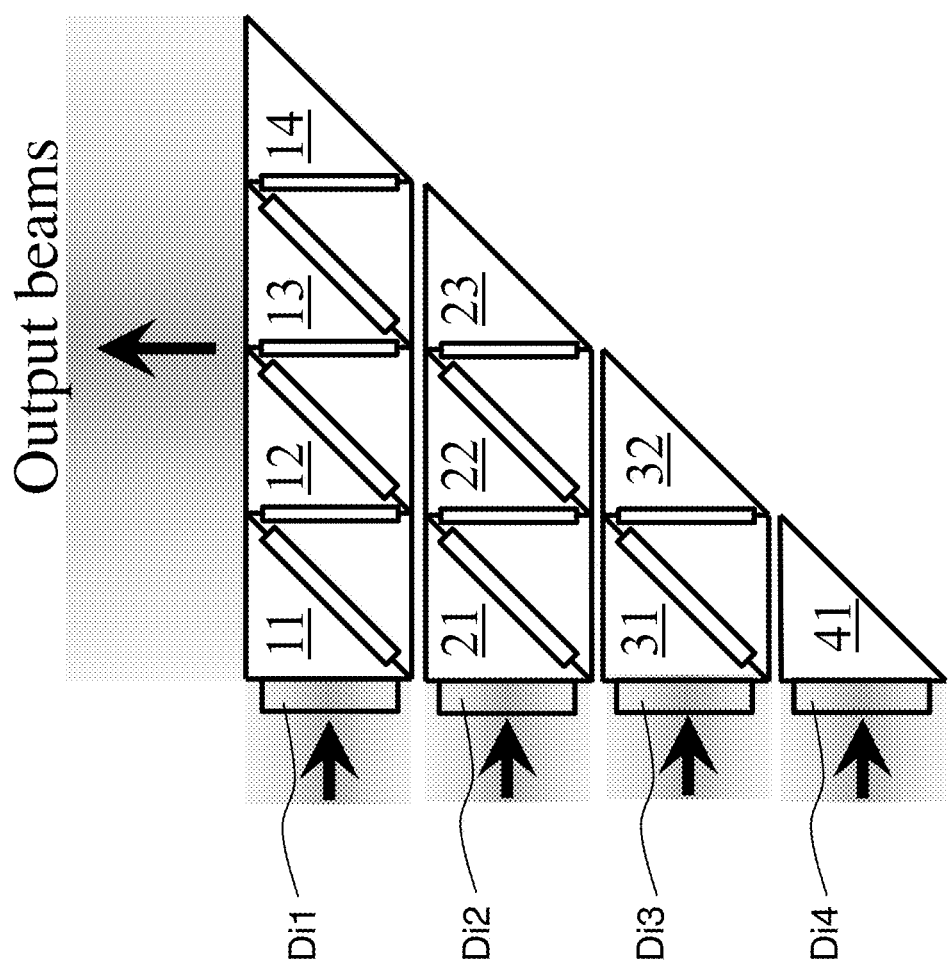

The wave mode synthesizers described thus far have detectors at the control ports. It is also possible to have the detectors at the inputs instead, analogous to the case of wave combiners with detectors at the outputs. FIG. 7A shows a wave mode synthesizer having an input detector Di1 (analogous to the combiner of FIG. 4A with its output detector). FIG. 7B shows a 4×4 wave mode synthesizer having input detectors Di1, Di2, Di3, and Di4 (analogous to the combiner of FIG. 4B with its output detectors).

The device of FIG. 7A can be regarded as an example of a coherent one to N wave mode synthesizer having one input and $N \ge 2$ outputs. The mode synthesizer includes a coherent wave superposition network that is substantially linear, reciprocal and lossless, and which includes one or more series-connected 2×2 wave splitters configured such that the contribution of the input to each of the N outputs is adjustable in both amplitude and relative phase. The coherent wave superposition network provides N−1 control ports at which waves incident on the outputs can be emitted. An input detector is disposed at the input and is capable of detecting radiation incident on the outputs that is coupled to the input. Amplitude splits and phase shifts of the coherent wave superposition network are determined in operation by adjusting them in sequence to maximize a signal from the input detector when the N outputs are illuminated with a phase-conjugated version of a desired output mode. The input detector is preferably a tap detector that absorbs less than 50% (more preferably less than 10%) of the incident light and transmits the remainder.

The extension of this to the multiple input case can be regarded as providing one 1 to N wave mode synthesizer as above for each of the inputs. More specifically, a coherent Q input to R output wave mode synthesizer having $Q \ge 2$ and $Q \le R$ includes Q mode synthesizers indexed by an integer i ($1 \le i \le Q$). Each mode synthesizer i for $1 \le i \le \min(Q, R-1)$ is a one to $R+1-i$ mode synthesizer as above. Outputs of mode synthesizer i for $i \ge 2$ are provided to the control ports of mode synthesizer $i-1$ as inputs.

B) Universal Linear Component

In this section, we show how to construct an optical device that can configure itself to perform any linear function or coupling, of arbitrary strength, between inputs and outputs. The device is configured by training it with the desired pairs of orthogonal input and output functions, using sets of detectors and local feedback loops to set individual optical elements within the device, with no global feedback or multiparameter optimization required. Simple mappings, such as spatial mode conversions and polarization control, can be implemented using standard planar integrated optics. In the spirit of a universal machine, we show that other linear operations, including frequency and time mappings, as well as non-reciprocal operation, are possible in principle, thus proving there is at least one constructive design for any conceivable linear optical component; such a universal device can also be self-configuring. This approach is general for linear waves, and could be applied to microwaves, acoustics and quantum mechanical superpositions.

B1) Introduction

There has been growing recent interest in optical devices that can perform functions such as converting spatial modes from one form to another, offering new kinds of optical frequency filtering, providing optical delays, or enabling invisibility cloaking. All these operations are linear. Many other linear transformations on waves are mathematically conceivable, involving spatial form, polarization, frequency or time, and non-reciprocal operations. Despite the mathematical simplicity of defining such linear operations, it has apparently not generally been understood how to execute an arbitrary linear operation on waves physically, even in principle. The usual linear optical components, such as lenses, gratings and mirrors, only implement a subset of all the possible linear relations between inputs and outputs. Other components such as volume holograms or matrix-vector multipliers can implement more complex relations; it is difficult, however, to make such approaches efficient—for example, avoiding a loss factor of 1/M when working with M different beams. Interactions between designs for different inputs leave it unclear how, or even if, we could design and/or fabricate an efficient arbitrary design constrained only by general physical laws. Indeed, some designs resort to blind optimization based in part on random or exhaustive searches among designs with no guarantee of the existence of any solution. Even with some design approach for an arbitrary desired linear operation, the resulting device could be quite complicated. Furthermore, operations on waves can require interferometric precision, and configuring many analog elements precisely to construct such a design could be very challenging.

In section A above, we showed how to make a self-aligning optical beam coupler that can configure itself to couple arbitrary input spatial beams to simple beam outputs (e.g., single-mode waveguides). Here, first, we extend that work, using the mathematical understanding of arbitrary linear optical components, to show how to make an optical device that can perform an arbitrary spatial mapping between inputs and outputs. This device shares with the self-aligning beam coupler the feature that all the necessary analog settings of individual optical components to define the necessary mode mappings can be set based on local feedback loops, each adjusting only a single measurable quantity. Though we show we can calculate the design values externally, the use of these feedback loops avoids the calibration of multiple analog components so they can be set precisely to calculated design values. Such spatial devices could be implemented with current integrated optics technologies.

We then extend the device concept to show in principle how arbitrary linear optical devices can be constructed, including polarization, frequency, temporal, and non-reciprocal linear functions. In the spirit of a universal machine, such as the Turing machine in computing, this approach therefore proves that there is at least one constructive approach to an optical device that can perform any linear operation on waves. This general approach shares the ability of the simpler spatial devices that the device can configure itself to perform such arbitrary linear operations, again based only on simple local feedback loops.

We discuss the basic device concept for spatial beams in Section B2. The mathematics is developed further in Section B3. We generalize to a universal linear optical machine in Section B4. Section B5 relates to an approach for calculating the reflectivities and phase shifts a priori. Further details relating to the Mach-Zehnder implementations are given in Section B6, and we draw conclusions in Section B7.

B2) Spatial Beams

Figure 8A:
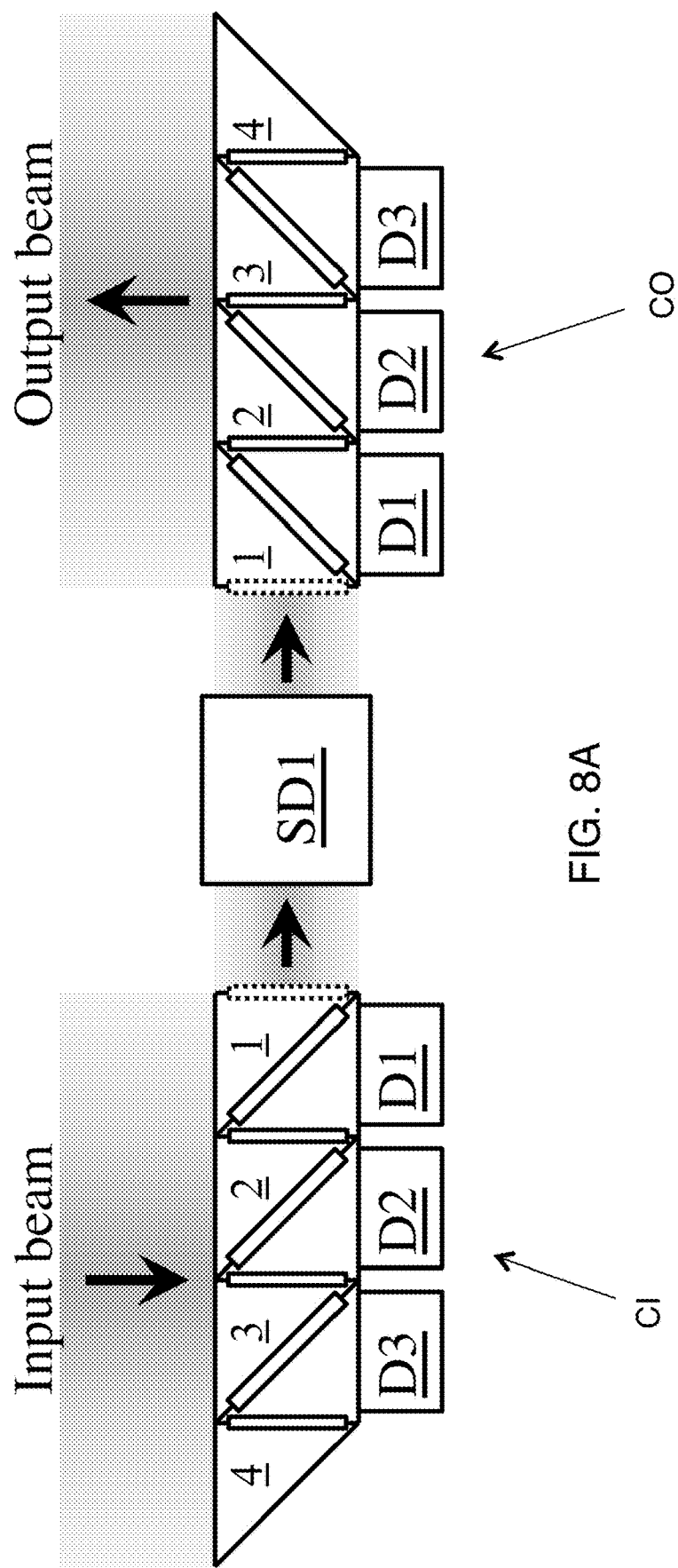
Figure 8B:
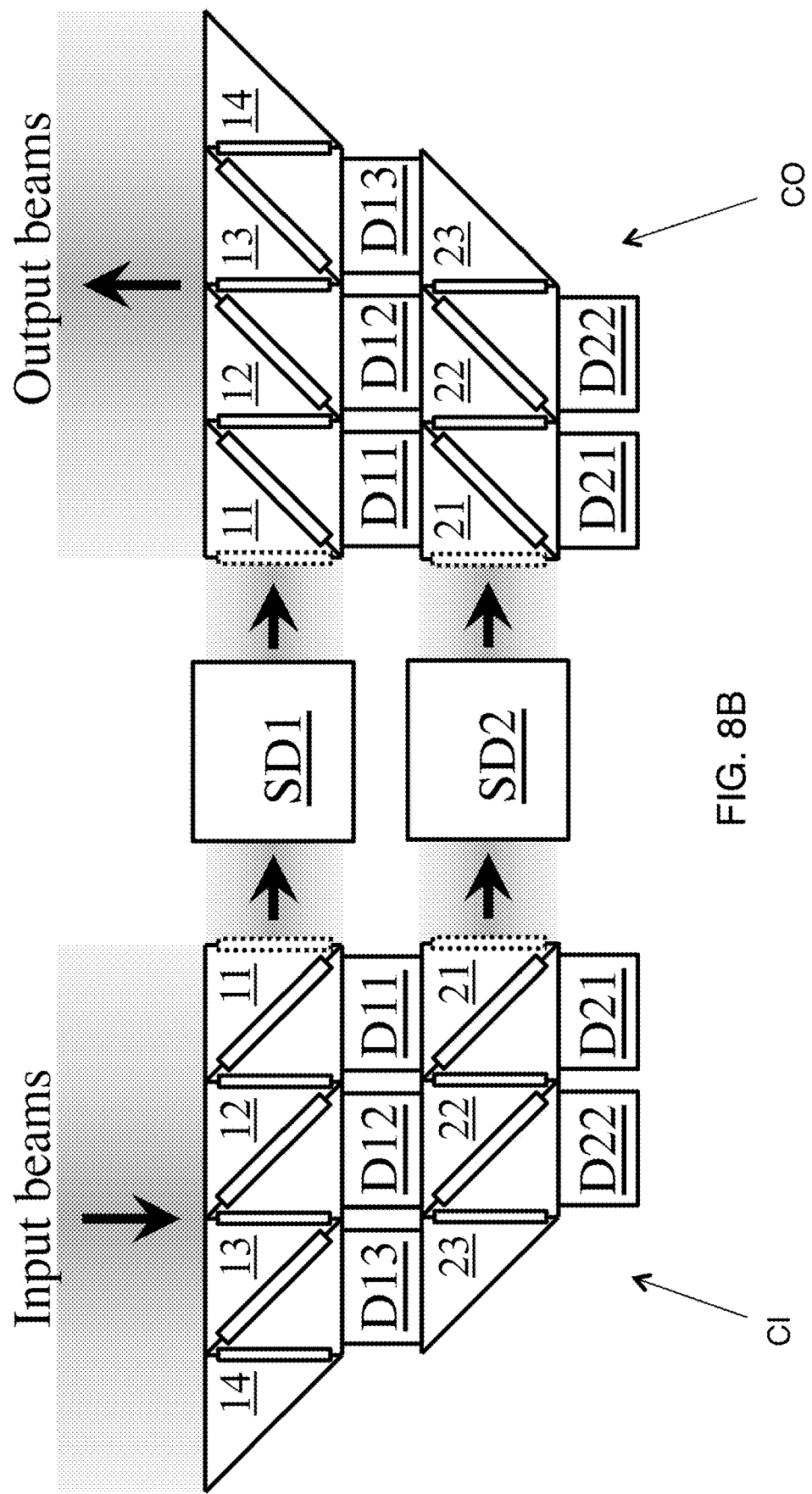

The concept of the approach is shown in FIGS. 8A-C, illustrated here first for a spatial mode example with the inputs and outputs sampled to four channels. It includes two self-aligning universal wave couplers, one, CI, at the input, and another, CO, at the output. These are connected back-to-back through modulators (SD1, SD2, SD3, and SD4) that can set amplitude and phase; these modulators could also incorporate gain elements. The self-aligning couplers require controllable reflectors and phase shifters together with photodetectors that are connected in selectable feedback loops to control the reflectors and phase shifters. Dashed rectangle phase shifters are not required, but may be present depending on the way the devices are implemented, and might be desirable for symmetry and equality of path lengths.

We presume that, for our optical device, we know what set of orthogonal inputs we want to connect, one by one, to what set of orthogonal outputs. If we know what we want the component to do, any linear component can be completely described this way. The simplest case is that we want the device to convert from one spatial input mode to one spatial output mode (FIG. 8A).

B2.1) Single-Beam Case

To train the device as in FIG. 8A, we first shine the input mode or beam onto the top of the input self-aligning coupler CI. Then we proceed to set the phases and reflectivities in the beam splitter blocks in CI as described above. Briefly, this involves first setting phase shifter P4 to minimize the power in detector D3; this aligns the relative phases of the transmitted and reflected beams from the bottom of beamsplitter 3 so that they are opposite, therefore giving maximum destructive interference. Then we set the reflectivity R3 to minimize the D3 signal again; presuming that the change of reflectivity makes no change in phase, the D3 signal will now be zero because of complete cancellation of the reflected and transmitted light. Next, we set phase shifter P3 to minimize the D2 signal, then adjust R2 to minimize the D2 signal again. Proceeding along all the beamsplitter blocks in this way will lead to all the power in the input mode emerging in the single output beam on the right.

The second part of the training is to shine a reversed (technically, phase-conjugated) version of the desired output mode onto the output coupler CO; that is, if we want some specific mode to emerge from the device (i.e., out of the top of CO), then we should at this point shine that mode back into this "output". We set the values of the phase shifters and reflectivities in coupler CO by a similar process to that used for coupler CI, which will lead to this "reversed" beam emerging from the left of the row of beamsplitter blocks, for the moment going backwards into modulator SD1 from the right.

Now that we have set the required reflectivity and phase values in coupler CO, we imagine that we turn off the training beam that was shining backwards onto the top of coupler CO and shine a beam instead from the output of modulator SD1 into CO. It is obvious that will lead to all the power coming out of the top of coupler CO and that the resulting amplitudes (and powers) of beams emitted from the tops of the beamsplitters will be the same as the ones incident during the training. To understand why the phases are set using a phase conjugate beam during training, we can formally derive the mathematics of the design, as discussed below and in section B5; we can also understand this intuitively. Note, for example, that if, during training, the (backward) beam incident on the top of beamsplitter block 4 (of CO) had a slight relative phase lead compared to that incident on the top of beamsplitter block 3 (as would be the case if it was a plane wave incident from the top right), then we would have added a phase delay in phase shifter P4 to achieve constructive interference along the line of beam splitters. Running instead in the "forward" mode of operation, then, the beam that emerges vertically from beamsplitter block 4 will now have a phase delay compared to that emerging from block 3 (as would be the case if it was a plane wave heading out to the top right). The resulting phase front emerging from the top of coupler CO is therefore of the same shape (at least in this sampled version) as the backward (phase conjugated) beam we used in training, but propagating in the opposite direction as desired.

So, with the device trained in this way, shining the desired input mode onto CI will lead to the desired output mode emerging from CO. Finally, we set modulator SD1 to get the desired overall amplitude and phase in the emerging beam; choosing these is the only part of this process that does not set itself during the training. Modulator SD1 could also be used to impose a modulation on the output beam, and an amplifier could also be incorporated here if desired for larger output power.

B2.2) Multiple Beam Case

The process can be extended to more than one orthogonal beam. In FIG. 8B, having trained the device for the desired "first" input and output beams, we can now train it similarly with a "second" pair of input and output beams that are orthogonal to the "first" beams. Since the device is now set so that all of the "first" beam shone onto the top of CI will emerge into modulator SD1, then any "second" beam that is orthogonal to the "first" beam will instead pass entirely into the photodetectors D11-D13 (or, actually, through them, since now we make them mostly transparent, as discussed above). Though this second beam is changed by passing through the top (first) row of beamsplitters, it is entirely transmitted through them to the second row of beamsplitter blocks. In the second row of beamsplitter blocks, we can run an exactly similar alignment procedure, now using detectors D21-D22 to minimize the signal based on adjustments of the phase shifters and reflectivities. We can proceed similarly by shining the reversed (phase conjugated) version of the desired second (orthogonal) output beam into the top of coupler CO. Then, shining the second input beam into CI will lead to the desired second output beam emerging form CO. If our device requires us to specify more than two mode couplings, we can continue this process, adding more rows until the number of rows equals the number of blocks (here 4) on the first row. FIG. 8C illustrates a device for 4 beams. Note that once we have set the device for the first 3 desired orthogonal pairs, then the final (here, fourth) orthogonal pair is automatically defined for us, as required by orthogonality. Formally, the number of rows we require in our device here is equal to the mode coupling number, $M_C$.

B2.3) Implementation with Mach Zehnder Interferometers

Figure 9:
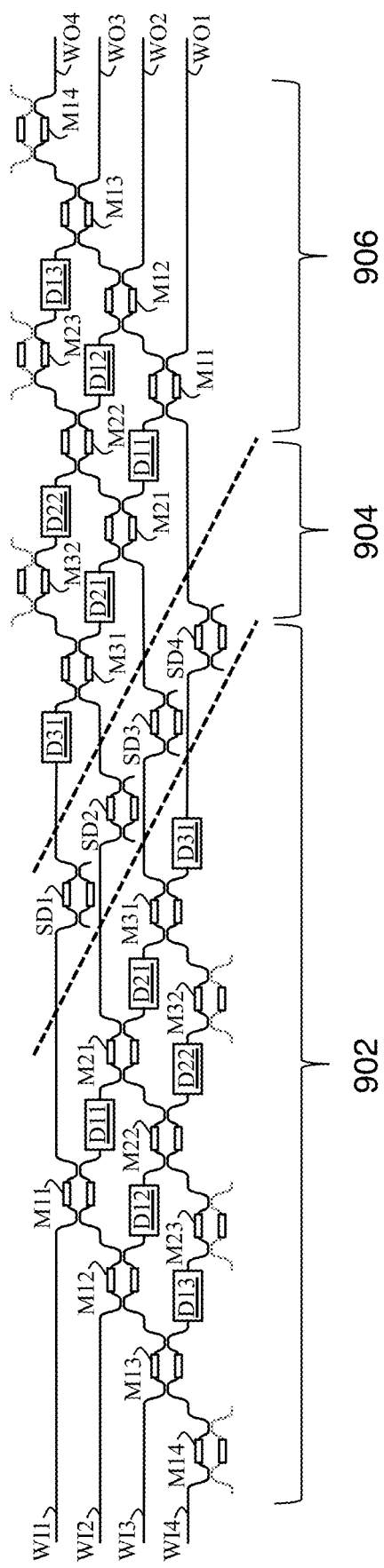
FIG. 9 shows an MZM implementation of the example of FIG. 8C.

Similarly to such bulk beamsplitter versions discussed above, the configurations in FIGS. 8A-C are idealized. We are neglecting any diffraction inside the apparatus, we are presuming that our reflectors and phase shifters are operating equally on the entire beam segment incident on their surfaces, and we are presuming that each such beam segment is approximately uniform over the beamsplitter width. The path lengths through the structure are also not equal for all the different beam paths, which would make this device very sensitive to wavelength; different wavelengths would have different phase delays through the apparatus, so the phase shifters would have to be reset even for small changes in wavelength. An alternative and more practical solution is to use Mach-Zehnder interferometers (MZIs) in a waveguide configuration; diffraction inside the apparatus is then avoided, and equalizing waveguide lengths can eliminate the excessive sensitivity to wavelength. FIG. 9 illustrates such a planar optics configuration. Here wave combiner 902 is analogous to CI of FIG. 8C, and wave synthesizer 906 is analogous to CO of FIG. 8C. Not shown are devices such as grating couplers that would couple different segments of the input and output beams into and out of the waveguides WI1-WI4 and WO1-WO4, respectively.

Common mode (i.e., equal) drive of the two phase shifting arms of such an MZI changes the phase of the output; differential (i.e., opposite) drive of the arms changes the "reflectivity" (i.e., the split ratio between the outputs) (see section B6 for a detailed discussion of the properties of the MZIs as phase shifters and variable reflectors).

The use of sets of grating couplers connected to the input waveguides WI1-WI4 and to the output waveguides WO1-WO4 is one way in which this device could be connected to the input and output beams, as discussed above. In this case, though the wave is still sampled at only a finite number of points, we can at least obtain true cancellation of the fields in the single mode guides even if the field on the grating couplers is not actually uniform. The geometry of FIG. 9 also shows that we can make a device that has substantially equal time delays between all inputs and outputs because all the waveguide paths are essentially the same length. As discussed above, such equality is important if the device is to operate over a broad bandwidth.

The example so far has considered a beam varying only in the horizontal direction, and using only four segments to represent the beam. Of course, the number of segments we need to use depends on the complexity of the linear device we want to make, and the number could well be much larger than 4; we will discuss such complexities in Section B3. Additionally, we would likely want to be able to work with two-dimensional beams, in which case we could imagine two-dimensional arrays of grating couplers coupling into the one-dimensional arrays of waveguides of FIG. 9, as discussed above.

The configuration in FIG. 9 formally differs mathematically from that in FIG. 8C in that we have reflected the output self-aligning coupler CO about a horizontal axis to achieve a more compact device. This reflection makes no difference to the operation of the device; since the device can couple arbitrary beams, the labeling or ordering of the waveguides is of no importance. (This reflection would be equivalent to similarly reflecting the self-aligning output coupler CO in FIG. 8C about a horizontal axis, which would lead to the output beam coming out of the bottom, rather than the top, of the device.) Schemes are also discussed above for ensuring equal numbers of MZIs in all optical paths for greater path length and loss equality by the insertion of dummy devices, and such schemes could be implemented here also.

B3) Mathematical Discussion

Quite generally, any linear optical device can be described mathematically in terms of a linear "device" operator D that relates an input wave, $|\phi_I\rangle$, to an output wave $|\phi_O\rangle$ through $$|\phi_O\rangle = D|\phi_I\rangle \qquad (1)$$

It can be shown that essentially any such linear operator D corresponding to a linear physical wave interaction can be factorized using the singular value decomposition (SVD) to yield an expression $$D = \sum_m s_{Dm} |\phi_{DOm}\rangle\langle\phi_{DIm}| \qquad (2)$$

or, equivalently, $$D = V D_{diag} U^\dagger \qquad (3)$$

where U (V) is a unitary operator that in matrix form has the vectors $|\phi_{DIm}\rangle$ ($|\phi_{DOm}\rangle$)) as its column vectors and $D_{diag}$ is a diagonal matrix with complex elements (the singular values) $s_{Dm}$. The sets of vectors $|\phi_{DIm}\rangle$ and $|\phi_{DOm}\rangle$ form complete orthonormal sets for describing the input and output mathematical spaces $H_I$ and $H_O$ respectively. The resulting singular values are uniquely specified, and the unitary operators U and V (and hence the sets $|\phi_{DIm}\rangle$ and $|\phi_{DOm}\rangle$ are also unique (at least within phase factors and orthogonal linear combinations of functions corresponding to the same magnitude of singular value, as is usual in degenerate eigenvalue problems). An input $|\phi_{DIm}\rangle$ leads to an output $s_{Dm}|\phi_{DOm}\rangle$ so these pairs of vectors define the orthogonal (mode-converter) "channels" through the device.

In a practical device, we may have a physical input space that we would describe with $M_I$ modes or basis functions and similarly an output space that we would describe using $M_O$ modes or basis functions. For example, the input mathematical space might consist of a set of $M_I$ Gauss-Laguerre angular momentum beams, and the output space might be a set of $M_O$ waveguide modes or $M_O$ different single-mode waveguides, with $M_I$ and $M_O$ not necessarily the same number. Alternatively, we might be describing the input space with a set of $M_I$ waveguide modes, and the output space might be described with a plane-wave or Fourier basis of $M_O$ functions, as appropriate for free-space propagation. In any of these cases, the actual number of orthogonal channels, $M_C$, going through the device might be smaller than either $M_I$ or $M_O$ (or both); for example, we could have large plane wave basis sets for describing the input and output fields of a 3-moded waveguide; no matter how big these input and output sets are, however, there will only practically be $M_C=3$ orthogonal channels through the device.

In the example devices of FIGS. 8A-C, the most obvious choices for the input and output basis function sets are the "rectangular" functions that correspond to uniform waves that fill exactly the (top) surface of each single beamsplitter block; in this example, we have chosen equal numbers ($M_I$ and $M_O$ each equal to 4) of such blocks on both the input and the output, though there is no general requirement to do that, and the number $M_C$ of channels through the device is the number of rows of beamsplitter blocks (1 in FIG. 8A, 2 in FIG. 8B, and 4 in FIG. 8C). In those devices also, the (complex) transmissions of the modulators SD1-SD4 correspond mathematically to the singular values $s_{Dm}$.

In these cases of possibly different values for each of $M_I$, $M_O$, and $M_C$ it is more useful and meaningful to define the matrix U as an $M_I \times M_C$ matrix (so $U^\dagger$ is a $M_C \times M_I$ matrix) and the matrix V as an $M_O \times M_C$ matrix. With these choices, the matrix $D_{diag}$ becomes the $M_C \times M_C$ square diagonal matrix with the (generally non-zero) singular values $s_{Dm}$ as its elements. If there are only $M_C$ possible orthogonal channels through the device, then there are only $M_C$ singular values that are possibly non-zero also. Using these possibly rectangular (rather than square) forms for U and/or V means we are only working with the channels that could potentially have non-zero couplings (of strengths given by the singular values) between inputs and outputs. In the device of FIGS. 8A-C, the input coupler CI corresponds to the matrix $U^\dagger$, the vertical line of modulators corresponds to the diagonal line of possibly non-zero diagonal elements in $D_{diag}$, and the output coupler CO corresponds to the matrix V. In the cases of FIGS. 8A-B, the matrices U and V are not square. Because they are not square, in this amended way of writing the mathematics, they are not therefore unitary, but we eliminated elements in our mathematics that serve no purpose; we have essentially avoided having our mathematics describe rows of beam splitters and modulators that do not exist physically. Despite that fact that U and V are no longer necessarily unitary, the forms of Eqs. (1)-(3) remain valid. The sets of functions $|\phi_{DIm}\rangle$ and $|\phi_{DOm}\rangle$ are complete for representing input and output functions corresponding to non-zero couplings (i.e., non-zero singular values) and are still the columns of the matrices U and V, respectively. (The settings of the phase shifters and reflectors in the full unitary forms of couplers CI and CO as shown in FIG. 8C would each correspond to a Gaussian-elimination-like factorization of a unitary matrix; other forms, such as the multilayer binary tree form considered above, would correspond to other possible factorizations of such unitary matrices.)

Though here we will emphasize the self-configuring approach, the specific settings of the phase shifters and reflectors can instead be calculated straightforwardly given the desired function of the device. See section B5 for an explicit sequential row-by-row and block-by-block physical design process for the partial reflector and phase shifter parameters. Section B6 gives the formal analysis for the MZI implementation of variable reflectors and phase shifters.

One final formal issue for an arbitrary device is that the input and output Hilbert function spaces, $H_I$ and $H_O$ respectively, in which $|\phi_I\rangle$ and $|\phi_O\rangle$ exist mathematically, may well each have infinite numbers of dimensions, whereas our device has finite dimensionality. To resolve this, note first that the input waves $|\phi_I\rangle$ come from some a wave source in another volume (generally, a "transmitting" Hilbert space $H_T$), through some coupling operator $G_{TT}$. Because of a sum rule, there is only a finite number of channels between $H_T$ and $H_I$ that are strongly enough coupled to be of interest. A familiar example is the finite number of distinct "spots" that can be formed on one surface from sources on another, consistent with diffraction. A similar argument holds at the output with output waves $|\phi_O\rangle$ leading to resulting waves in some "receiving" space $H_R$. Hence, we can practically presume that D can be written as a matrix with finite dimensions to any degree of approximation we wish.

B4) Universal Linear Device

So far, we have only considered spatial input and output modes for the device concept, though the underlying mathematical discussion above can consider any additional linear attributes also, such as polarization (or, more generally, quantum mechanical spin), frequency or time. We can at least conceive of a universal machine that would attempt to perform any linear mapping between inputs and outputs. Mathematically, it is straightforward to construct the necessary Hilbert spaces, which would be formed by direct products of the different basis functions corresponding to each attribute separately.

Figure 10A:
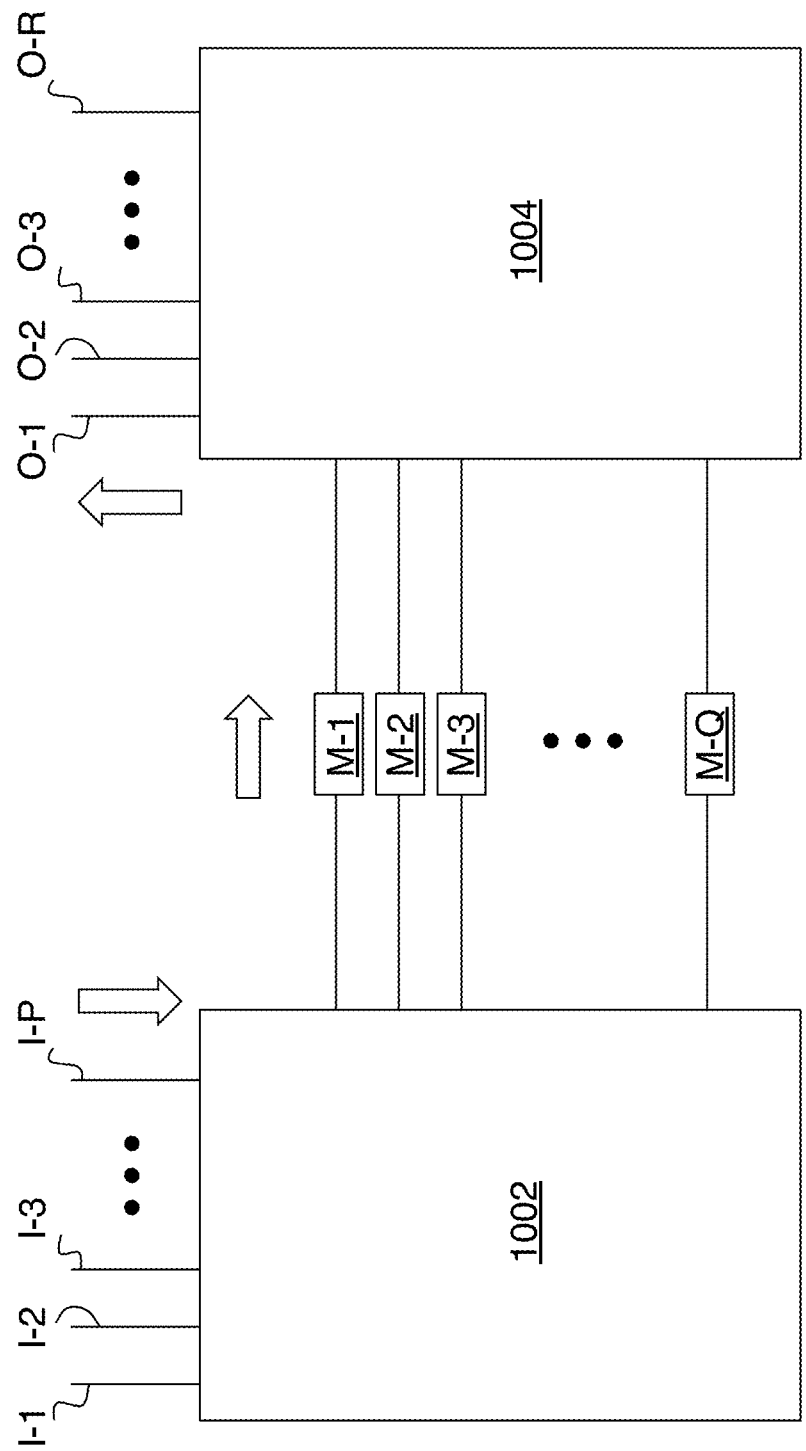
FIG. 10A is a block diagram of a universal component.

One example of such a universal component includes a wave combiner and wave synthesizer as described above (with or without the detectors) and amplitude and/or phase modulators connected between outputs of the wave combiner and inputs of the wave mode synthesizer. More specifically, the combiner can be a linear, reciprocal and lossless wave combiner having P inputs and Q outputs with $2 \leq Q \leq P$ configured such that the contribution of each of the P inputs to each of the Q outputs of the wave combiner is adjustable in both amplitude and relative phase. Similarly, the synthesizer can be a linear, reciprocal and lossless wave mode synthesizer having Q inputs and R outputs with $Q \leq R$ configured such that the contribution of each of the Q inputs to each of the R outputs of the wave mode synthesizer is adjustable in both amplitude and relative phase. FIG. 10A shows an example, where wave combiner 1002 and wave mode synthesizer 1004 are connected to each other via modulators M-1, M-2, M-3, . . . , M-Q. Combiner 1002 has P inputs I-1, 1-2, I-3, . . . , I-P. Synthesizer 1004 has R outputs O-1, O-2, O-3, . . . , O-R. The modulators can provide amplitude and/or phase modulation.

Such a device provides, in principle, arbitrary transformations of spatial modes. To provide other kinds of linear operations on waves, representation transformers can be placed at the inputs and/or outputs of the device to convert between other wave properties and spatial modes.

Figure 10B:
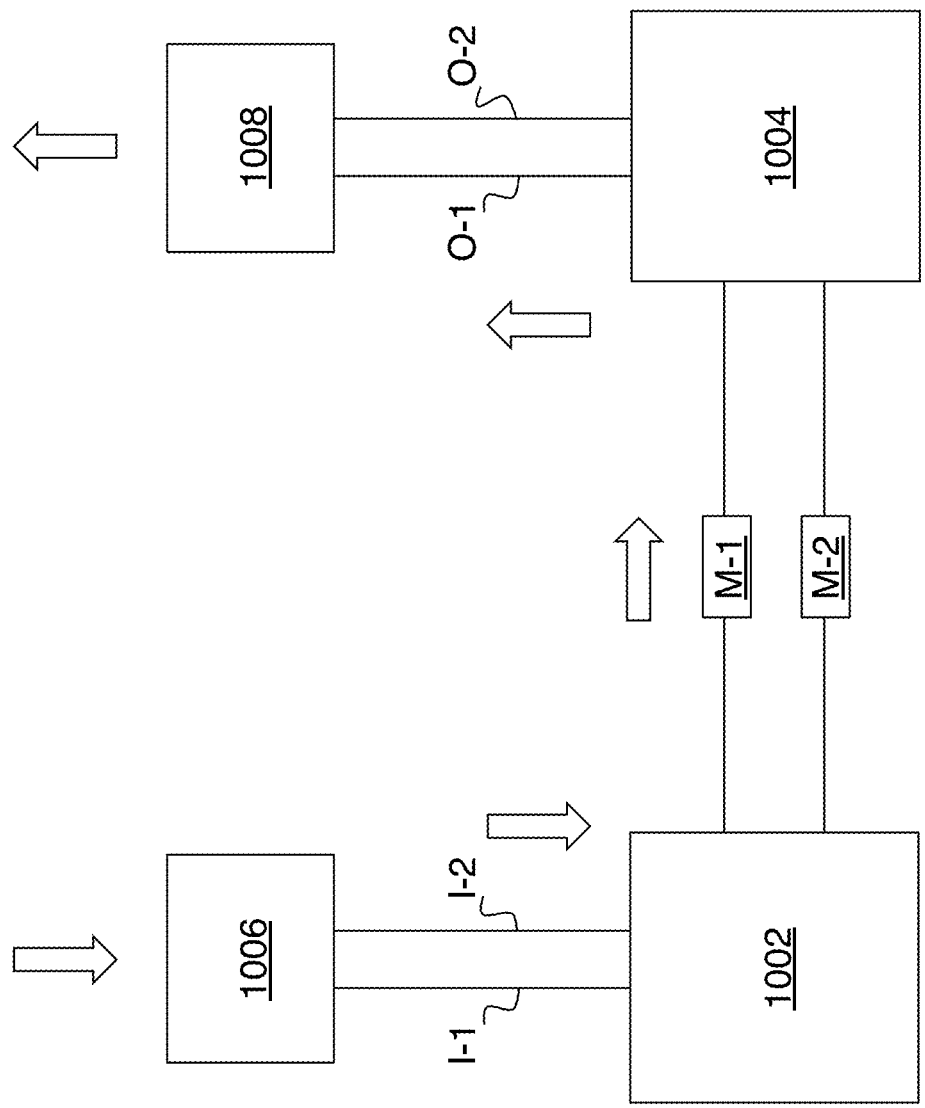
FIG. 10B shows an application of the example of FIG. 10A to polarization mode conversion.

FIG. 10B schematically shows an example where input transformer 1006 transforms input polarization modes into spatial modes I1 and I2 provided to combiner 1002, and output transformer 1008 transforms the output modes O-1 and O-2 of synthesizer 1004 to polarization modes. In this manner universal polarization transformation becomes possible. As described in greater detail below, any linear property of a wave can be transformed to a spatial mode pattern, so a universal wave spatial mode transformer combined with representation transformers (e.g., 1006 and 1008 on FIG. 10B) can provide truly universal functionality.

B4.1) Universal Device with Representation Converters

One general approach that would work in principle for a universal device is to physically convert each direct product basis function (e.g., one with specific spatial, temporal and polarization characteristics) to a monochromatic spatial mode with a specific polarization, a mode we can then feed through a version of the spatial device we discussed above. In other words, we can convert the representation to a simple monochromatic spatial one (e.g., in fiber or waveguide modes), perform the desired mathematical device operation (i.e., the mathematical operator D), using our spatial approach discussed above, and then convert the representation back to its full spatial, temporal and polarization form. That is, we make "representation converters" to convert into and back out of the single-frequency, single-polarization, waveguide mode representation we use in our universal spatial device, or general spatial mode converter, as discussed above. The mathematical operator D that describes that mapping from input modes to output modes is not changed, but the physical representation of those modes is changed inside the device, and is changed back before we leave the device.

Polarization Controller Example

Figure 11:
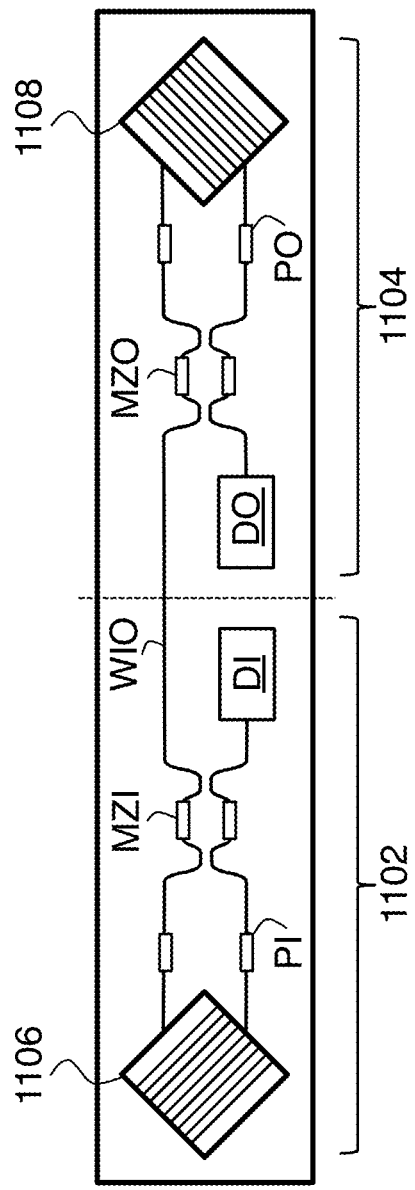
FIG. 11 shows an implementation of polarization mode conversion.

As a very simple example of a device that operates based on such representation conversion, consider a simple polarization converter as in FIG. 11. Light incident on the grating coupler 1106 in self-aligning coupler 1102 is split by its incident polarization into the two waveguides, and similarly light from the waveguides going into the grating coupler 1108 in self-aligning coupler 1104 appears on the two different polarizations on the output light beam. PI and PO are phase shifters; the similar but unlabeled boxes are optional dummy phase shifters. Optionally, a phase shifter and its dummy partner could instead be driven in push-pull to double the available relative phase shift. MZI and MZO are Mach-Zehnder interferometers, and DI and DO are detectors.

In this example, an incident beam is split into two orthogonal polarizations, for example, using a polarization demultiplexing grating coupler 1106. The polarization demultiplexer here is converting the physical representation from a polarization basis on a single spatial mode to a representation in two spatial modes (the waveguide modes) on a single polarization. Then the simple two-channel self-aligning coupler 1102 combines the fields and powers from the two polarizations loss-lessly into one single-mode waveguide beam. Here, as before, we adjust phase shifter PI to minimize the power in detector DI, and then adjust the "reflectivity" of the Mach-Zehnder interferometer MZI (by differential drive of the phase shifters in the two arms) to minimize the power in detector DI. All the power from both incident polarizations is now in one beam in one polarization in waveguide WIO. In many situations, this may be the desired output, and we could take this output from waveguide WIO at the point of the dashed line in FIG. 11. If we wish, instead, we can change the wave from the output grating coupler 1108 into any desired polarization using the second, output self-aligned coupler 1104; we can program this desired output polarization by training with the desired polarization state running backwards into that output grating coupler and running the feedback loops with PO, MZO and DO in the same way as we did for the input. With this device operating with circular polarizations, if we train with a right circular polarization going "in" to the output coupler from the outside, for example, the beam emerging from the output coupler under actual operation will also be right circularly polarized. Note that, in contrast to other polarization state controllers, this device requires no global feedback loop and no simultaneous multiple parameter optimization. It also requires no calculation in the feedback loop.

Universal Device

More generally, we can expand the idea shown in the simple polarization controller above with other representation converters. For example, we could first convert from a continuous input field to waveguides using the spatial single mode converters. Then, in this example, we split the polarizations, converting to (twice as many) waveguide modes all in the same polarization. Next we split each such waveguide mode into separate wavelength components. Finally, we use wavelength converters (frequency shifters) to change each of those components to being at the same wavelength (frequency). Now the input field that was originally a continuous beam with possibly spatially varying polarization content and with multiple frequency components or time-dependence (possibly different for each spatial and polarization component) has been converted into a representation in a set of spatial modes all at the same frequency and polarization. This set of modes is then fed into our device as described above, with the $U^\dagger$ and V blocks representing the self-aligning couplers CI and CO respectively (e.g., in the planar configuration of FIG. 9) and $D_{diag}$ representing the vertical line of modulators SD1, SD2, . . . , etc. On the right side of the device, we perform the inverse set of representation conversions to that on the left to obtain the final output field.

Methods for making each of the "representation converter" devices considered above are known, at least in principle. Various approaches exist to convert from one spatial mode form to another, including the grating coupler approach. If we started with a two-dimensional (2D) spatial input field, we could sample it with a 2D array of spatial single mode converters into optical fibers, and then rearrange the outputs of those fibers into a 1D line of inputs. Polarization splitters are standard components that can exist in many different forms. Wavelength splitters, such as gratings, separate different frequencies to different spatial channels.

For a finite input time range or repetition time, we know we can always Fourier-decompose a signal into a set of amplitudes of each of an equally spaced comb of frequencies. We can then, at least in principle (though with greater practical difficulty), convert each frequency component to a standard frequency using frequency shifters; electro-optic frequency shifters could in principle be driven from the beating of the different comb elements, thus retaining well defined phase relative to the input field. In this way, at least in principle, we can convert an arbitrary Fourier decomposition in different frequency modes emerging from the wavelength splitters into different spatial modes all at the same frequency. Note, incidentally, that such frequency shifters are linear optical components in that they are linear in the optical field being frequency-shifted; in the case of modulator-based frequency shifters, it is largely a matter of taste whether we regard them as being non-linear optical devices. Such devices can all, at least in principle, be run backwards at the output.

The spatial modes, now all in the same polarization and at the same frequency, pass through the general spatial mode converter (e.g., like FIG. 9). Finally, we pass back through another representation converter to create the output field. In this way, we can in principle perform any linear transformation of the input field, including its spatial, spectral, and polarization forms.

This general approach is reminiscent of switching fabrics in optical telecommunications, and this approach can certainly implement the permutations required in such fabrics. The present approach, however, goes well beyond permutations, allowing arbitrary linear combinations of inputs to be mapped to arbitrary linear combinations of outputs, including as other special cases all broadcast and multicast functionalities.

Figure 12B:
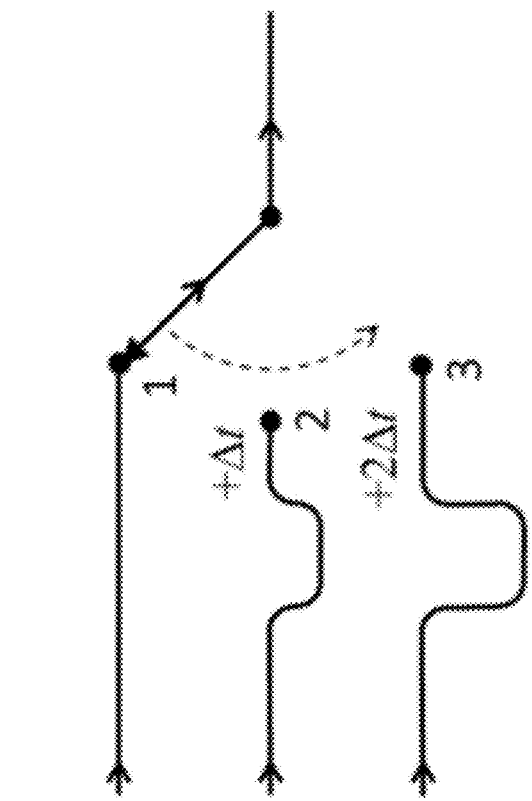
FIGS. 12A-B show exemplary time delays for splitting signals into different time windows.
Figure 12A:
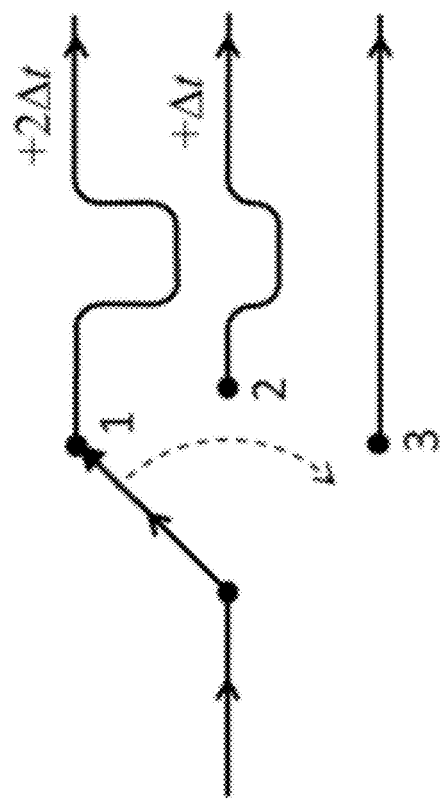

As an alternative to the frequency splitting and frequency conversion considered above, in principle we could split an input pulse into different time windows, then pass each of those through the general spatial mode converter. Idealized time delay units for implementing a time (rather than frequency) version of the approach are shown in FIGS. 12A-B. Here the switches rotate through positions 1, 2, and 3, with a dwell time of $\Delta t$ at each position, taking a total time of $3\Delta t$ to cycle through all 3 positions before returning to position 1. FIG. 12A shows the switch used at the input side. FIG. 12B shows the switch used at the output side. At the input side, the paths connected to points 2 and 1 have additional propagation delays compared to the path connected to point 3 of $\Delta t$ and $2\Delta t$, respectively. Thus the signals from three successive time windows of duration $\Delta t$ appear simultaneously at the three outputs on the right, allowing them then to be fed into the general spatial mode converter (or into the next stage of the preparatory representation conversion stages). A similar apparatus can be used at the output, but operated with the delays reversed to reconstruct a signal segment of duration 3Δt at the final output, with each Δt time slot in that signal being an arbitrary linear combination of 3 incident Δt time slots.

Devices with Forward and Backward Waves

So far, we have only considered devices that operate with input waves coming from one side or port and output waves leaving from the other. If the device is to be truly universal, it would have to handle waves going in the other directions also. Furthermore, the device shown so far is reciprocal, and cannot therefore emulate a non-reciprocal device (a Faraday isolator being a simple example).

Figure 13B:
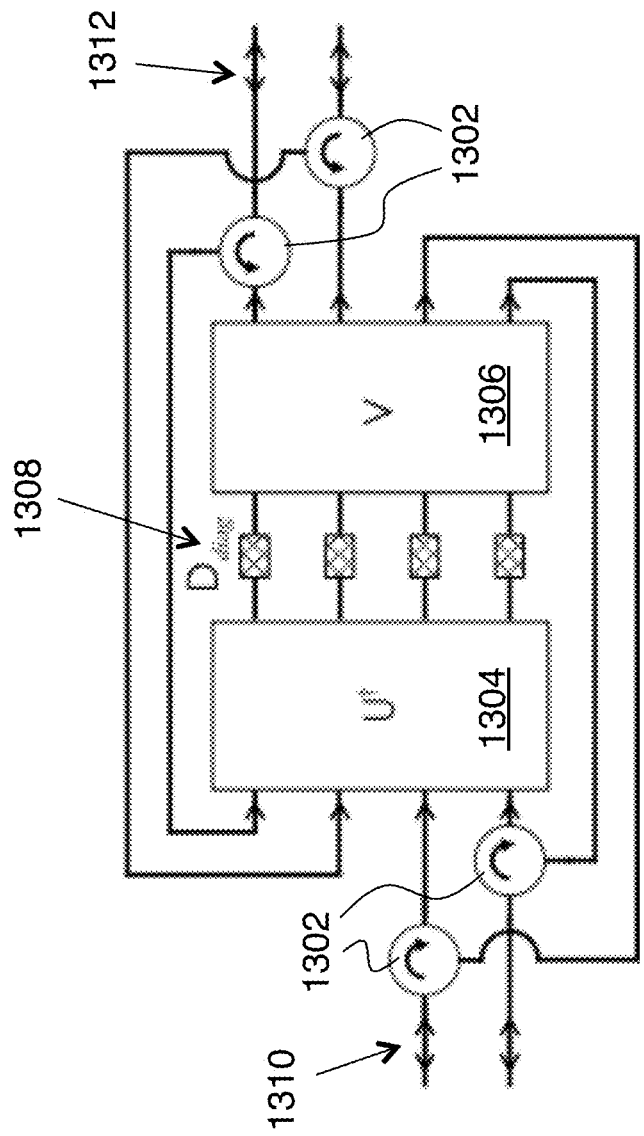
FIGS. 13A-B show combination of circulators with a universal reciprocal component to provide a universal non-reciprocal component.
Figure 13A:
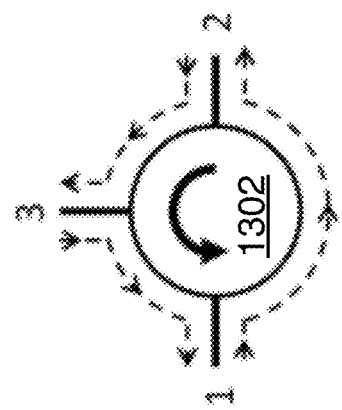

To handle non-reciprocal optical elements in this approach, or any element where we want forward and backward waves in the ports of the device (as in cloaking), we can in principle add forward/backward splitters to the left and right sides of the apparatus of FIG. 10A, e.g. as shown in FIGS. 13A-B. Here FIG. 13A shows a schematic of a 3-port optical circulator 1302. The dashed lines show the effective paths of waves in different directions between the three ports. FIG. 13B shows a universal 4-port "two-way", potentially non-reciprocal device, with input and output beams in each of two paths at both the left (1310) and right (1312) of the device. The central "UT", "$D_{diag}$", and "V" units (converter 1304, modulators 1308 and synthesizer 1306, respectively) form a general spatial mode converter as above. This can be regarded as an example of starting with a universal combiner-modulators-synthesizer device and adding one or more three port optical circulators connected to an input of the combiner and to an output of the synthesizer. This can provide a universal non-reciprocal linear component.

This example approach is based on the use of 3-port optical circulators to separate forward and backward waves. Backward waves coming into the right of the structure are separated from the forward waves and fed as additional inputs into the left of the general spatial mode converter in the middle. Two of the four outputs from the general spatial mode converter are fed to the optical circulators on the left to give the backward propagating output beams on the left.

The addition of such circulator devices, which are non-reciprocal by definition, allows the whole optical arrangement to be non-reciprocal if required, while leaving the core general spatial mode converter itself as a reciprocal device that always runs only from front to back (left to right).

Cloaking

To implement "cloaking" in principle, we flow the fibers connected to the left or right ports in FIG. 13B, round the volume to be "cloaked" and use the general spatial mode converter to implement the required mapping between input and output fields to emulate free-space propagation through the cloaked volume. Note that, as with all "transmission" cloaks, we generally have additional propagation delay that prevents truly perfect cloaking. The overall additional time delay in our universal device is the one sense in which it cannot be made perfect.

B4.2) Self-Configuring Operation

So far, for this universal device, we have shown that in principle any such linear transforming device can be made, though we have not explicitly discussed the self-configuration in this general context. There are two sophistications we have to consider compared to the simple spatial case, the first related to the time behavior and the second to the non-reciprocal behavior.

Temporal Self-Configuring

Suppose first that we are operating with the wavelength-splitting version of the universal device. We presume that we work with frequency converters that, when run with waves propagating in the opposite direction, perform the opposite frequency conversion; that is, if when run with a "forward" wave a converter changes the wave frequency from ω to ω+δω, then with a wave propagating backwards into it, it will convert from ω+δω to ω. With such a frequency converter, the mapping from spatial to frequency modes and the mapping from frequency to spatial modes are just inverses of one another. Electro-optic frequency converters can operate in this way, for example.

Suppose, then, that we want to train the device to output a pulse f(t) in a particular spatial mode in response to some specific input. Then, in training, we send the same pulse f(t) propagating backwards, i.e., in the phase-conjugated version of the spatial mode. Phase conjugation changes the spatial direction of propagation by changing the sign of the spatial variation of the phase, but it does not time-reverse the pulse envelope (despite the occasional, and somewhat misleading, description of phase conjugation as time-reversal); the different frequency components in this phase-conjugated pulse have the same relative complex amplitudes at any point in space in both the "forward" and phase-conjugated versions, consistent with the time behavior of the pulse being of the same form. Hence, we need make no change to the apparatus described above, with the frequency splitting and conversion, to allow it to be self-configuring, as long as the frequency converters operate as discussed here when run backwards.

If we are operating using the time-domain rather than frequency-domain devices, i.e., using units as in FIGS. 12A-B rather than wavelength splitters and converters, and we want to train the device to output a pulse of temporal form f(t) for a given input, then, at least if using the time-delay units of FIGS. 12A-B, we would need to train with a time-reversed pulse, i.e., of form f(−t) running in each spatial mode back into the device; otherwise we do not get the desired relative delays of each segment of the pulse so that they are all lined up in time within the central general spatial mode converter.

Non-Reciprocal Self-Configuring

If we are using a non-reciprocal device configuration (e.g., as on FIG. 13B), then during training we need to reverse the sense of the circulators; i.e., the rotation arrows should be flipped form clockwise to anticlockwise at the input and from anticlockwise to clockwise at the output. Such a change might be achieved by changing the direction of the static magnetic fields in circulators based on Faraday isolation.

B5) Progressive Calculation Method

Figure 14:
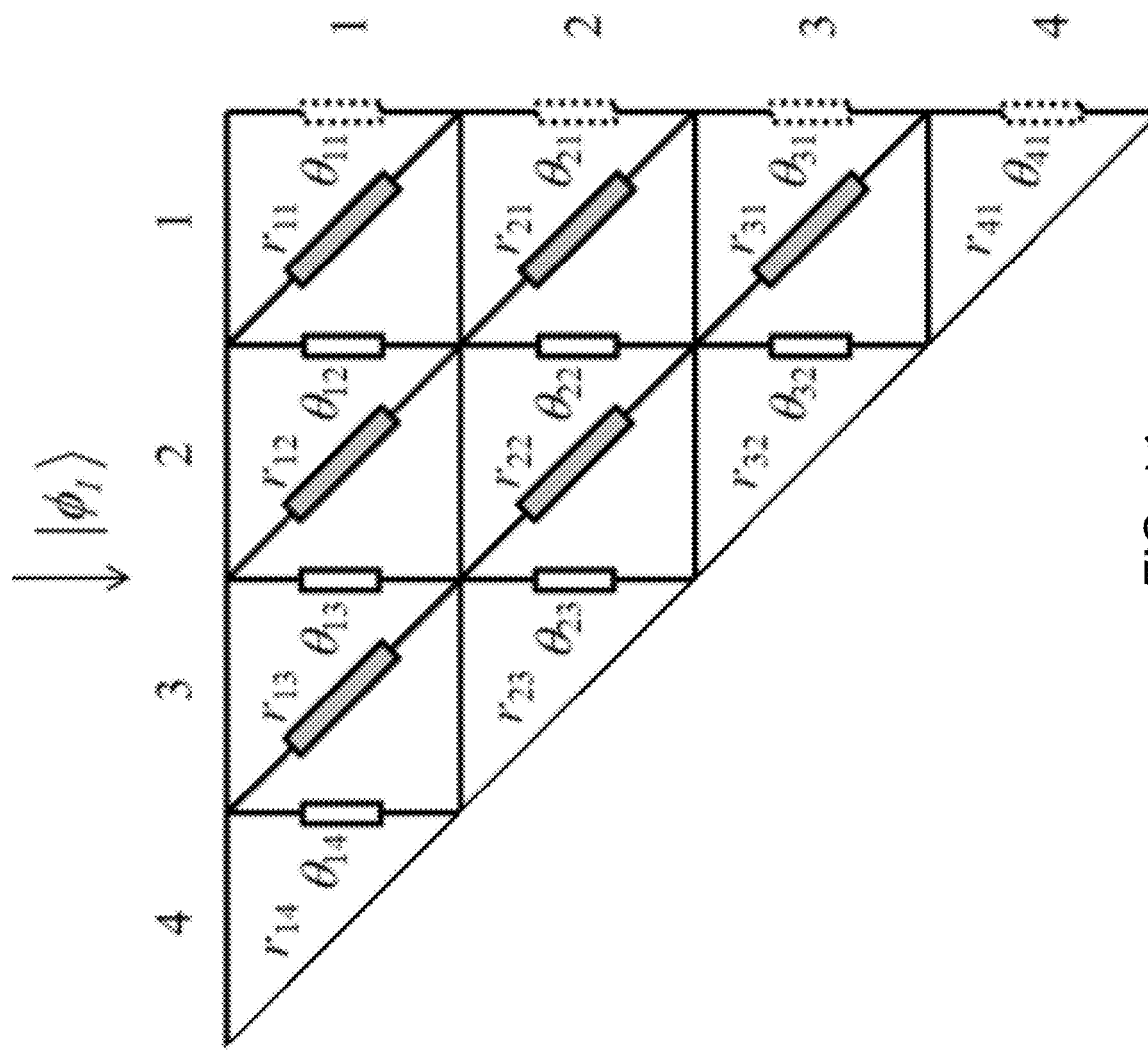
FIG. 14 sets forth notation used for analysis of a wave combiner.

Though the device can operate in a self-configuring mode, we can also formally calculate what the reflectivities and phases need to be in all of the beamsplitter blocks. FIG. 14 shows one unitary transformer (here for $U^\dagger$) with the reflectivities and phase shifts labeled, analogous to coupler CI in FIG. 8C. (Detectors are omitted here.) Here the reflectivities and phase shifts are labeled for each beamsplitter block. The diagonal mirror has 100% reflectivity.

The reflectors and phase shifters in FIG. 14 (and in FIGS. 8A-C) are shown as rectangles only in the middle of the beamsplitter blocks, but it is understood that they act on the entire beam passing through each block. A completely arbitrary unitary transformer would require the phase shifters at the right in the dashed rectangles so as to set the overall phases of the outputs on the right, and we will use these in our algebra here, though we do not need these in the architecture of FIGS. 8A-C because the singular value modulators SD1-SD4 can set any specific phase required between the beamsplitter blocks for $U^\dagger$ and V.

Figure 15:
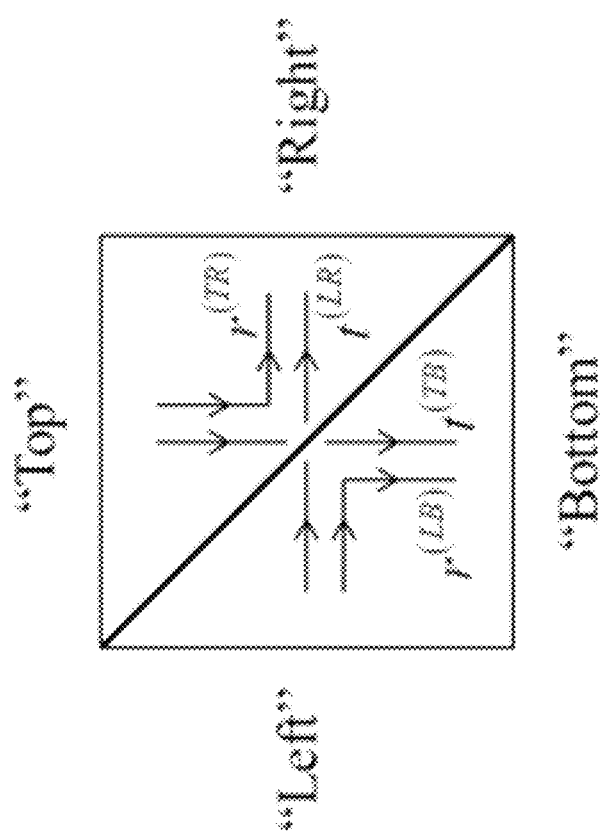
FIG. 15 sets forth notation used for analysis of a beam splitter.

To discuss the phases involved in the beamsplitter, we need some formal definitions. FIG. 15 shows a (lossless) beamsplitter (without any additional phase shifter) with definitions of field reflection and transmission factors and nominal labels of the beamsplitter ports as top, bottom, left and right. We can define complex field transmission factors $t^{(TB)}$ from top to bottom and $t^{(LR)}$ from left to right, and similarly define field reflection factors $r^{(TR)}$ and $r^{(LB)}$. These factors include the phase shifts between the respective inputs and outputs as their arguments; for example, the phase delay between top and bottom is $\theta^{(TB)}$ in the expression $$t^{(TB)} = |t^{(TB)}| \exp(i\theta^{(TB)}) \tag{4}$$

and similarly for the other transmission and reflections. Because the beamsplitter is lossless $$|t^{(TB)}|^2 = 1 - |r^{(TR)}|^2 = |t^{(LR)}|^2 = 1 - |r^{(LB)}|^2 \tag{5}$$

and, obviously from Eq. (5), $|r^{(TR)}|^2 = |r^{(LB)}|^2$. Also, $$\theta^{(LB)} + \theta^{(LB)} - \theta^{(TB)} - \theta^{(LR)} = \pm\pi \tag{6}$$

(at least within some additive phases in units of $2\pi$, which we neglect for simplicity in the algebra).

We will formally write any of our input basis functions $|\phi_{DIm}\rangle$ as a linear combination of the "modes" (rectangular functions) corresponding to the inputs to the individual columns $$|\phi_{DIm}\rangle = \sum_{n=1}^{M} a_{mn} |\phi_{1n}\rangle \tag{7}$$

where $|\phi_{1n}\rangle$ we mean the (input) mode (rectangular function) incident on the top row in the nth column. The idea of this unitary transformer is that, if we illuminate from the top with the function $|\phi_{DI1}\rangle$, all the power will come out of port 1 at the right. Similarly, illuminating with function $|\phi_{DI2}\rangle$ will lead to all the power coming out of port 2 at the right, and so on. To understand how to set the reflectivities r and phase shifts $\theta$ in the top row mathematically, we imagine for the moment that we are running the device backwards, shining a beam into port 1 on the right and looking at the beams coming out of the ports at the top. We presume that we are dealing only with reciprocal optics in our beam splitters and phase shifters so that the phase delays and the magnitudes of the reflectivities are the same forwards and backwards. The output amplitudes that we want our device to generate at the top in this backwards case should therefore be the complex conjugates $a_{1n}^*$ of the amplitudes in Eq. (7); if we generate some phase delays in running the device backwards, then we should have corresponding phase leads in the input beams when running the device forwards so all the beams add up with the correct phase at output 1 on the right.

Hence, for the top right block in FIG. 14, we should choose $$r_{11}^{(TR)} \exp(i\theta_{11}) = a_{11}^* \tag{8}$$

In operation, when we choose the magnitude of a given $r^{(TR)}$, for example by setting phase delay in a Mach-Zehnder interferometer implementation of a variable beam splitter, the phase $\theta^{(TR)}$ associated with $r^{(TR)}$ will also be set as a result and we will know what it is. (Note in our mathematics here we are allowing for possible changes in phase associated with changes in reflectivity, though in the self-configuring versions of the device discussed in the main text, we prefer to work with components that do not change phase as they change reflectivity because it makes the feedback loops simpler.) We will then choose the phase shifter phase delay (e.g., the $\theta_{11}$ in Eq. (8)) so as to satisfy the necessary overall design requirement on phase, as in Eq. (8) here.

Now knowing $r_{11}^{(TR)}$ (and hence, from Eq. (5) also $t_{11}^{(LR)}$) and $\theta_{11}$, we can proceed to the next block in this first row. The field that will emerge from top in the second column is $$t_{11}^{(LR)} r_{12}^{(TR)} \exp[i(\theta_{11} + \theta_{12})] = a_{12}^* \tag{9}$$

so we should choose $$r_{12}^{(TR)} \exp(i\theta_{12}) = a_{12}^* \exp(-i\theta_{11})/t_{11}^{(LR)} \tag{10}$$

We can continue progressively along the top row, with the reflectivity and phase in the nth column being chosen to satisfy $$r_{1n}^{(TR)} \exp(i\theta_{1n}) = a_{1n}^* \exp\left(-i\sum_{p=1}^{n-1} \theta_{1p}\right) \bigg/ \prod_{q=1}^{n-1} t_{1q}^{(LR)} \tag{11}$$

where we understand that when n=1 the summation term will be 0 and the product term will be 1. (Note that the magnitude of the last reflectivity, $r_{1M}^{(TR)}$, will always be 1, which is ultimately guaranteed by the lossless nature of this set of beamsplitters and the consequent unitarity of the operators.)

Now we consider what happens when we shine the second basis function $|\phi_{DI2}\rangle$ into the top of the set of beamsplitters. First we need to set up some notation. For a field arriving at the top of the uth row of beamsplitter blocks, we can choose to write $$|\phi^{(u)}\rangle = \sum_{j=1}^{M-u+1} a_j^{(u)} |\phi_{uj}\rangle \tag{12}$$

where, in an extension from the kind of notation used in Eq. (7), by $|\phi_{uj}\rangle$ we mean the (input) rectangular "mode" incident on the uth row in the jth column. Given that we know all the reflectivities (and hence transmissivities) and phases of the first row of beamsplitter blocks, given some field $|\phi^{(1)}\rangle$ incident on the top row, we can deduce what field $|\phi^{(2)}\rangle$ will arrive at the top of the second row. We can formally write this linear relation in terms of a matrix $C^{(1)}$ $$|\phi^{(2)}\rangle = C^{(1)} |\phi^{(1)}\rangle \tag{13}$$

where $C^{(1)}$ is the first of a family of $(M-u)\times(M-u+1)$ matrices $$C^{(u)} = \begin{bmatrix} t_{u1}^{(TB)} & c_{12}^{(u)} & c_{13}^{(u)} & \cdots & c_{1(M-u)}^{(u)} & c_{1(M-u+1)}^{(u)} \\ 0 & t_{u2}^{(TB)} & c_{23}^{(u)} & & & \\ \vdots & 0 & t_{u3}^{(TB)} & \ddots & \vdots & \vdots \\ & \vdots & & \ddots & \ddots & \\ 0 & 0 & 0 & \cdots & t_{u(M-u)}^{(TB)} & c_{(M-u)(M-u+1)}^{(u)} \end{bmatrix} \tag{14}$$

where $c_{sj}^{(u)}$ is the "complex fraction" (i.e., the multiplier) of the field incident on column j of row u that contributes to the field incident on the top of column s of row u+1. For the diagonal elements, $$c_{ss}^{(u)} = t_{us}^{(TB)} \tag{15}$$

For the elements to the right of the diagonal, $$c_{sj}^{(u)} = r_{uj}^{(TR)} r_{us}^{(LB)} \left[ \prod_{p=s+1}^{j-1} t_{up}^{(LR)} \right] \exp\left[ i \sum_{p=s+1}^{j} \theta_{up} \right] \tag{16}$$

This element is the product of (i) the field reflectivity $r_{uj}^{(TR)}$ of the "sideways" reflecting beamsplitter in block uj that reflects into row u, (ii) the field reflectivity $r_{us}^{(LB)}$ in the "downwards reflecting" beamsplitter in block us that reflects down into row u+1, (iii) the product of all the "sideways" transmissions in all the intervening blocks, and (iv) the phase factors from all of the phase shifters encountered on this path.

So, given that we have calculated all the reflectivities and phases for the first row, we can now calculate $C^{(1)}$, and hence when we shine the second basis function $|\phi_{DI2}\rangle$ onto the top of the whole device, we will obtain a field $$\left|\phi_{DI2}^{(2)}\right\rangle = \sum_{j=1}^{M-1} a_{2j}^{(2)} |\phi_{2j}\rangle = C^{(1)} |\phi_{DI2}\rangle \tag{17}$$

at the top of the second row.

Now to calculate the settings of the reflection and phase factors for the second row, we proceed in a similar fashion to that used for the first row, but with input amplitudes on the top of the nth column of the second row of $a_{2n}^{(2)}$, instead of the amplitudes $a_{1n}$ we used in calculating the first row reflection and phase factors.

For the third row, having calculated all the reflections and phases in the second row, we can calculate the matrix $C^{(2)}$ and hence calculate amplitudes $a_{3n}^{(3)}$ that will appear at the top of the third row when we illuminated the top of the device with the third basis function $|\phi_{DI3}\rangle$ $$\left|\phi_{DI3}^{(3)}\right\rangle = \sum_{j=1}^{M-2} a_{3j}^{(3)} |\phi_{3j}\rangle = C^{(2)} C^{(1)} |\phi_{DI3}\rangle \tag{18}$$

We proceed similarly to calculate progressively all subsequent rows, thereby completing the design mathematically.

Note that shining the second basis input $|\phi_{DI2}\rangle$ on the top of the structure produces no output from port 1 on the right. The unitarity of the overall operation means that orthogonal inputs always give orthogonal outputs (unitarity preserves all inner products). Because $|\phi_{DI2}\rangle$ is orthogonal to $|\phi_{DI1}\rangle$, then their outputs must also be orthogonal. Since the output with $|\phi_{DI1}\rangle$ is solely from the top port, $|\phi_{DI2}\rangle$ can therefore have no component emerging from the top port. Similar behavior follows for all subsequent orthogonal inputs, each of which leads only to output from one (different) port at the right of the structure.

To calculate the reflections and phases in the device implementing the unitary transformation V, for which we want output functions $$\left|\phi_{DOm}\right\rangle = \sum_{n=1}^{M} b_{mn} |\beta_{1n}\rangle \tag{19}$$

where by $|\beta_{uj}\rangle$ we mean the (output) mode leaving the top of the uth row in the jth column, we can proceed similarly. Here, when we shine light into a port on the left of the output coupler structure (as in CO in FIG. 8C), we want to create the actual output fields for a given output basis function, so we do not take the complex conjugates of the amplitudes $b_{mn}$ for our calculations. That is, where we have $a_{mn}^*$ in Eqs. (8)-(11), we will use $b_{mn}$ in the analogous equations for V.

B6) Mach-Zehnder Reflectivity and Phase Shift

Figure 16:
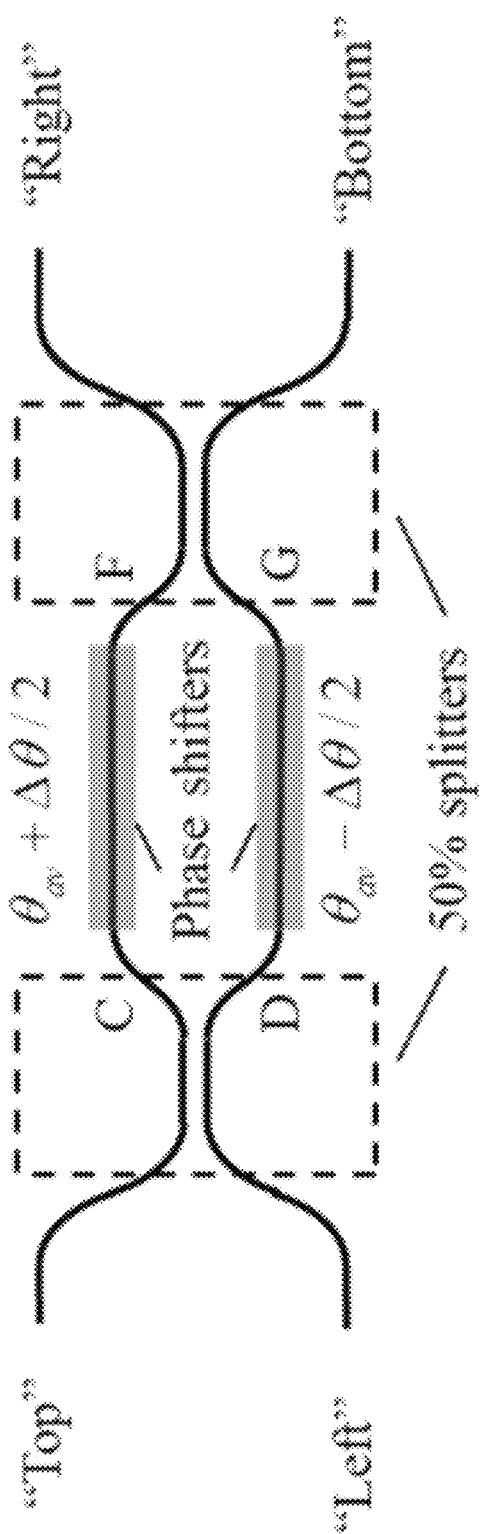
FIG. 16 set forth notation used for analysis of a Mach-Zehnder modulator.

The Mach-Zehnder waveguide modulator configuration as in FIG. 9 implements the necessary control of reflectivity and phase using two phase shifters within the modulator. FIG. 16 shows the modulator configuration in detail. More specifically, this is a Mach-Zehnder waveguide modulator configuration with 50% ("3 dB") splitters notionally implemented here with coupled waveguides and two arms each with a phase shifting element. The grey rectangles represent the phase shifting control elements (e.g., electrodes). The labeling of the ports corresponds with the notation used in FIG. 15.

The phase shifting could be accomplished with electrooptic materials with voltages applied through electrodes or with thermal devices, which here for simplicity of description we take to have phase shift also set by some voltage. (For such thermal phase shifters, negative voltages would not, however, give negative phase shifts, so in that case, we can imagine the voltages we discuss here to be in addition to some positive bias so that all actual voltages are positive in the thermal case). Nominally defining the phase delays in the phase shifters as being between points A and C (B and D) for the upper (lower) phase shifter, the average voltage controls the common-mode phase shift $\theta_{av}$ and the difference between the voltages controls the differential phase shift $\Delta\theta$. The device is presumed perfectly symmetric; in a real device we might add one or more control phase shifting electrodes inside the beamsplitter sections to achieve symmetric behavior in practice. Here we formally analyze the Mach-Zehnder interferometers, showing how to relate their behavior and settings to those of the "conventional" beam splitters and phase shifters of FIGS. 8A-C and the discussion of section B5 on the required values in an actual design.

In a symmetric Mach-Zehnder device as in FIG. 16, the 50% splitters are each identical symmetrical loss-less beam splitters. Reflection within these 50% splitters corresponds to the paths "Top"—C, "Left"—D", F—"Right", and G—"Bottom". The phase delays associated with these reflections, $\theta_{TC}$, $\theta_{LD}$, $\theta_{FR}$, and $\theta_{GB}$, respectively are all equal, i.e., $$\theta_{refl} = \theta_{TC} = \theta_{RD} = \theta_{FL} = \theta_{GB} \tag{20}$$

Similarly for the transmission phases, with obvious notation, $$\theta_{trans} = \theta_{TD} = \theta_{LC} = \theta_{FB} = \theta_{GR} \tag{21}$$

Similarly, the magnitudes of the various transmissions and reflections through these 50% splitters are all equal at a value $1/\sqrt{2}$ (which leads to the 50% power splitting). There may be an additional fixed phase delay $\theta_{ex}$ associated with any other waveguide propagations not accounted for in phase delays in the 50% splitters and the phase shifters.

Adding the fields on the two "transmission" paths through the different 50% splitters and phase shifters, the overall complex field transmissions $t^{(TB)}$ and $t^{(LR)}$ are both therefore given by $$t^{(TB)} = t^{(LR)} = t \exp(i\theta_S)\exp(i\theta_{av}) \quad (22)$$

where $$t = \cos(\Delta\theta/2) \quad (23)$$

and the background "static" phase $\theta_S$ is the sum $$\theta_S = \theta_{ex} + \theta_{trans} + \theta_{refl} \quad (24)$$

Before adding up the phases for the reflection paths, we note from Eq. (6) above, with Eqs. (20) and (21) that we can write $$\theta_{trans} = \theta_{refl} \pm \frac{\pi}{2} \quad (25)$$

Whether we use the "+" or the "−" here depends on the detailed design of the 50% splitters. (It is also possible in principle that there are additional amounts of phase in units of that could be added to the right of Eq. (25), but we neglect those for simplicity.) Adding the fields on the two "reflection" paths, we obtain $$r^{(TR)} = -r^{(LB)} = \mp r \exp(i\theta_S)\exp(i\theta_{av}) \quad (26)$$

where $$r = \sin(\Delta\theta/2) \quad (27)$$

In formally designing using this kind of dual phase-shifter Mach-Zehnder device, we can drop the additional phase factors of the form $\exp(i\theta_{up})$ as in Eqs. (8)-(11) and (16), because all the necessary phase factors are included in the field reflection and transmission coefficients $r^{(TR)}$, $r^{(LB)}$, $t^{(TB)}$ and $t^{(LR)}$. We use the choice of $\Delta\theta$ to set the magnitude of $r^{(TR)}$ and the choice of $\theta_{av}$ sets its phase, with the magnitudes and phases of $r^{(LB)}$, $t^{(TB)}$ and $t^{(LR)}$ being therefore set also.

When used as an amplitude modulator as part of implementing the singular values $s_{Dm}$ in an architecture such as that of FIG. 9, the power out of the "bottom" port will be dumped.

B7) Conclusions

In conclusion, we have shown that there is at least one constructive method to design an arbitrary linear optical component capable in principle of any spatial, polarization, and spectral linear mapping. This method can also be self-configuring. Only local feedback loops, optimizing one parameter at a time, are required. This feedback-based operation avoids the necessity of setting calculated analog values with interferometric precision in collections of optical components. The method can be extended to other linear wave problems generally. In particular, such an approach can allow simultaneous and separately modulated conversions from multiple orthogonal inputs to corresponding orthogonal outputs. Versions for certain specific uses, such as arbitrary polarization and spatial mode conversions and modulations, appear practical with current planar optical technology.

C) Application to Establishing Optimal Wave Communication Channels

We show how optimal orthogonal channels for communicating with waves between two objects can be established automatically using controllable beamsplitters, detectors and simple local feedback loops, without moving parts. Applications include multiple simultaneous orthogonal spatial channels in multimode optical fibers without fundamental splitting loss, automatically focused power delivery with waves, communication through scattering or lossy media, and real-time-optimized focused channels to and from moving objects. The approach could be exploited in optics, acoustics, and radio-frequency (e.g., microwave) electromagnetics. It corresponds mathematically to automatic singular value decomposition of the wave coupling between the objects, and is equivalent in its effect to the beam forming in a laser resonator with phase-conjugate mirrors.

C1) Introduction

Establishing optimal communication channels with waves is of obvious importance in many applications in electromagnetics and acoustics, including remote or biological sensing, and wireless or optical communications. For example, present increasing demands for telecommunications capacity are forcing the consideration of spatial degrees of freedom in multimode optical fibers so as to provide more orthogonal communications channels. One difficulty in fully exploiting multiple communications channels simultaneously is that there may be scattering between simple channels during propagation—for example, between the different spatial modes in an optical fiber or between simple beams when propagating through a scattering environment. The effects of such scattering could be relatively simply deconvolved spatially if the loss in different modes is equal because the mathematical transform between inputs and outputs remains unitary (within an equal multiplying factor across all modes), and unitary operations preserve orthogonality—in other words, in that equal loss case, if the channels are spatially orthogonal at the input, they are spatially orthogonal at the output. Based on our explicit design for a device that can separate arbitrary orthogonal waves to simple (e.g., single-mode waveguide) channels as described above, any desired spatially orthogonal inputs in such a unitary case can be separated automatically as simple orthogonal channels at the output. But, if there is different loss for different modes (i.e., mode-dependent loss or different amounts of scattering for different beams), then such simple separation is no longer possible (though optimizing a single channel is possible using overall optimization algorithms). Here, however, we describe an automatic approach to establishing the independent physical communications channels or modes even for channels with unequal transmission and for arbitrary scattering of waves.

When different modes have different losses or coupling strengths, the mathematical operator describing the mapping from inputs to outputs is no longer unitary (even within an overall multiplying constant), and non-unitary operations do not in general retain orthogonality—in other words, just choosing orthogonal input channels in this non-equal-loss case does not guarantee output channels without cross-talk. Fortunately, it is true that for essentially any linear operator (technically any compact linear operator), there is some set of orthogonal inputs that lead to some set of orthogonal outputs, with these sets being called the mode-converter basis sets. Mathematically, if we know the operator, we can always find these sets by singular value decomposition (SVD).

On the face of it, though, we might therefore need to go through the process of measuring that operator explicitly—for example, by measuring the phase and amplitude of each possible coupling from every input mode to every output mode; then in a separate SVD computational operation, we could find the necessary mode-converter basis sets to allow us to run orthogonal (i.e., cross-talk free) channels (or "communications modes") through the system. Note that when the "component" on which we are performing the SVD corresponds to the entire set of optics and propagation medium between outputs at one end of a communication system and the resulting inputs at the other end, the mathematical idea of establishing communications modes through this system is identical to finding the mode-converter basis sets of this whole system considered as a mode-converting "component". In this section, however, we show how this operation of finding the orthogonal channels can be completed automatically, based only on simple local feedback loops driving variable reflectors and phase shifters. The net result is to physically establish the actual orthogonal channels or communications modes through the system, even in the presence of arbitrary scattering and/or loss in the medium.

The approach here is quite general for any two objects connected linearly by waves of any kind (e.g., optical, acoustic, radio-frequency, quantum mechanical), with arbitrary linear scattering media between the objects. For each kind of wave, this approach requires only (i) simple wave sources, (ii) sets of wave couplers (e.g., grating couplers or antennas), (iii) intensity, power or, in general, squared-modulus detectors, (iv) controllable reflectors and phase shifters, and (v) simple local feedback loops to minimize power in each detector by adjusting a local phase shifter and reflector.

In Section C2 we discuss the simplest case of finding the optimum single channel from a simple source. In Section C3, we extend this to optimizing both ends (transmitter and receiver) for a single channel. Optimization of multiple channels simultaneously is discussed in Section C4, and we draw conclusions on Section C5.

C2) Single-Ended Single Channel Optimization

Figure 17:
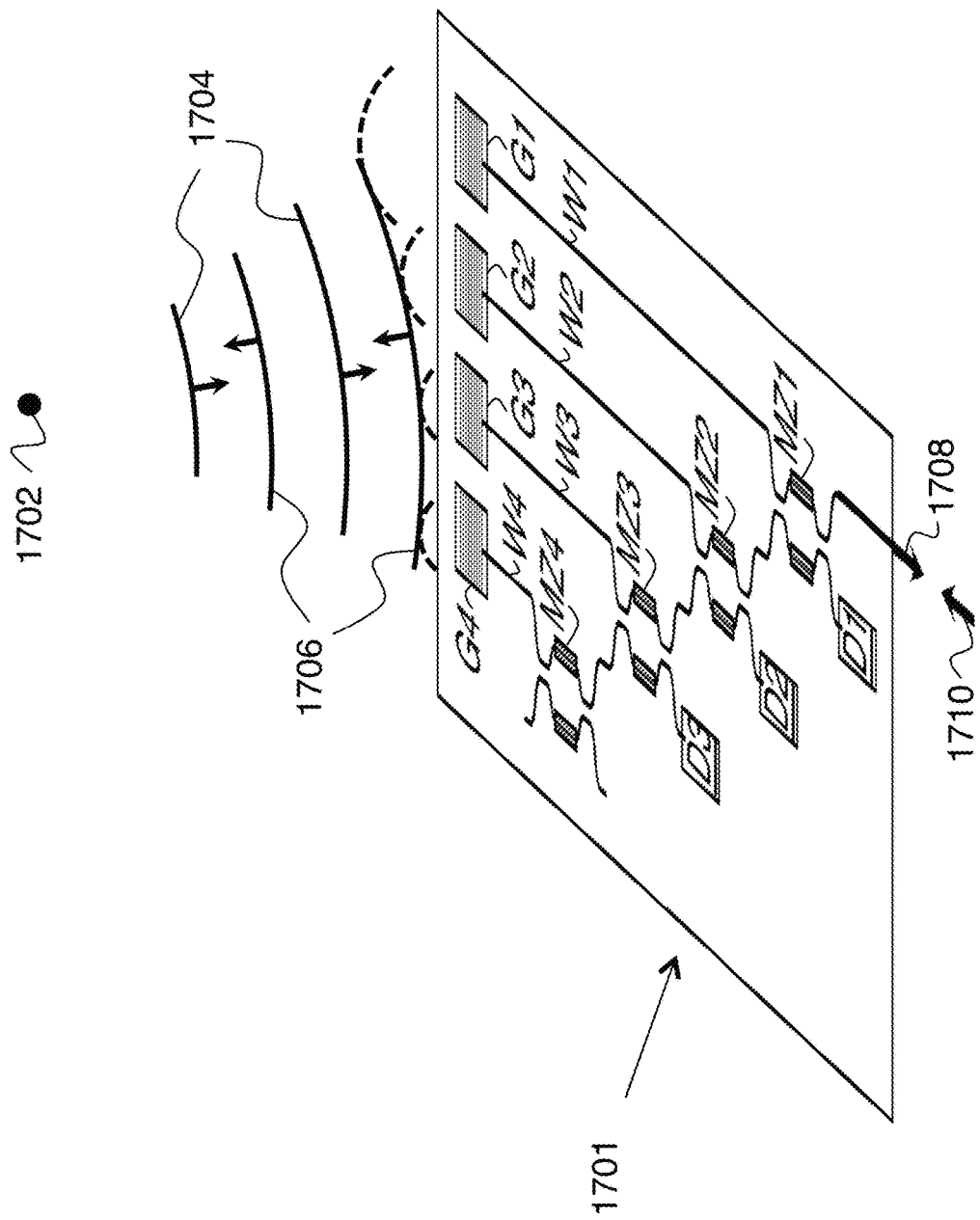
FIG. 17 shows communication between a waveguide and a free space source using a self-configuring mode coupler.

To describe how this approach works, consider first the simple free-space situation in FIG. 17, shown for a one-dimensional array of grating coupler elements for graphical simplicity. (Two-dimensional versions of the self-aligning universal wave coupler 1701 in FIG. 17 are discussed above, and those could also be employed here.)

A beam 1704 from an external "inward" source 1702 shines onto the grating couplers (G1-G4) and is coupled into waveguides W1-W4. The couplers are the inputs to a self-aligning universal wave coupler as described above, which adjusts the Mach-Zehnder (MZ) couplers MZ1-MZ4, based on signals from the photodetectors D1-D3, so as to couple essentially all the light from the grating couplers into one single-mode input/output waveguide. That light emerges as indicated by arrow 1708 from the single-mode input/output waveguide at the bottom right of FIG. 17.

The operation of the self-aligning coupler is as described above. Briefly, in the present example, light coupled in through grating coupler G4 passes through MZ4, which is operated only as a phase shifter; phase shift in a MZ can be set by the common mode drive of the phase shifters in its two arms. (A simple phase shift element could also be substituted for MZ4). That phase shifter is adjusted to minimize the detected power (coming from both G4 and G3) in detector D3. Then we adjust what we can call the "reflectivity" of MZ3 (through the differential drive of the phase shifters in the MZ arms) to minimize the power in D3 again (ideally now to zero power). (By "reflectivity" here we mean effectively how the incident power in one input arm of the MZ interferometer is split between the two output arms, in the spirit of operating the MZ device as a variable beam splitter; we do not mean back-reflection from the interferometer, which we presume here to be effectively zero in all cases.) Next, the power in D2 is minimized similarly, first through the common mode drive of MZ3 and then through the differential drive of MZ2, and so on for any successive detectors and MZ couplers. The net result of this whole process is to end up with settings of the MZ interferometers such that there is negligible or zero power into any of the detectors, and so all the "inward wave" power now emerges from the single-mode input/output waveguide.

So far, we have merely summarized the operation of the self-aligning universal mode coupler. Now, however, we shine a "backward wave" into the single-mode input/output waveguide, as shown by the arrow 1710 at the bottom of FIG. 17. This wave will experience the same phase delays and amplitude splitting as the inward wave did as it propagates back to the grating couplers. We can think of the set of (complex) amplitudes in the single modes in the waveguides W1-W4 connected to the grating couplers as being a supermode of those single-mode guides. The net result of this process is that the backward wave going into the grating couplers in W1-W4 represents the phase conjugate of the inward wave in W1-W4 coming from the grating couplers.

To understand this backwards behavior more intuitively, note first the self-aligning universal mode coupler will adjust its internal phase delays and reflectivities so that all the "inward" waves add in phase by the time they get to the single-mode input/output guide. Since, in FIG. 17, an inward phase front will arrive last at grating coupler G1, then this path will be set during the self-alignment to have the shortest phase delay. When running the device backwards now, the phase front will therefore get first to G1, so it will launch first, as required so as to get the backward phase fronts 1706 curved as shown. We can argue similarly for the phase delays to the other grating couplers. The net result is to generate phase fronts 1706 going back towards the original inward source 1702 (at least approximately so).

Of course, this device is only sampling the phase fronts at discrete points or regions (in FIG. 17, four averaged points corresponding to the four grating couplers). But, in the spirit of Huygens' principle, the wavelets (sketched as dashed lines) from these sources construct their best representation of the backward-propagating phase fronts 1706. We also understand that there are various other ways of implementing the self-aligning universal mode coupler in FIG. 17, as discussed above. These include the addition of lenslets in the optical case and, in a microwave case, the use of antennas instead of the grating couplers.

The device of FIG. 17, as it stands, is already useful for establishing a backwards channel to this inwards source, a channel that could be used for communicating efficiently back to that source in a bidirectional link, for example. Such a channel could also be used for remote power delivery from the backward wave source to some appropriate power detector at the inward wave source. Alternatively, by partially back-reflecting the inward power leaving the single-mode guide so that this reflected power gives a backward wave (i.e., the beam represented by arrow 1710 could be formed from some reflected power from the beam represented by arrow 1708), the optimized bidirectional channel could be created without the need for another source for the backward wave. Conceivably, in that case detected power in the self-aligned wave coupler could be used to power that entire device and its feedback loop electronics, allowing a remote element with no local power source for, e.g., environmental sensing or biological applications. Note, too, that an approach like this will also work even if there is a scattering object in the way between the inward source and the self-aligning universal mode coupler, as is well known for phase conjugate optics.

We could also run the device of FIG. 17 starting with light into the single-mode input/output waveguide as the optical source (i.e., arrow 1710 represents the source light), leading to a beam propagating out towards the position of source 1702; the scattering off source 1702 could constitute the backwards wave 1704 and 1708 that we would then use to optimize wave 1706 so that it focused more effectively onto source 1702. Such an operation mode could also be useful for addressing remote sensors, including power delivery to them.

Since the feedback sequence in this self-aligning mode coupler can be left running continuously, this approach could also be used even if source 1702 and the self-aligned universal mode coupler are moving relative to one another, thus allowing this bidirectional channel to "track" with relative movement.

The inward wave 1704 and backward wave 1706 could be at the same frequency here, or they could be at different frequencies or with finite bandwidths of sources provided only that the relative phase delays for the different frequencies or bandwidth range in the different optical paths from grating couplers to the single-mode input/output waveguide are all substantially similar within the frequency or wavelength range of interest. Keeping all the optical path lengths from the different grating couplers to the single-mode input/output waveguide approximately equal is desirable for keeping such approximate frequency-independence of the relative phase delays in the different paths.

C3) Double-Ended Single Channel Optimization

Figure 18A:
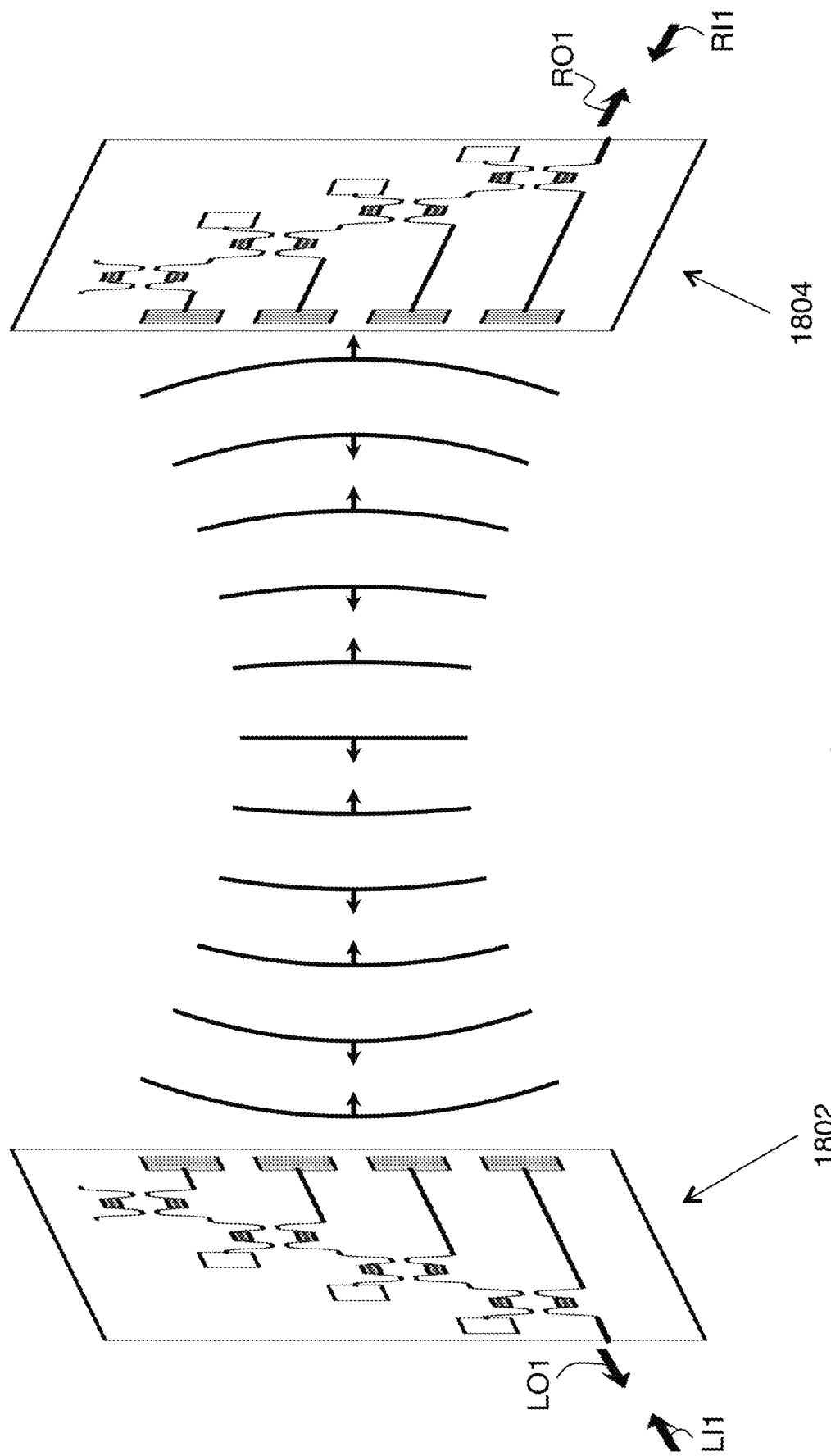
FIG. 18A shows communication between two single-channel self-configuring mode couplers in free space.
Figure 18B:
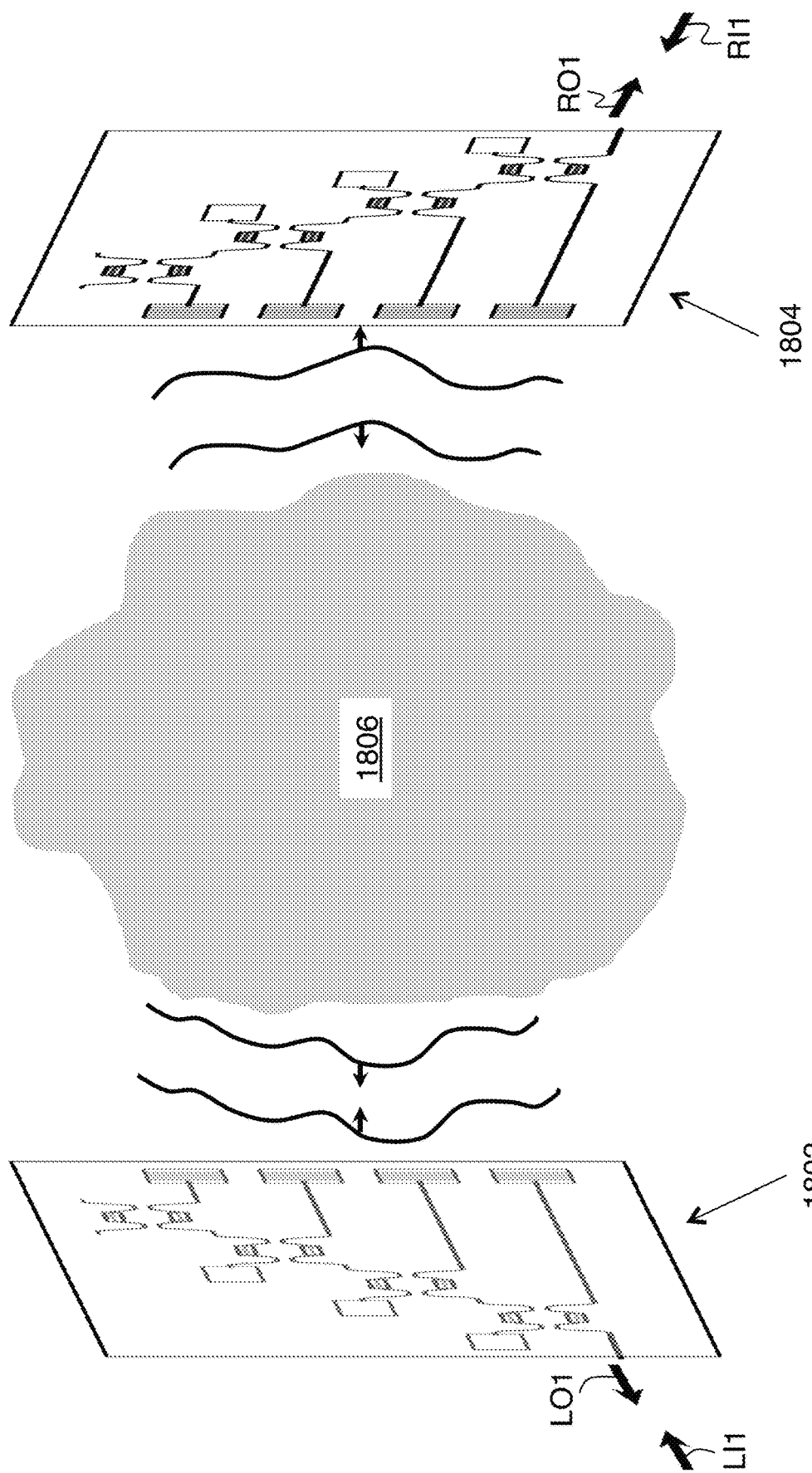
FIG. 18B shows communication between two single-channel self-configuring mode couplers with intervening scattering.

The approach as shown in FIG. 17 does not itself incorporate any optimization of the inward source form. Such optimization could result in better coupling efficiencies overall in such a bidirectional system. FIGS. 18A-B show versions in which self-aligning mode couplers are used at both ends of the link. Mode coupler 1802 is on the left and mode coupler 1804 is on the right. FIG. 18A shows the free space case, while FIG. 18B shows the case of an intervening scattering object 1806.

An interesting question now is to understand the nature of the wave that will form in the case of FIGS. 18A-B if two self-aligning universal mode couplers are running one into the other. To understand this mathematically, we can use the result that, for essentially any linear operator relating waves or sources in one ("left") space to waves in another ("right") space, we can perform the singular value decomposition (SVD) of the resulting coupling operator to define two complete orthonormal ("mode-converter") basis sets, one set $|\phi_{Lm}\rangle$ for the "left" space and a corresponding set $|\phi_{Rm}\rangle$ for the "right" space. Here, for example, we could think of the "left" ("right") space being the waves on the surface of the grating couplers on the left (right). It may be mathematically cleaner and simpler, however, to consider functions in the "left" mathematical space as being the set of amplitudes of the single modes in the waveguides going into the grating couplers (i.e., a supermodes of those waveguides) in the "left" side coupler 1802, and the "right" space as being correspondingly the set of amplitudes of the single modes (or supermodes) in the waveguides coming out of the grating couplers in the "right" side coupler 1804.

For the example structures in FIGS. 18A-B, any function in either of these mathematical spaces is therefore representable as a four (complex) element vector (at least if we consider monochromatic fields for the moment); in general, with similar systems each with M grating couplers and waveguides on each side, the corresponding basis (supermode) functions would be M (complex)-element vectors.

With the mathematical spaces chosen this way, the coupling "device" operator D between the "left" space and the "right" space is an M×M matrix. The fact that we can essentially always perform the SVD of D means not only that we could obtain the two sets $|\phi_{Lm}\rangle$ and $|\phi_{Rm}\rangle$, each comprising M different vectors, but also that these vectors are connected one by one with specific (field) coupling strengths given by the singular values $s_m$. That is, for each of the M different orthogonal "left" functions (or supermodes) $|\phi_{Lm}\rangle$ $$D|\phi_{Lm}\rangle = s_m|\phi_{Rm}\rangle \qquad (28)$$

Hence, at least mathematically, we can have M orthogonal channels (or, in a generalized sense, communications modes), with the orthogonal "left" output supermodes $|\phi_{Lm}\rangle$ giving orthogonal "right" input supermodes $|\phi_{Rm}\rangle$, each with corresponding amplitude $s_m$. Note that these sets of functions $|\phi_{Lm}\rangle$ and $|\phi_{Rm}\rangle$ are each mathematically complete for their respective spaces.

Suppose, then, that we start out with some arbitrary setting of the "left" set of MZ interferometers, and shine a left input beam LI1 into the single-mode input/output waveguide on the left. We will therefore have some output supermode going to the "left" grating couplers in the "left" waveguides, which we can expand in the complete set $|\phi_{Lm}\rangle$, i.e., $$\left|\phi_L^{(1)}\right\rangle = A_L^{(1)} \sum_{m=1}^{M} a_m \left|\phi_{Lm}\right\rangle \qquad (29)$$

where $A_L^{(1)}$ is a factor related to the power in the LI1 beam, and the coefficients $a_m$ result from the arbitrary initial setting of the MZ interferometers. Now we send this out through the "left" grating couplers and the intervening space (which might include some scattering object 1806) to the "right" grating couplers. The resulting supermode set of amplitudes in the waveguides coming out of the "right" grating couplers is, when expanded on the set $|\phi_{Rm}\rangle$, $$\left|\phi_R^{(1)}\right\rangle = D\left|\phi_L^{(1)}\right\rangle = A_L^{(1)} \sum_{m=1}^{M} s_m a_m \left|\phi_{Rm}\right\rangle \qquad (30)$$

Now, we run the self-alignment process in the "right" self-aligning mode coupler, fixing the resulting "right" MZ settings and effectively maximizing R01, the received light from the LI1 source. Next, we turn on the backwards light source RI1, generating a backwards propagating wave. We presume the optical system through the grating couplers and the intervening space or scatterer is made from materials with symmetric permittivity and permeability tensors, as is nearly always the case in optical materials in the absence of static magnetic fields, and that this system is not time-varying, or that any time variation is negligible over the time scales of interest. As a result, this optical system shows reciprocity. Because of that reciprocity, we know that if a given supermode from the "left" waveguides propagated forward through the system to one particular "right" supermode, without scattering to any of the other "right" modes, and with a complex transmission factor $s_m$, then the same supermode going backwards (i.e., in a phase-conjugated fashion) will also proceed without scattering to other backwards modes, and will have the same complex transmission factor $s_m$ (i.e., the same magnitude of field transmission and the same phase pick-up) going backwards. Hence each supermode will return to the original "left" device, in phase-conjugated form, with an amplitude $s_m^2 a_m A_R^{(1)} A_L^{(1)}$ where now $A_R^{(1)}$ is a factor related to the power in the RI1 beam.

Next, we run the self-alignment process in the "left" self-aligning mode coupler. The LI1 beam will now lead to some output $$\left|\phi_L^{(2)}\right\rangle = A_L^{(2)} \sum_{m=1}^M s_m^2 a_m \left|\phi_{Lm}\right\rangle \quad (31)$$

where $A_L^{(2)}$ is some factor related to the LI1 beam power. Going round this loop again—i.e., running the self-alignment process in the "right" self-aligning mode coupler, using the RI1 light source to send the beam back again, and running the "left" self-alignment process once more—will lead to some LI1 output $$\left|\phi_L^{(2)}\right\rangle = A_L^{(3)} \sum_{m=1}^M s_m^4 a_m \left|\phi_{Lm}\right\rangle \quad (32)$$

We can see now that what is happening is that the communications mode with the largest singular value (i.e., field coupling strength) magnitude will progressively dominate over the other modes as these singular values $s_m$ are raised to progressively higher powers every time we go round this loop.

Since the numbering of the communications modes here is up to us, we can always choose to number them by decreasing magnitude of $s_m$. So, regardless of the initial (presumably non-zero) strength (i.e., its coefficient $a_1$) of the mode with the largest singular value, eventually, after sufficiently many iterations of running the self-alignment processes on the "right" and "left" self-aligning mode couplers, the output will tend to the most strongly coupled mode.

Thus, this system in FIGS. 18A-B, when run with only local optimizations in the self-aligning mode couplers at each side, will find the most strongly coupled communications mode between the waveguides in these two devices, regardless of the form of the scattering between the devices (and regardless of the form of the grating couplers or other wave coupling devices in and out of the waveguides). This whole process is, of course, strongly analogous to the build up of the mode with the highest gain in a laser resonator; the analogy between communications modes and the laser modes of a resonator with phase conjugate mirrors at both ends has been pointed out in the literature for the simple free-space case, and we have generalized this result here.

C4) Double-Ended Multiple Channel Optimization

The devices in FIGS. 17 and 18A-B only show a single spatial channel associated with a given self-aligning mode coupler. Following the previous discussions of related devices, we can also make versions of such devices that can handle multiple orthogonal modes simultaneously.

Figure 19:
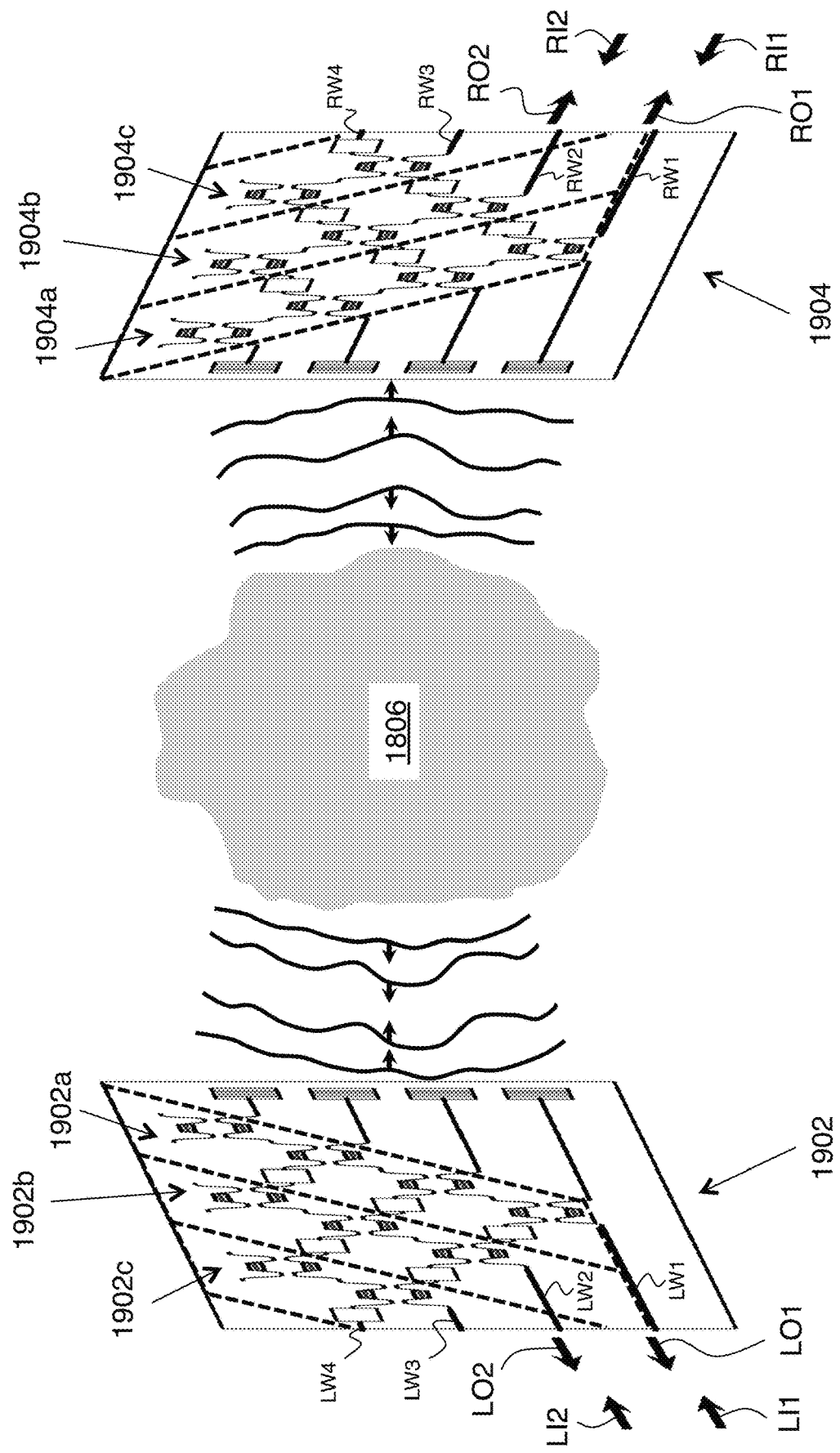
FIG. 19 shows communication between two multi-channel self-configuring mode couplers with intervening scattering.

FIG. 19 shows a version of the device of FIGS. 18A-B, but configured with additional MZ interferometers and detectors in the left side 1902 and the right side 1904. The various detectors in FIG. 19 are presumed to be mostly transparent, sampling only enough of the beam power passing through them to give enough signal to run the feedback loops. In general with such devices, with M input couplers, we can make a device that can handle M orthogonal modes simultaneously. The device in FIG. 19 can handle 4 orthogonal modes, and beams and waves are sketched explicitly for two orthogonal modes. Here the dashed diagonal lines indicate different "rows" of Mach-Zehnder interferometers and detectors used to set the different orthogonal modes. Thus left side 1902 has "rows" 1902a, 1902b, and 1902c. Similarly, right side 1904 has "rows" 1904a, 1904b, and 1904c.

To set up two orthogonal channels in the device of FIG. 19, we could first proceed as for the device of FIGS. 18A-B, turning on the LI1 and RI1 beams input into waveguides LW1 on the left and RW1 on the right, respectively, and adjusting the MZ settings using the signals from their corresponding detectors (now the interferometers and detectors in the diagonal rows 1902a and 1904a of FIG. 19) as described above to establish the first optimized channel, with corresponding supermodes $10n$) and $|\phi_{R1}\rangle$ in the waveguides leading to the grating couplers on the left and on the right, respectively.

A key point to note now is that, regardless of the settings of the MZ interferometers in rows 1902b and 1904b, shining light into waveguide 2 (e.g., light LI2 into waveguide LW2 on the left or shining light RI2 into waveguide RW2 on the right) leads to LI2 and RI2 supermodes in the waveguides connected to the grating couplers that are orthogonal to the supermodes $|\phi_{L1}\rangle$ and $|\phi_{R1}\rangle$, respectively. None of the power shining into waveguide 2 (i.e., LW2 or RW2) on either side gets to waveguide 1 (i.e., LW1 or RW1) on the other side. So, now, leaving the devices in rows 1902a and 1904a fixed at the settings we just established for the optimized LI1-RI1 channel 1, we can run the same kind of optimization procedure for the devices in rows 1902b and 1904b with the LI2 and RI2 beams that we originally ran for the devices in rows 1902a and 1904a with the LI1 and RI1 beams. This process leads to supermodes $|\phi_{L2}\rangle$ and $|\phi_{R2}\rangle$ that are orthogonal, respectively, to the supermodes $|\phi_{L1}\rangle$ and $|\phi_{R1}\rangle$.

Now we have established two orthogonal channels. Light shining into waveguide LW1 on the left appears only at waveguide RW1 on the right. Similarly, light shining into waveguide LW2 on the left appears only at waveguide RW2 on the right. We can repeat a similar procedure for any remaining rows of devices. In our example here, we have only one remaining row, which we can set to establish a third orthogonal channel, now between waveguides LW3 and RW3. Automatically, we also establish the final orthogonal channel—between waveguides LW4 and RW4. In general, to establish M orthogonal channels, we need to run our optimization process on M–1 rows of interferometers and detectors.

Hence, we have now established all the independent orthogonal communications mode channels between one side and the other, regardless of the scattering medium between the two sides (as long as it is reciprocal). These channels are in order of decreasing coupling strength.

If we have no other way of distinguishing between the various beams in the detectors, the scheme described here does require that, in setting the device, we first work with the LI1 and RI1 beams, with the other beams turned off, and only progressively turn on the light in the other waveguides, holding fixed the interferometer settings in preceding rows. This particular scheme cannot be left running continuously to optimize all the modes as the system changes (e.g., for relative movement of the two object or for changes in the scattering); to re-optimize the LI1-RI1 channel 1, we would need to turn off the other beams, for example. There are, however, many ways we could effectively make the beams distinguishable in the signals they give in the detectors. For example, we could impose different low frequency small modulations on each of the beam sources. The feedback electronics connected to each row of detectors could then be programmed to look only for the corresponding modulation frequency (for example, using lock-in detection). Alternatively some other code could similarly be imposed on each of the beams, with corresponding decoders to pick out such coding. With such schemes, the different modes could all be optimized simultaneously with all the beams running, for example, by stepping through the optimizations of the modes one by one, in sequence from mode 1 upwards, and continuing to cycle through all the modes in such a manner.

The use of heterodyne or homodyne detection approaches in the detectors could lead to very specific identification of channels. For example, if we use back reflected LI1 light to provide the RI1 input in these methods, then, by mixing with portions of the original LI1 beam, we have the option of homodyne detection in the detectors on the left, which could allow very specific discrimination against any other signals of even slightly different frequencies incident on the grating couplers on the left, e.g., from the environment. Imposing a modulation, e.g., from a modulator inserted in the input/output waveguide just before the back-reflection on the right, would allow heterodyne detection on the left; looking in the detector outputs on the left for the desired frequency sideband imposed by the modulation on the right would also allow discrimination against any direct back-scatter from the scatterer or from optical components in the path, of the original LI1 beam from the left back into the left self-aligned mode-coupler on the left; only the actual beam from the device on the right would have this side-band present.

C5) Conclusions

We have presented an approach that allows two objects to establish optimal channels for communication in the presence of arbitrary scattering or loss in different physical modes. The approach is based only on local feedback loops minimizing detector signals as parameters of beamsplitters, intereferometers or phase shifters are adjusted progressively. Importantly, multiple optimized orthogonal spatial channels can be set up and maintained simultaneously, without any fundamental splitting loss. The different modes can be optimized sequentially by cycling through the optimizations of them. The mathematics of the resulting optimized communications modes is analogous to the formation of laser modes in a cavity with two phase-conjugate mirrors, though no laser action in the device is required.

There are many possible applications of this approach. It can be used to establish orthogonal spatial channels through media such as multimode optical fibers, free space, scattering objects (such as biological tissue), atmospheric turbulence and turbulence in fluids. Such an approach could also allow imaging of multiple pixels through such media. It can find optimum modes for communicating into and out of remote sensors or communications devices (such as mobile phones), including possibly finding the sensors on the basis of their back-scattered signal. It can be used for optimal power delivery to remote devices, including possibly external powering of sensors, while simultaneously establishing communications channels. It can steer beams and track moving objects while retaining optimized communications and/or power delivery, allowing a kind of active lidar that could follow detected target objects. Extensions can allow continuous simultaneous optimization of multiple channels, an approach that could also allow simultaneous tracking of multiple moving objects or beacons; modulation of a launched or backscattered signal from a remote device and/or the use of homodyne or heterodyne detection together with this approach could allow optimization of very specific channels while rejecting environmental interference and back-scatter from the intervening medium.

We have shown here specific examples using Mach-Zehnder interferometers in a planar optical platform as an illustration. Other approaches that can allow controllable reflectivity and phase in wave elements could exploit the same overall approach, and different technologies could be exploited in other wave domains, such as microwaves, where many corresponding components are known.

D) Application to Add-Drop Multiplexing

D1) Introduction

In optical fiber telecommunications, the ability to drop and add a single wavelength channel without having to convert all the channels in and out of electronics has been very useful; reconfigurable optical add-drop multiplexers (ROADMs) have allowed convenient expansion of systems, adding channels and reconfiguring networks as needed. Recently, there has been growing interest in exploiting spatial modes in fibers and in free-space communications, especially with multiple overlapping modes and including angular momentum beams. It has not been clear, however, how (or even if) it would be possible to make add-drop devices for arbitrary spatial modes. Separating overlapping spatial modes without fundamental splitting loss has been difficult, with relatively few examples known even for quite specific mode forms.

However, the above described technology can address this issue. Here, we exploit this approach to provide a spatial reconfigurable add-drop multiplexer (SRADM) that can drop and add any specific spatial mode while passing through all modes orthogonal to it, all without fundamental splitting loss. As in the self-aligning mode coupler and its extensions described above, this method can automatically select the mode of interest, and requires no calculations. This approach can also simultaneously add or drop multiple modes and can be "hitless", allowing coupling in and out of one mode without affecting the transmission of other modes.

D2) Device Concept

Figure 20A:
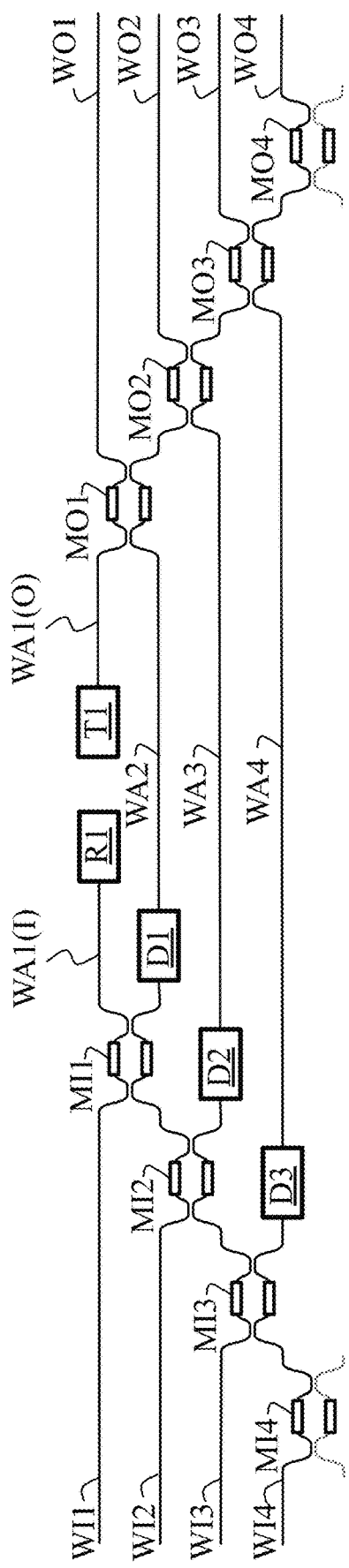
FIG. 20A shows use of a wave combiner and a wave mode synthesizer to provide add-drop capability in a multi-mode system.
Figure 20B:
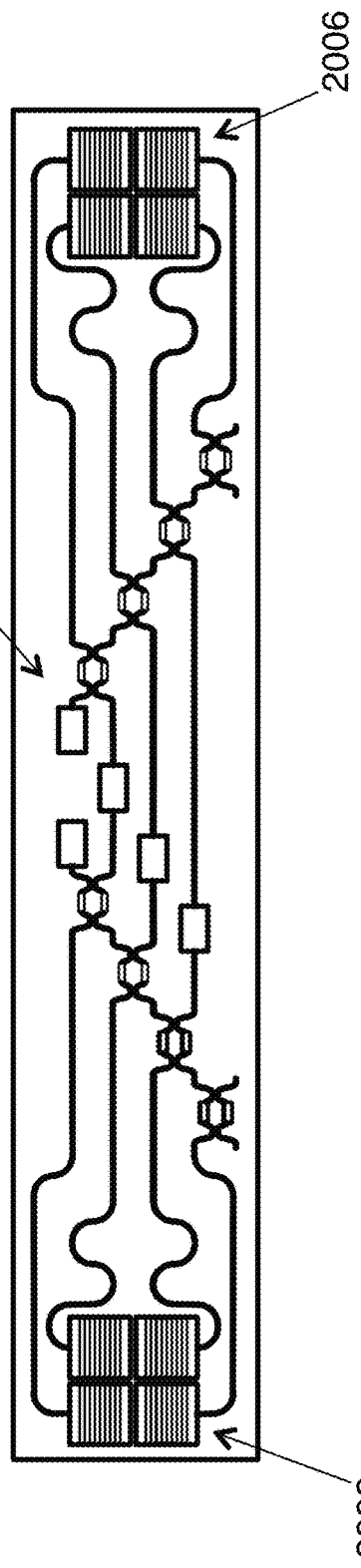
FIG. 20B shows use of grating couplers to provide beam coupling for the example of FIG. 20A.

The basic SRADM device concept is sketched in FIGS. 20A-B for input channels WI1-WI4 and output channels WO1-WO4. The Mach-Zehnder interferometers MI1-MI4 are set by minimization using the signals from the mostly-transparent detectors D1-D3 to route the spatial mode of interest (the add-drop mode) to receiver R1, and the Mach-Zehnder interferometers MO1-MO4 are set to the same "reflectivities" (split ratios) and opposite phase shifts compared to MI1-MI4. Then, all of the add-drop beam input signal goes to receiver R1, all other orthogonal beams pass through the system on waveguide WA2-WA4, and a new beam launched from transmitter T1 takes on the same spatial mode as the add-drop mode at the output. MI4 and MO4 are operated only as phase shifters so the lower arm is optional and included only for path symmetry. FIG. 20B shows a conceptual planar layout with input and output grating coupler arrays 2002 and 2006 respectively, with equalized waveguide lengths in all paths. Here the entire SRADM is referenced as 2004.

Conceptually, we collect light from multiple different patches in the input beam—in this example, with grating couplers—and send the resulting waves into different waveguides. Other promising approaches for such coupling into waveguides from a complicated input beam include photonic lanterns. Then we use controllable beam splitters and phase shifters—in this example, implemented with Mach-Zehnder interferometers (MZIs) (MI1-MI4)—to route the input wave of interest (i.e., in the "add-drop" mode) to a receiver (R1). All other orthogonal input modes are passed through the mostly-transparent photodetectors (D1-D3) into another set of beam splitters and phase shifters, configured in an appropriate complementary fashion that restores the original form of all these other "straight-through" modes and allows a new signal on the add-drop mode to be broadcast from the transmitter T1. The collection of waves in the output waveguides is then coupled to corresponding output elements (here, again, grating couplers as an example) to form the output light.

The set of MZIs MI1-MI4 and the detectors D1-D3 exactly constitute a self-aligned mode coupler as described above; we can briefly summarize its operation here. MZIs can be operated as phase shifters by driving both phase shift arms equally (common mode drive) and as variable "reflectivity" beam splitters (without additional phase shift) by driving the arms oppositely (differential drive). (Here total "reflection" in the beam-splitter sense corresponds to the "bar" state of the device in which light into the left top port emerges totally from the right top port and similarly for light from the left bottom to right bottom ports; total "transmission" would correspond to the opposite "cross" state of the device. "Reflection" in this beam-splitter sense does not mean reflection backward up the waveguide.)

To route all of the desired add-drop mode (which we can view here as a supermode of the input guides WI1-WI4) into a single guide WA1(I) to go into the receiver R1, we shine the add-drop mode into the device and use a sequence of minimizations of signals in the detectors D1-D3 by adjusting the MZIs. We first adjust the phase in MI4 to minimize the detected signal in D3. (MI4 is used only to change the transmitted phase and could be replaced by a simple phase shifter.) Then, we adjust the "reflectivity" of MI3 (by differential drive) to minimize the D3 signal again (ideally now to zero because of perfect interference cancellation). Next we adjust the phase of MI3 (by common mode drive) to minimize the D2 signal, and then adjust the "reflectivity" of MI2 to minimize the D2 signal again, and so on along any subsequent modulators and detectors. The net result of this process is to put all of the power from the input add-drop mode into the input of receiver R1. The detectors D1-D3 are chosen to be mostly transparent, so most of any ultimate power that lands on them passes through. After this process with only the add-drop mode incident on the device, there is ideally no power remaining in these detector paths, with all the power routed to receiver R1.

As we set the drives for MI1-MI4, we can simultaneously set the drives for MO1-MO4, the MZIs in the output side of the device. Here, we set their split ratios ("reflectivities") the same as the corresponding MZIs MI1-MI4, but we set their phase shifts oppositely; i.e., the differential drive in MI1 is the same as in MO1, but the common mode drive is opposite, and similarly for the other pairs of MZIs. To understand why we set the phases in this phase-conjugate fashion, suppose for the moment that the receiver R1 and the transmitter T1 are not present and that the waveguide WA1 forms a continuous path from MI1 to MO1 (i.e., WA1 (I) and WA1(O) are joined to make a continuous waveguide), and neglect any power loss or additional phase delay associated with the detectors D1-D3. Consider, for example, the coefficient $u_{24}$ that gives us the field $f_{42}$ amplitude in one of the center waveguides, WA2, as a result of the field $f_{14}$ amplitude in input waveguide WI4, i.e., $f_{42}=u_{24}f_{14}$. Now, $u_{24}$ is simply the product of (i) all the field "transmissivities" $t_{14i}$ $t_{13}$, and $t_{12}$, through MI4, MI3, and MI2, (ii) the field "reflectivity" $r_{f1}$ of MI1, and (iii) the additional phase delay factors $\exp(i\phi_{I4})$, $\exp(i\phi_{I3})$, $\exp(i\phi_{I2})$, and $\exp(i\phi_{f1})$ from the settings of each of the MZIs MI1-MI4, respectively; i.e., $$u_{24}=t_{I4}t_{I3}t_{I2}r_{f1} \exp[i(\phi_{I4}+\phi_{I3}+\phi_{I2}+\phi_{f1})] \qquad (33)$$

(Note that all the field "transmissivities" and "reflectivities" here are real numbers because of the way we define them.)

Now we can examine the corresponding coefficient $v_{42}$ that gives us the output field in waveguide WO4 as a result of the field in center waveguide WA2; we find, with our choices that all the MZI "reflectivities" (and hence also "transmissivities") are set the same but all the phase shifters are set oppositely in MO1-MO4 compared to those of MI1-MI4, $$v_{42}=t_{I4}t_{I3}t_{I2}r_{f1} \exp[-i(\phi_{I4}+\phi_{I3}+\phi_{I2}+\phi_{f1})]=u_{24}^* \qquad (34)$$

We can repeat this analysis for any other such coefficient. We therefore find that the matrix V of the coefficients $v_{ij}$ is simply the Hermitian adjoint of the matrix U of coefficients $u_{pq}$. On the presumption for the moment that this whole system is lossless, each of these matrices is necessarily unitary. Given that the inverse of a unitary matrix is its Hermitian adjoint, the product VU is simply the identity matrix. Hence, with all four waveguides in this example passing straight through the SRADM device, the net effect is to give output fields in the four waveguides WO1-WO4 exactly the same as the input fields in WI1-WI4.

Now, given that we have set the device so that all the add-drop mode of interest goes entirely to the top waveguide, then none of the other three possible orthogonal spatial modes can go to this waveguide at all (it is, for example, provably impossible to loss-lessly combine power from different orthogonal modes), so all of the field and power of these other three modes goes through the lower three waveguides WA2-WA4. Hence it does not matter for those modes if we interrupt the top waveguide for add-drop functions. By similar arguments, we can see that this process will also reconstruct the add-drop mode at the output with the signal from transmitter T1; in the case of the add-drop mode, it does not matter for the form of the output if the field in waveguide WA1(O) comes directly from waveguide WA1(I) or if it comes from the transmitter T1.

So far, we have presumed loss-less components, which leads to the unitarity of the matrices U and V. The arguments will remain valid if there is equal overall additional loss for all waveguide paths from the input waveguides to the center waveguides and from the center waveguides to the output waveguides; in such a case, each of U and V is a unitary matrix within a single multiplying constant and the necessary orthogonality properties of functions are retained even if there is overall loss in the system. Since the MZIs may have some loss associated with them, one possible strategy is to ensure that all paths pass through equal numbers of MZIs by adding dummy "bar-state" MZIs.

Figure 21:
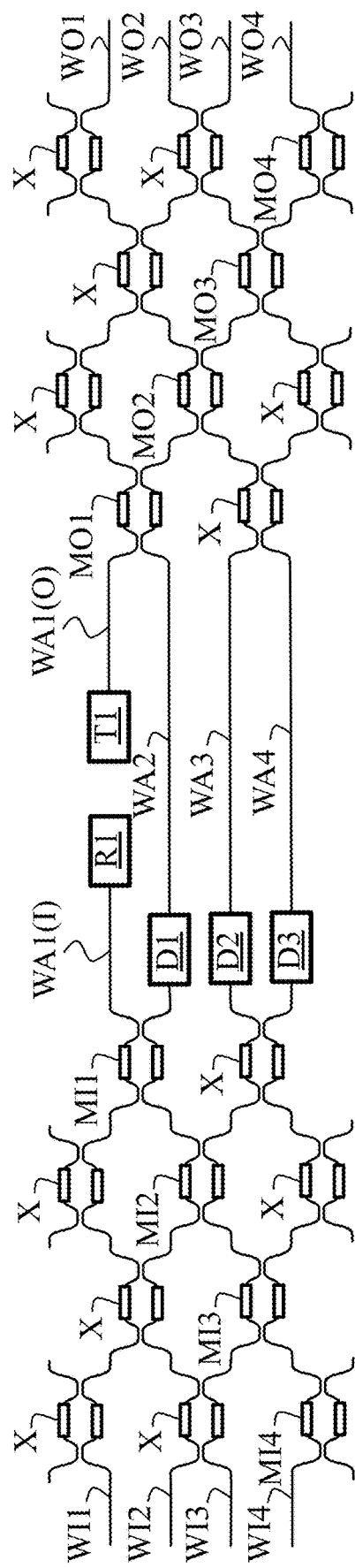
FIG. 21 shows addition of dummy devices to the example of FIG. 20A to equalize path lengths/loss.

FIG. 21 shows a device as in FIG. 20A but with added dummy MZIs (each referenced as "X"), set in their "bar" state and with a standard phase shift, for greater equality of loss and path length. By completing rectangular blocks of MZIs by, on the left, adding 3 in WI1, 2 each in WI2 and WA4, and 1 each in WI3 and WA3, and similarly for a rectangular block on the right, we would ensure all left-to-right paths went through 8 MZIs, 4 on each side. Another approach to this device that uses fewer MZIs overall and does not require dummy devices would be to exploit the binary tree architecture described above with mostly-transparent detectors and with waveguides similarly connecting between the corresponding points on the two sides, though that approach can require crossing waveguides.

If the overall form of all the modes is to be retained in passing through the device, it is important that, other than the phase differences deliberately imposed with the MZIs, the phase delays in different paths should be essentially equal, at least modulo $2\pi$. Otherwise, the device will affect the form of the other modes (i.e., those orthogonal to the add-drop mode). They will still be orthogonal on leaving the device (and will still be orthogonal to the add-drop mode), but they will be changed by such undesired phase differences in the paths. So that the behavior can be substantially independent of wavelength, it is also desirable that the total path lengths of each waveguide path from input to output are substantially equal overall. Otherwise, as wavelength is changed there is relative phase change between paths of different lengths; that relative phase change will prevent one SRADM device setting from working with multiple different wavelengths in extracting the add-drop spatial mode, and will upset the correct reconstruction of the other spatial modes at different wavelengths. The schemes in FIGS. 20A-B have such substantial equality of paths, and adding the dummy MZIs as in FIG. 21 retains and possibly enhances such equality. Note in FIG. 20B that waveguide lengths are added on the two inner paths to and from the grating couplers so as to equalize the overall waveguide lengths.

Whether we can use the same device settings for different wavelengths also depends on the transmission medium, such as an optical fiber. If we launch power into a spatial beam form that is a combination of modes of different phase velocities in the fiber, then the beam form will change as it propagates down the fiber. That change in beam shape is not itself a problem for this add-drop device—it will still align itself to that beam shape. If there is also dispersion in the fiber so that, with sufficiently different frequencies, the arriving beam shape is substantially different for different frequencies, then we need to use different SRADMs for different frequencies, separating those frequencies before the SRADMs (e.g., by putting wavelength splitters in each of the waveguides WI1-WI4 to separate to different SRADMs and corresponding wavelength combiners in the waveguides WO1-WO4 to combine the outputs from different SRADMs). If the received beam shape does not vary substantially with wavelength, we can use one SRADM, and we could instead put wavelength splitters before the receivers, and wavelength combiners after the transmitters, if we wanted to have separate wavelength channels.

In this discussion, we have used only 4 waveguides and 4-element input and output couplers as an illustration. The SRADM concept is simply extended to larger numbers of elements. How many elements we need in a given situation depends on the complexity of the beams we are working with. If our device is to separate one mode from M possibilities (and hence also to pass M−1 other modes through the device), we need to have at least M beam coupling elements (e.g., grating couplers) and M waveguides with associated adjustable beam splitters and phase shifters (e.g., MZIs).

D3) Multiple Channel Systems

D3.1) Setup with Multiple Active Spatial Modes

So far, we have discussed setting up the SRADM device when only the add-drop mode of interest is present at the input. In a real communications system, it would be very desirable be able to set up the SRADM up when possibly all of the spatial modes were in use. This could be achieved here by a simple additional coding on the add-drop channel. For example, at the original source of the various spatial channels, we could impose specific small low-frequency power modulation on the signals, at a different frequency for each channel. Then, to lock on to a specific channel, we would look for signals coming out of the detectors D1-D3 with that frequency component, which could be achieved with a narrow band electrical filter or a lock-in amplifier technique. Then power in other orthogonal modes would be ignored by these detectors, allowing the feedback loops to operate on the desired add-drop mode even in the presence of other modes.

Note that this approach allows the overall multimode communications channel to have arbitrary scattering between different orthogonal spatial modes (e.g., in an optical fiber) as long as that scattering itself is linear and loss-less (or equal for all modes) and can therefore be represented by a unitary operator (at least within a multiplying constant). Such unitary scattering (at least within a multiplying constant) retains orthogonality between channels even if each channel is now represented by a different spatial function, and this device could therefore still lock on to the desired channel and pass the others even if the spatial modes themselves had become mixed in such a unitary fashion. See section C above for a discussion of how to handle non-unitary linear scattering between modes.

D3.2) Bypass and Hitless Operation

Figure 22:
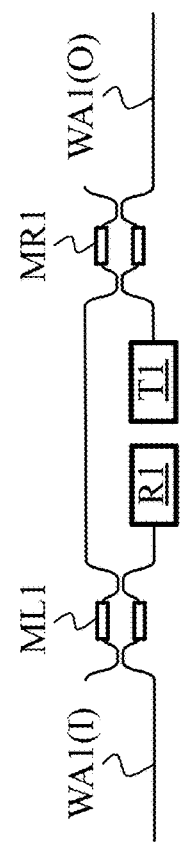
FIG. 22 shows an exemplary implementation of bypass capability.

We could extend the SRADM device to add a "bypass" function. In such a bypass case, the signal that would normally be dumped into the receiver is instead routed round the receiver and transmitter, just like routing a train round a station. This could be accomplished by adding appropriate routing switches (such as additional Mach-Zehnder interferometers) in front of the receiver and just after the transmitter, together with a bypass waveguide, as shown in FIG. 22. In this example, additional waveguide switches, here implemented using MZIs ML1 and MR1, can be used to connect waveguide WA1(I) directly to WA1(O), bypassing the receiver R1 and transmitter T1.

We could use this bypass setting to set up the SRADM without interrupting any of the channels going through the device (i.e., "hitless" operation). Note that for truly hitless operation, it may be necessary to use "endless" phase shifters in the device so there are not discontinuous jumps as the end of the range is reached for a given phase shifter. In this bypass setting, we can use the detectors to set up the internal state of the device without changing the fact that all modes are being transmitted straight through the device. (Note explicitly that, in this bypass mode, as long as the MZIs MI1-MI4 and MO1-MO4 are always set with the same "reflectivities" and the opposite phase shifts, respectively, as discussed above, the SRADM makes no change in the transmission of any particular mode.) Then, once we have set the device, using the detectors and feedback loops, so that the add-drop mode now of interest to us is passing through the top waveguide, we can switch in the receiver and transmitter instead of the bypass waveguide. Hence, the device can be optimized in preparation for adding and dropping any specific mode while passing all the modes unchanged through the device, making this setup totally "hitless". Once we have set the device in preparation for a given add-drop mode, we can switch back the bypass switches, thereby connecting the add-drop receiver R1 and transmitter T1 back into the system, with no change in the transmission of the other modes of the system.

D3.3) Simplified Device

Figure 23:
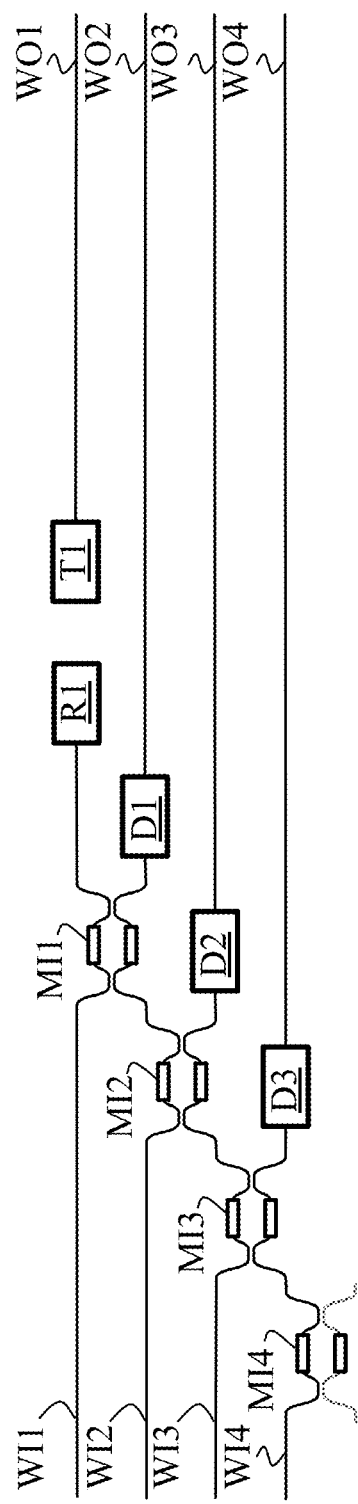
FIG. 23 shows a simplified implementation of the add-drop device.

If we do not mind the spatial channels being of different form in different parts of the network, we can use a simplified form of the SRADM, as shown in FIG. 23. This device is simply a self-aligning mode coupler as described above implemented with mostly-transparent detectors and output waveguides on the far side of those detectors and, optionally, with additional dummy MZIs for equal loss. Here we will presume that there is some way for the detectors to identify the channel of interest, such as a low-frequency modulation of that channel to allow the detectors to lock-on to that channel only, as discussed above.

This device will certainly change the mode forms of the different channels as they pass through but, as long as any scattering between modes during propagation in the network is unitary (within a multiplying constant), the various spatial channels remain orthogonal and can still be separated by other similar devices down-stream, again on the presumption we have some labeling, such as a different low-frequency modulation for each channel, that can be recognized by the detectors. In such a scheme, it is only important that the detectors can recognize the channel of interest and that the channels remain orthogonal, as will be the case if the scattering in the system is unitary (lossless) or unitary within a single loss factor.

D3.4) Universal Device

Figure 24:
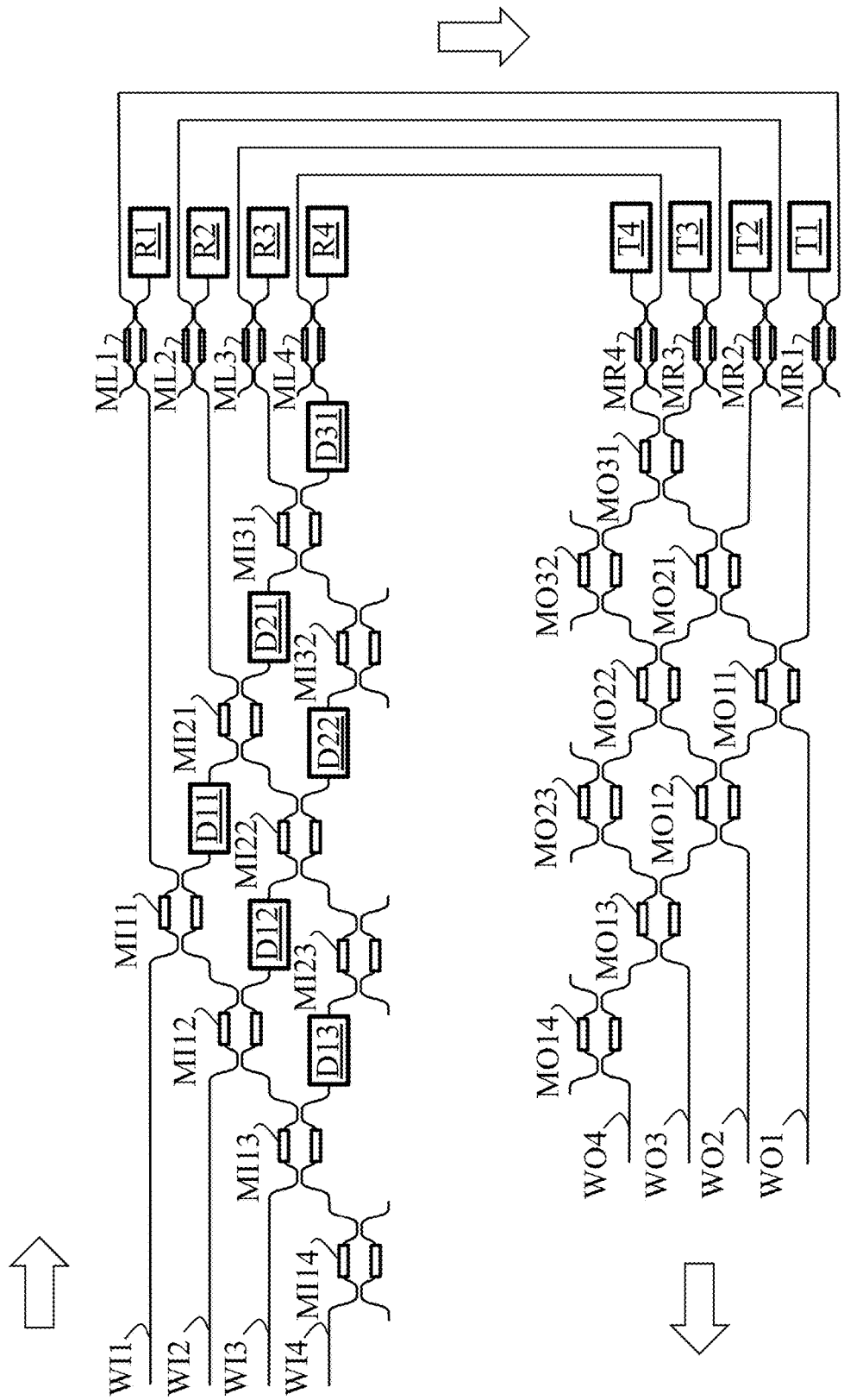
FIG. 24 shows a multi-channel add-drop device.

We could extend the concepts here to make a SRADM that can add and drop any channel or combination of channels, all in a hitless fashion, as shown in FIG. 24. In this device, we have added in receivers (R1-R4), transmitters (T1-T4), and pairs of bypass switches (ML1 & MR1-ML4 & MR4) in each path. We have also added additional diagonal "rows" of MZIs and mostly-transparent detectors to allow the simultaneous separation of each of the different orthogonal modes; this configuration corresponds to the self-aligning coupler as described above when configured to align to multiple beams at once. The MZIs in the first row, MI11-MI14, are set using the signals in detectors D11-D14, exactly as before, to put one of the desired modes into the R1-T1 channel. Then, similarly, MI21-MI23 are set using the signals in detectors D21-D22 to put the second mode into the R2-T2 channel. Finally, in this example, MI31-MI32 are set using the signal from detector D31 to put the third mode into the R3-T3 channel, with the fourth mode being automatically sent to the R4-T4 channel as a result.

The MZIs MO11-MO32 on the bottom half are set with the same reflectivities but opposite phases to their similarly numbered counterparts on the left. The modes as separated on the right side of the figure can either be switched for add-drop or for bypass by using the bypass switch pairs (ML1 & MR1-ML4 & MR4) as desired. If all the channels are set for bypass, the entire SRADM device can be reconfigured in a hitless fashion.

To use the different rows of detectors to set the different rows of MZIs while all the beams are illuminated simultaneously in the device, we need to use a technique that enables us to distinguish the different mode signals in the detectors, such as using a different low-frequency modulation on each mode as mentioned above. Detectors D11-D13 can be set to look for the low-frequency modulation of the first mode, D21-D22 to look for the low-frequency modulation of the second mode, and D31 for the low-frequency modulation of the third mode.

D4) Conclusions

We have shown here how to make an add-drop multiplexer for arbitrary spatial modes. A SRADM device of this type could be implemented using any of several different approaches to planar optical circuits, including thermo-optic silicon-based technologies, for example, as long as appropriate mostly-transparent detectors are also available. The concept is self-aligning based only on local feedback loops where signals from mostly-transparent detectors are used to set controllable beam-splitters and phase shifters. Note that there is no global multiparameter optimization required in this approach; the device steps progressively through multiple local feedback operations based on minimizing power in detectors. By using some simple coding to identify each spatial communication channel of interest, such as a low-frequency power modulation at a different frequency for each different channel, the SRADM can optimize its alignment to one spatial channel even in the presence of power in the other channels. The alignment optimization can be left running continuously while the SRADM is in use so that it can even compensate for changes in the spatial modes. By choosing equal path lengths for all the beam paths through the system, the SRADM itself can be substantially independent of wavelength, with one setting working for many different wavelengths. The device can operate in a hitless mode that allows the device to be reconfigured without disturbing the transmission of any of the channels.

This approach shows that we may be able to make use of multiple spatial modes flexibly in complex transmission systems, and may open the way for broader application of spatial modes in communications.

The invention claimed is:

1. An N to one coherent integrated optical wave combiner having N≥2 inputs and a single output, the apparatus comprising:
    a coherent integrated optical interferometer network that operates substantially on single spatial modes and is substantially linear, reciprocal and lossless, and which includes N−1 2×2 adjustable wave splitters connected in series, configured such that the contribution of each of the N inputs to the output is adjustable in both amplitude and relative phase;
    wherein the coherent integrated optical interferometer network provides N−1 control ports at which waves not coupled to the output are emitted, wherein the N−1 control ports are in one to one correspondence with the N−1 2×2 adjustable wave splitters; and
    N−1 detectors disposed at the control ports and in one to one correspondence with the N−1 2×2 adjustable wave splitters;
    wherein amplitude splits and phase shifts of the coherent integrated optical interferometer network are determined in operation by adjusting them one at a time in a single-pass adjustment sequence to sequentially null signals from the N−1 detectors;
    wherein the signals from the N−1 detectors are minimized by adjusting the amplitude splits and phase shifts of the corresponding 2×2 adjustable wave splitter;
    wherein each input and the output are substantially single-spatial-mode.

2. The coherent integrated optical wave combiner of claim 1 wherein the 2×2 adjustable wave splitters comprise one or more waveguide Mach-Zehnder interferometers.

3. A P input to Q output coherent integrated optical wave combiner having P≥2 and 2≤Q≤P, the apparatus comprising:
    Q combiners indexed by an integer i (1≤i≤Q), wherein each combiner i for 1≤i≤min(Q, P−1) is a P+1−i to one coherent integrated optical wave combiner according to claim 1;
    wherein inputs of combiner i for i≥2 are provided by the control ports of combiner i −1; and wherein the detectors of combiner i for i<Q are tap detectors that absorb less than 50% of the incident light and transmit the remainder;

whereby the P input to Q output coherent integrated optical wave combiner includes P(P−1)/2−(P−Q)(P−Q−1)/2 2×2 adjustable wave splitters.

4. The P input to Q output coherent integrated optical wave combiner of claim 3, wherein the tap detectors absorb less than 10% of the incident light and transmit the remainder.

5. An N to one coherent integrated optical wave combiner having N≥2 inputs and a single output, the apparatus comprising:

a coherent integrated optical interferometer network that operates substantially on single spatial modes and is substantially linear, reciprocal and lossless, and which includes N−1 adjustable 2×2 wave splitters connected in series, configured such that the contribution of each of the N inputs to the output is adjustable in both amplitude and relative phase;

wherein the coherent integrated optical interferometer network provides N−1 control ports at which waves not coupled to the output are emitted, wherein the N−1 control ports are in one to one correspondence with the N−1 2×2 adjustable wave splitters; and an output detector disposed at the output;

wherein amplitude splits and phase shifts of the coherent integrated optical interferometer network are determined in operation by adjusting them one at a time in a single-pass adjustment sequence to sequentially maximize a signal from the output detector;

wherein each input and the output are substantially single-spatial-mode.

6. The coherent integrated optical wave combiner of claim 5, wherein the output detector is a tap detector that absorbs less than 50% of the incident light and transmits the remainder.

7. A P input to Q output coherent integrated optical wave combiner having P≥2 and 2≤Q≤P, the apparatus comprising:

Q combiners indexed by an integer i (1≤i≤Q), wherein each combiner i for 1≤i≤min(Q, P−1) is a P+1−i to one coherent integrated optical wave combiner according to claim 5;

wherein inputs of combiner i for i≥2 are provided by the control ports of combiner i−1;

whereby the P input to Q output coherent integrated optical wave combiner includes P(P−1)/2−(P−Q)(P−Q−1)/2 2×2 adjustable wave splitters.

8. A one to N coherent integrated optical wave mode synthesizer having one input and N≥2 outputs, the apparatus comprising:

a coherent integrated optical interferometer network that operates substantially on single spatial modes and is substantially linear, reciprocal and lossless, and which includes 2×2 adjustable wave splitters connected in series, configured such that the contribution of the input to each of the N outputs is adjustable in both amplitude and relative phase;

wherein the coherent integrated optical interferometer network provides N−1 control ports at which waves incident on the outputs can be emitted, wherein the N−1 control ports are in one to one correspondence with the N−1 2×2 adjustable wave splitters; and N−1 detectors disposed at the control ports and in one to one correspondence with the N−1 2×2 adjustable wave splitters;

wherein amplitude splits and phase shifts of the coherent integrated optical interferometer network are determined in operation by adjusting them one at a time in a single-pass adjustment sequence to sequentially null signals from the N−1 detectors when the N outputs are illuminated with a phase-conjugated version of a desired output mode;

wherein the signals from the N−1 detectors are minimized by adjusting the amplitude splits and phase shifts of the corresponding 2×2 adjustable wave splitter;

wherein the input and each output are substantially single-spatial-mode.

9. The coherent integrated optical wave mode synthesizer of claim 8 wherein the 2×2 adjustable wave splitters comprise one or more waveguide Mach-Zehnder interferometers.

10. A Q input to R output coherent integrated optical wave mode synthesizer having Q≥2 and 2≤Q≤R, the apparatus comprising:

Q mode synthesizers indexed by an integer i (1≤i≤Q), wherein each mode synthesizer i for 1≤i≤min(Q, R−1) is a one to R+1−i coherent integrated optical wave mode synthesizer according to claim 8;

wherein outputs of mode synthesizer i for i≥2 are provided to the control ports of mode synthesizer i −1 as inputs; and wherein the detectors of mode synthesizer i for i<R are tap detectors that absorb less than 50% of the incident light and transmit the remainder;

whereby the Q input to R output coherent integrated optical wave mode synthesizer includes R(R−1)/2−(R−Q)(R−Q−1)/2 2×2 adjustable wave splitters.

11. The coherent integrated optical wave mode synthesizer of claim 10, wherein the tap detectors absorb less than 10% of the incident light and transmit the remainder.

12. A one to N coherent integrated optical wave mode synthesizer having one input and N≥2 outputs, the apparatus comprising:

a coherent integrated optical interferometer network that operates substantially on single spatial modes and is substantially linear, reciprocal and lossless, and which includes N−1 2×2 adjustable wave splitters connected in series, configured such that the contribution of the input to each of the N outputs is adjustable in both amplitude and relative phase;

wherein the coherent integrated optical interferometer network provides N−1 control ports at which waves incident on the outputs can be emitted, wherein the N−1 control ports are in one to one correspondence with the N−1 2×2 adjustable wave splitters; and an input detector disposed at the input and capable of detecting radiation incident on the outputs that is coupled to the input;

wherein amplitude splits and phase shifts of the coherent integrated optical interferometer network are determined in operation by adjusting them one at a time in a single-pass adjustment sequence to sequentially maximize a signal from the input detector when the N outputs are illuminated with a phase-conjugated version of a desired output mode;

wherein the input and each output are substantially single-spatial-mode.

13. The coherent integrated optical wave mode synthesizer of claim 12, wherein the input detector is a tap detector that absorbs less than 50% of the incident light and transmits the remainder.

14. A Q input to R output coherent integrated optical wave mode synthesizer having Q≥2 and 2≤Q≤R, the apparatus comprising:

Q mode synthesizers indexed by an integer i (1≤i≤Q), wherein each mode synthesizer i for 1≤i≤min(Q, R−1) is a one to R+1−i coherent integrated optical wave mode synthesizer according to claim 12;

wherein outputs of mode synthesizer i for i≥2 are provided to the control ports of mode synthesizer i−1 as inputs;

whereby the Q input to R output coherent integrated optical wave mode synthesizer includes R(R−1)/2−(R−Q)(R−Q−1)/2 2×2 adjustable wave splitters.

15. The coherent integrated optical wave combiner of claim 1, wherein the 2×2 adjustable wave splitters are indexed by an integer j; wherein j=1 for the 2×2 adjustable wave splitter that is closest to the output; wherein j=N−1 for the 2×2 adjustable wave splitter that is furthest from the output; and wherein the single-pass adjustment sequence is: phase(N−1) and amplitude(N−2); phase(N−2) and amplitude(N−3), . . . , phase(3) and amplitude(2); phase(2) and amplitude(1).

16. The coherent integrated optical wave combiner of claim 5, wherein the 2×2 adjustable wave splitters are indexed by an integer j; wherein j=1 for the 2×2 adjustable wave splitter that is closest to the output; wherein j=N−1 for the 2×2 adjustable wave splitter that is furthest from the output; and wherein the single-pass adjustment sequence is: phase(N−1) and amplitude(N−2); phase(N−2) and amplitude(N−3), . . . , phase(3) and amplitude(2); phase(2) and amplitude(1).

17. The coherent integrated optical wave mode synthesizer of claim 8, wherein the 2×2 adjustable wave splitters are indexed by an integer j; wherein j=1 for the 2×2 adjustable wave splitter that is closest to the input; wherein j=N−1 for the 2×2 adjustable wave splitter that is furthest from the input; and wherein the single-pass adjustment sequence is: phase(N−1) and amplitude(N−2); phase(N−2) and amplitude(N−3), . . . , phase(3) and amplitude(2); phase(2) and amplitude(1).

18. The coherent integrated optical wave mode synthesizer of claim 12, wherein the 2×2 adjustable wave splitters are indexed by an integer j; wherein j=1 for the 2×2 adjustable wave splitter that is closest to the input; wherein j=N−1 for the 2×2 adjustable wave splitter that is furthest from the input; and wherein the single-pass adjustment sequence is: phase(N−1) and amplitude(N−22); phase(N−22) and amplitude(N−3), . . . , phase(3) and amplitude(2); phase(2) and amplitude(1).

19. The coherent integrated optical wave combiner of claim 1, wherein the coherent integrated optical interferometer network includes a binary tree configuration of some or all of the 2×2 adjustable wave splitters.

20. The coherent integrated optical wave combiner of claim 5, wherein the coherent integrated optical interferometer network includes a binary tree configuration of some or all of the 2×2 adjustable wave splitters.

21. The coherent integrated optical wave mode synthesizer of claim 8, wherein the coherent integrated optical interferometer network includes a binary tree configuration of some or all of the 2×2 adjustable wave splitters.

22. The coherent integrated optical wave mode synthesizer of claim 12, wherein the coherent integrated optical interferometer network includes a binary tree configuration of some or all of the 2×2 adjustable wave splitters.

* * * * *